(12) United States Patent
Kluss

(10) Patent No.: US 6,463,419 B1
(45) Date of Patent: Oct. 8, 2002

(54) INTERNET SYSTEM FOR EXCHANGING AND ORGANIZING VESSEL TRANSPORT INFORMATION

(75) Inventor: Stewart R. Kluss, New Rochelle, NY (US)

(73) Assignee: Chartering Solutions, New Rochelle, NY (US)

( * ) Notice: Subject to any disclaimer, the term of this patent is extended or adjusted under 35 U.S.C. 154(b) by 0 days.

(21) Appl. No.: 09/520,195

(22) Filed: Mar. 7, 2000

(51) Int. Cl.[7] .......................... G06F 17/60; G06F 17/00; G06G 7/00
(52) U.S. Cl. .............................. 705/26; 705/400; 705/1; 705/37
(58) Field of Search ........................... 705/26, 400, 37, 705/1

(56) References Cited

U.S. PATENT DOCUMENTS

| | | | | |
|---|---|---|---|---|
| 5,835,716 A | * | 11/1998 | Hunt et al. | 395/200.43 |
| 5,978,771 A | | 11/1999 | Vandivier, III | |
| 6,035,289 A | * | 3/2000 | Chou et al. | 705/37 |
| 6,064,981 A | * | 5/2000 | Barni et al. | 705/26 |
| 6,161,097 A | | 12/2000 | Glass et al. | |

FOREIGN PATENT DOCUMENTS

| WO | WO 00/48054 | | 8/2000 |
|---|---|---|---|
| WO | WO00/62227 | * | 10/2000 |

OTHER PUBLICATIONS www.seanet.co.uk/public/navigation/main.htm, Mar. 17, 2002.*
www.virtualchartering.com, Mar. 12, 2001.*
Maritime Hubs & Portals, Apr. 28, 2001, www.con-connect.com/listofportal.html.*
MIC to Launch Web Site for Dry Bulk Shippers, Businessline, Jul. 17, 1999.*
The Provision Network is Launched by GEN Logistics Systems, PR Newswire, Apr. 25, 1997, Pg. 0425NYF077.*
Societe Budd: The Global Freight Market, M2 Presswire, Jan. 19, 1998.*
Sveinn Gudmundsson, et al., The Development of Electronic Markets in Logistics, International Journal of Logistics Management, 1999, vol. 10, No. 2, pp. 99–113.*
Pioneering Auctioneer with Shares in Space, Lloyd's List, Feb. 8, 2000, pg. 7.*
n Technology n Tenby Brings Ships and Cargo Together in Cyberspace, Lloyd's List, Nov. 4, 1999.*
Internet ShipBrokers: "An e–Shipping Website" (INTERNET SHIPBROKERS); http:www.virtualchartering.com; Mar. 12, 2001.
Sea Logistics (SEA LOGISTICS); www.sealogistics.com; Mar. 12, 2001.

* cited by examiner

Primary Examiner—Richard Chilcot
Assistant Examiner—J Harle
(74) Attorney, Agent, or Firm—Darby & Darby

(57) ABSTRACT

A ship chartering system is implemented on a computer or telecommunications network, such as the Internet, and is meant to supplement or replace services offered by current shipping brokers. The system allows a charterer to locate acceptable ships, receive bids from ship owners, and negotiate contract terms for their cargo. Ship owners are able to update their ship positions and cargo capabilities, add new ships to a database of available ships, and bid on the transportation of cargo entered by a charterer in an open market solicitation. In a preferred embodiment, both charterers and ship owners must subscribe to the system in order to access and participate in it.

32 Claims, 36 Drawing Sheets

54

Owner Functions

INTERNET SYSTEM FOR EXCHANGING AND ORGANIZING VESSEL TRANSPORT INFORMATION

RELATED APPLICATIONS

The present application relates to a copending U.S. patent application Ser. No. 09/520,325 entitled INTERNET SYSTEM FOR EXCHANGING AND ORGANIZING VESSEL TRANSPORT INFORMATION and filed herewith.

BACKGROUND OF THE INVENTION

1. Field of the Invention

The present invention relates to data processing for business applications and, more particularly, to booking systems for negotiating terms and reserving space on transport vessels.

2. Description of the Related Art

In the field of ship chartering, a typical transaction between a charterer, e.g. one who wishes to ship cargo, and a ship owner, e.g. one who may be hired to transport the cargo, usually requires the engagement of a shipping broker to bring the parties together and to effectuate a shipping agreement (referred to herein as a "fixture" or a "charter party" contract). This is because information on available ships is usually not widely available to charterers. Likewise, charterers generally have no forum, outside of brokers, for publicizing their chartering needs to ship owners on the open market. If such information were to become available to the shipping market at large, outside of the influence of brokers, significant savings in time and expense to both charterers and ship owners could be realized.

A broker typically earns a commission of 1.25% of the fixture. This percentage is then usually charged by the broker to both parties. An average fixture for the spot tanker market in 1992 was $459,800, leading to an average commission of $11,495. A broker may complete 25–30 fixtures per week, totaling $287,375 to $344,850 a week in commissions, or $14,943,500 to $17,932,200 a year. Thus, brokers in the spot tanker chartering market earn significant revenues for themselves, which in turn adds millions of dollars to chartering transactions each year.

Accordingly, it would be advantageous to provide a forum wherein shipping information is directly available to both charterers and ship owners in order to allow for the negotiation of fixtures or charter parties without enlisting a broker.

BRIEF SUMMARY OF THE INVENTION

In order to address and solve certain of the foregoing shortcomings in the prior art, the present invention provides a method and accompanying apparatus which allow charterers and ship owners to exchange cargo transportation information without the assistance of a broker. In a first embodiment, the method includes providing an electronic network site for receiving and storing information from both charterers and ship owners in order to more readily accomplish agreements for cargo transport. The network site is operative to process the received information so as to provide to the charterer a listing of ships, which fit criteria established by the charterer, from among the information supplied by the ship owners.

In a second embodiment, a method of brokerless arrangement for the shipment of cargoes includes providing for direct negotiations between a charterer and a ship owner by making information concerning the charter directly available to both the charterer and the ship owner without the use of a broker.

In a further embodiment of the present invention, the cargo transportation information is provided on forms or templates.

In yet another embodiment of the present invention the processing step includes a matching step in which criteria from the charterer is matched with ship descriptions and availability stored on the network site.

In still another embodiment, a method of the present invention further includes a step of initiating communication between the charterer and the ship owner whose ship fits the criteria established by the charterer, wherein such direct communication may be facilitated by e-mail.

In a still further embodiment, a method of the present invention further includes the step of providing the ship owner with an on-screen display of the standard terms used by the charterer, which, in turn, may enable more rapid agreement between the charterer and the ship owner.

In a further embodiment of the present invention, the network site may memorialize the agreement between the ship owner and the charterer in the form of a fixture. This may be accomplished, for example, by automatically generating a charter party contract based on the fixture.

In a still further embodiment, a method of the present invention may further include the payment of a commission to the owner of the network site.

In yet another embodiment, the network site may be implemented on the Internet or on a private network.

In another embodiment of the present invention, the network site may further include a central database accessible by the charterer and the ship owner, and maintained at the network site. The database may include information such as ship descriptions and positions. The database may further include a plurality of fixtures which are authorized by one or more charterers and owners to be placed in the database, and publicly or privately viewed. The database may further include co-loading cargo information and financing information.

It is therefore an advantage of certain embodiments of the present invention that an interactive network site can store up-to-date information for use by ship owners and charterers which enable them to negotiate and enter into charter party contracts.

It is a further advantage of certain embodiments of the present invention that ship owners and charterers may agree to terms of fixtures and charter party contracts by communicating directly through a network site rather than through a traditional broker.

BRIEF DESCRIPTION OF THE SEVERAL VIEWS OF THE DRAWINGS

Further aspects of the instant invention will be more readily appreciated upon review of the detailed description of the preferred embodiments included below when taken in conjunction with the accompanying drawings, of which.

DETAILED DESCRIPTION OF THE PREFERRED EMBODIMENTS

Referring now to FIGS. 1–35, wherein similar components of the instant invention are referenced in like manner, a preferred apparatus for allowing charterers and ship owners to exchange information and negotiate charter parties, and accompanying methods for using the same, are disclosed.

Figure 1:
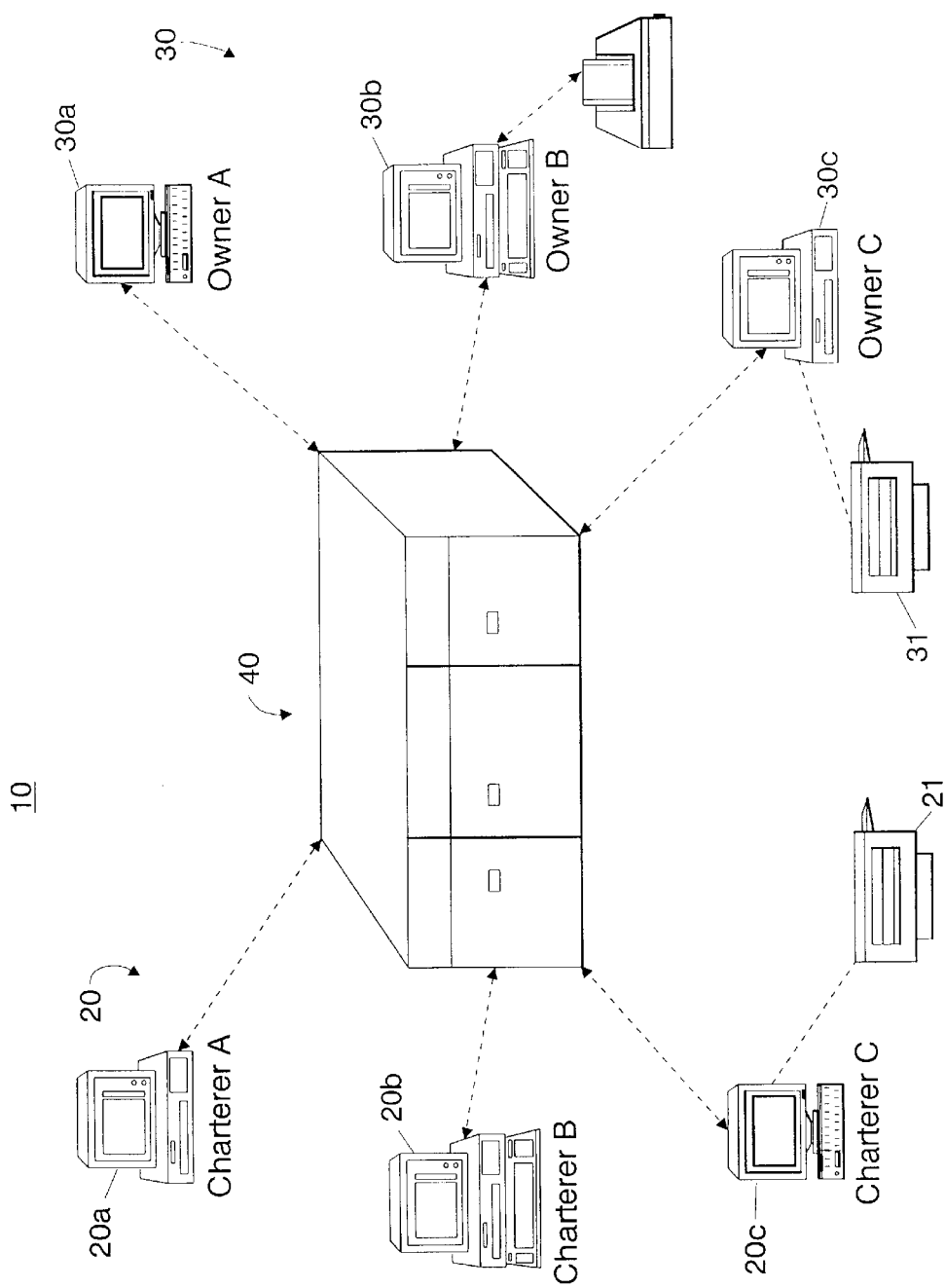
FIG. 1 is a schematic diagram of a communications network for use with the present invention, which allows charterers and ship owners to communicate with a network site.

Turning now to FIG. 1, depicted therein is an exemplary computer network 10 by which a plurality of charterers, using charterer terminals 20a–20c may interact with a plurality of ship owners, using owner terminals 30a–30c, via network site 40 in any known manner. Although computer network 10 is preferably an Internet-based network, it may be any one or more of a local area network (LAN), a wide-area network (WAN), an intranet environment, an extranet environment, a broadband wireless network or other type of computer or communications network, such as those enabled over public switched telephone networks. Remote terminals 20, 30 may be any computing device, such as a personal computer, a workstation, a network terminal, a wireless Internet access device or any other device that can communicate with the network site 40 over the computer network 10. Remote terminals 20, 30 may include one or more charterer remote terminals 20a–20c and one or more ship owner remote terminals 30a–30c as described further hereinbelow. Network site 40 may include any number of computer servers which cooperate to maintain the system of the present invention and perform the methods for using the same.

In one embodiment of the present invention, a network site 40 may maintain a web site which is hosted on the Internet. A charterer or ship owner may communicate with the server 40 through remote terminals 20, 30 which may be equipped with hardware and software that accommodates Internet access over the computer network 10. In the alternative, the network site 40 may host a bulletin board site or a separate community of network servers, such as those maintained by AMERICA ONLINE. In that case, a charterer or a ship owner may communicate with the network site 40 by dialing directly into the network site 40 using the appropriate remote terminal 20, 30 which, in turn, may be equipped with a modem or the like that can transmit and receive data over a public switched telephone network. Other variations and configurations of the computer network 10 will be apparent to one of ordinary skill in the art.

Figure 2:
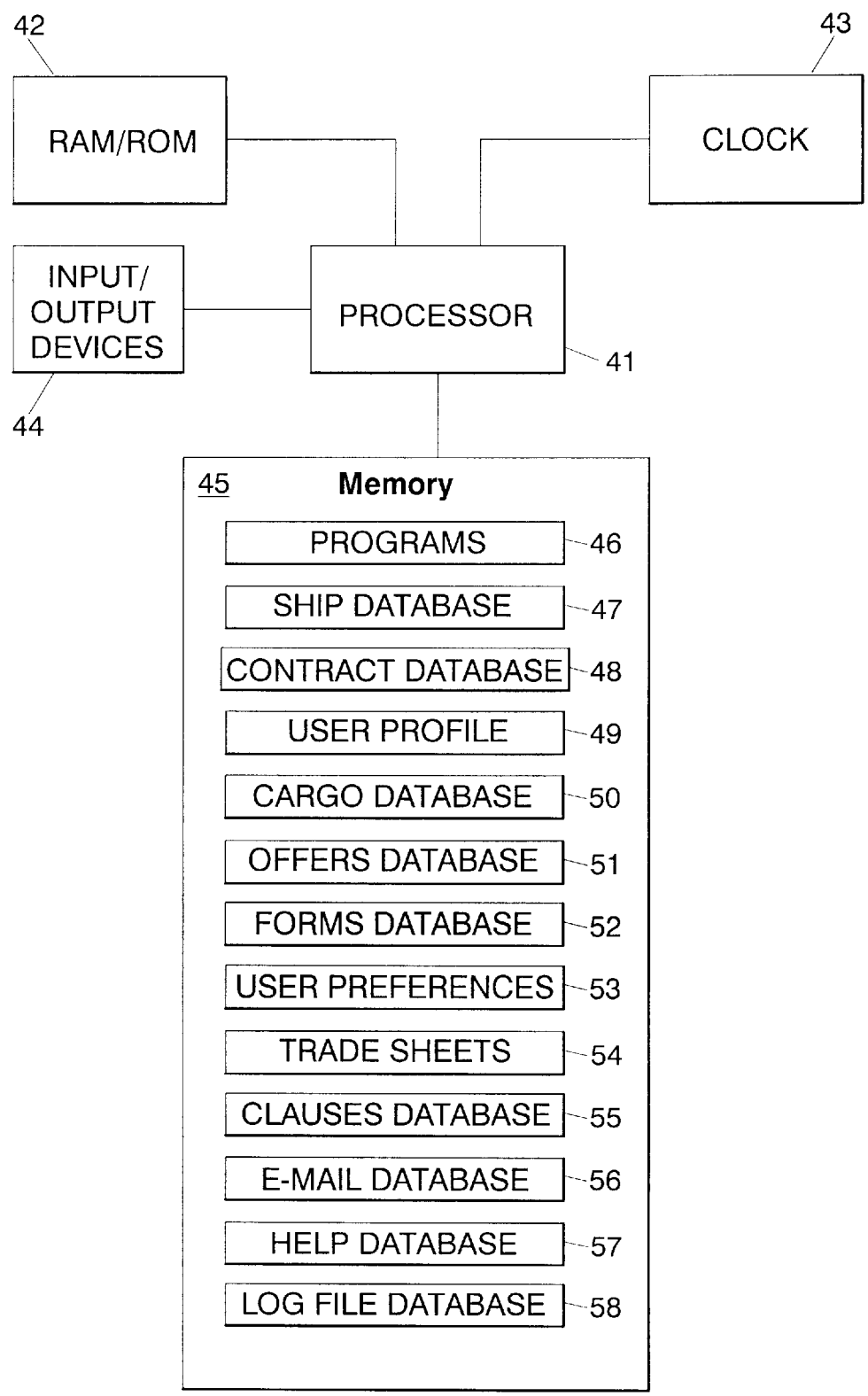
FIG. 2 is a schematic block diagram of exemplary components of the network site of FIG. 1.

Turning now to FIG. 2, displayed therein are exemplary components of the server 40 which may be necessary to implement the present invention. Although the descriptions below may be additionally applicable to either type of remote terminal 20, 30, the components will be discussed with regard to network site 40 for the sake of brevity.

The primary component of network site 40 is a processor 41, which may be any commonly available microprocessor, such as the PENTIUM III manufactured by INTEL CORP. The processor 41 may be operatively connected to further exemplary components, such as RAM/ROM 42, a clock 43, input/output devices 44, and a memory 45 which stores one or more operating system and application programs 46 as well as a plurality of databases 47–58, described further hereinbelow.

The processor 41 operates in conjunction with random access memory and read-only memory in a manner well known in the art. The random-access memory (RAM) portion of RAM/ROM 42 may be a suitable number of Single In-line Memory Module (SIMM) chips having a storage capacity (typically measured in kilobytes or megabytes) sufficient to store and transfer, inter alia, processing instructions utilized by the processor 41 which may be received from the programs 46. The read-only memory (ROM) portion of RAM/ROM 42 may be any permanent non-rewritable memory medium capable of storing and transferring, inter alia, processing instructions performed by the processor 41 during a start-up routine of the network site 40. Further functions of RAM/ROM 42 will be apparent to one of ordinary skill in the art.

The clock 43 may be an on-board component of the processor 41 which dictates a clock speed (typically measured in MHz) at which the processor 41 performs and synchronizes, inter alia, communication between the internal components of the network site 40. Further functions of the clock 43 will be known to one of ordinary skill in the art.

The input/output device(s) 44 may be one or more commonly known devices used for receiving operator inputs, network data, and the like and transmitting the same to the remote terminals 20, 30. Accordingly, exemplary input devices may include a keyboard, a mouse, a voice recognition unit and the like for receiving user inputs.

Exemplary output devices may include any commonly known devices used to present data to an operator of the network site 40 or to transmit data over the computer network 10. Accordingly, suitable output devices may include a display, a printer and a voice synthesizer connected to a speaker.

Other input/output devices 44 may include a telephonic or network connection device, such as a telephone modem, a wireless modem, a cable modem, a T-1 connection, a digital subscriber line or a network card, for communicating data to and from other computer devices 20, 30 over the computer network 10. It is preferable that any network or communication devices used as input/output devices 44 be of the type that can handle high bandwidth or large amounts of network traffic as is consistent with the operation of an Internet web server and the like.

The memory 45 may be an internal or external large capacity device for storing computer processing instructions, computer-readable data, and the like. The storage capacity of the memory 45 is typically measured in megabytes or gigabytes. Accordingly, the memory 45 may be one or more of the following: a floppy disk in conjunction with a floppy disk drive, a hard disk drive, a CD-ROM disk and reader/writer, a DVD disk and reader/writer, a ZIP disk and a ZIP drive of the type manufactured by IOMEGA CORP., and/or any other computer readable medium that may be encoded with processing instructions in a read-only or read-write format. Further functions of, and available devices for, memory 45 will be apparent to one of ordinary skill in the art.

The memory 45 may store, inter alia, a plurality of programs 46 which may include, for example, an operating system such as WINDOWS NT by MICROSOFT CORP. The memory 45 may further store one or more application programs which are necessary to implement the embodiments of the present invention, such as a database program for managing databases 46–58, and a web hosting program for presenting users with preformatted web pages or other appropriate interfaces.

The database program may be any large volume data management software, and is preferably an SQL-based relational database management program of the type manufactured by ORACLE. The web hosting program may allow pre-formatted web pages that allow users to perform the processes described below with respect to FIGS. 15–35. Such programs may be written in HTML, XML, JAVA Script, and the like. Memory 25 may contain further programs which contain processing instructions for implementing the methods disclosed herein.

Figure 3:
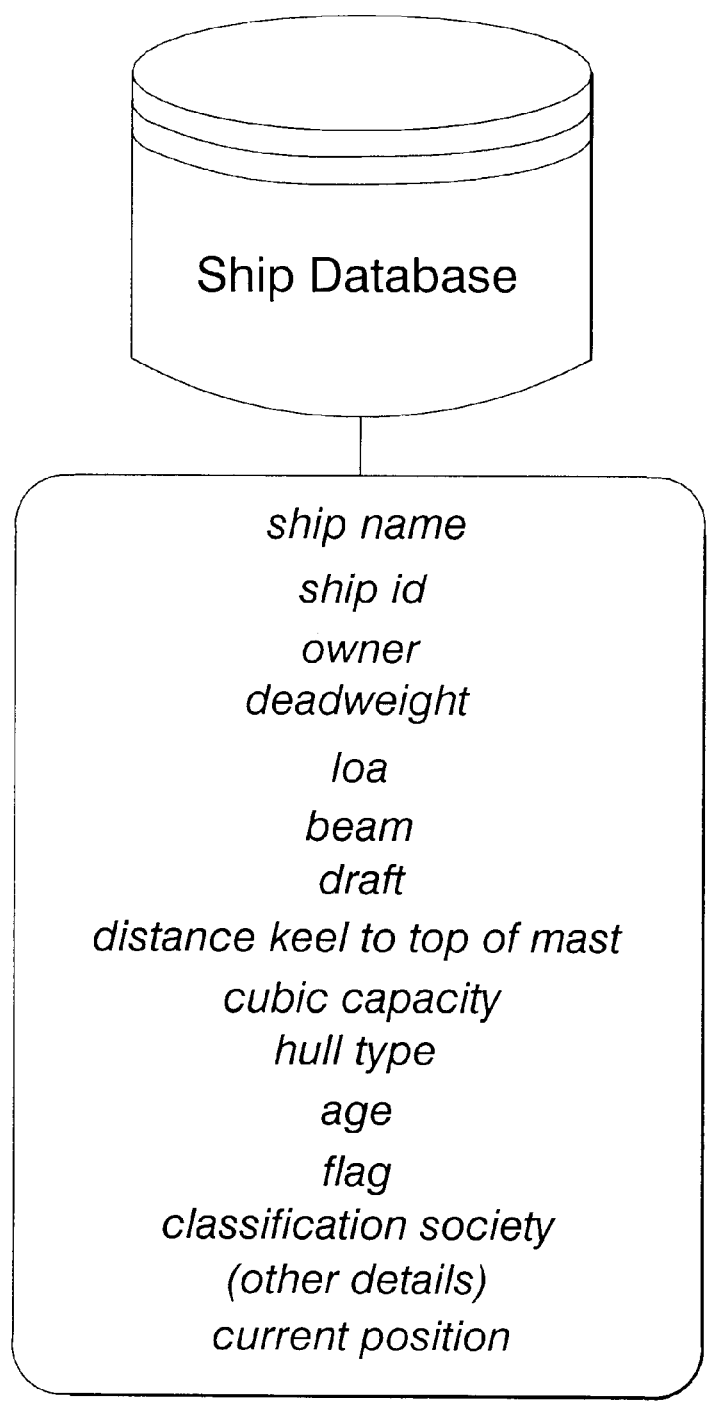
FIG. 3 is a representation of an exemplary ship database stored by the central server of FIG. 2.

FIG. 3 depicts an exemplary ship database 47 which may be stored on network site 40 according to the present invention. The ship database 47 is operative to store data for a plurality of ships in order to allow charterers to find a ship suiting their cargo transport needs. Accordingly, the ship database 47 may have a plurality of fields for storing a plurality of ship names, ship identifications, and owners of each ship stored therein. Further ship statistics may be stored for each ship, such as, deadweight, overall length (loa), beam, draft, distance from keel to top of mast, cubic capacity, hull type, age, flag (i.e., the nation in which the ship is registered), classification society, usual cargoes, current ship position/location and the like. All these factors may be used to negotiate and determine whether a particular ship is suitable, as well as to determine an acceptable fee for transportation of cargo.

Figure 4:
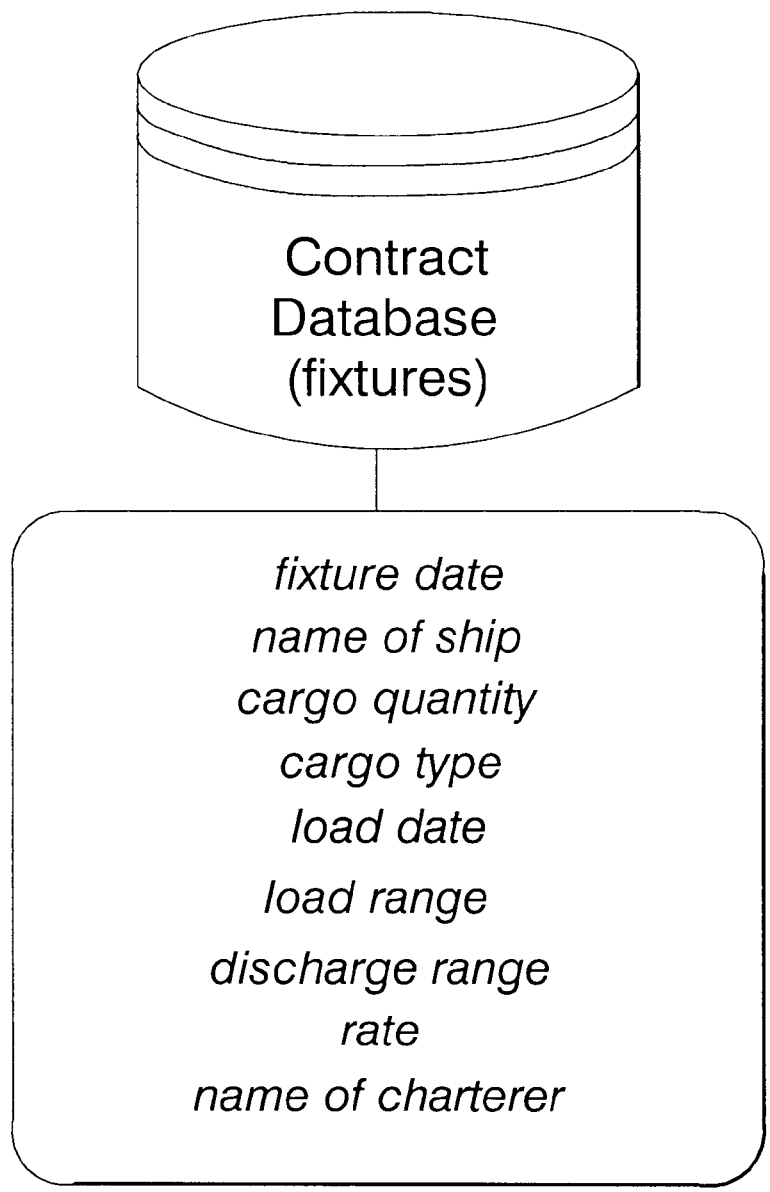
FIG. 4 is a representation of an exemplary contracts database stored by the network site of FIG. 2.

FIG. 4 depicts an exemplary fixture or contract database 48 which may be stored on network site 40 according to the present invention. The contract database 48 is operative to store data for a plurality of contracts that have been entered into by subscribers (i.e., charterers and ship owners) of the network site 40. Such stored contracts may be used by other users of the network site 40 as a model for contract negotiations. Accordingly, the contract database 48 may have a plurality of fields for storing fixture dates, names of ships involved, cargo quantities involved, cargo types, load dates, load ranges, discharge ranges, cargo rates, names of charterers, and other information that is determinable from typical charter party contracts. The information in this database may be provided to other charterers and ship owners, upon approval of the contracting parties, so that other charterers and ship owners may gain insight into the current market conditions for shipping contracts. Otherwise, this database 48 serves to preserve agreements entered into by subscribers of the network site 40 in case of later conflict. An example of a stored charter party contract is provided hereinbelow.

Figure 5:
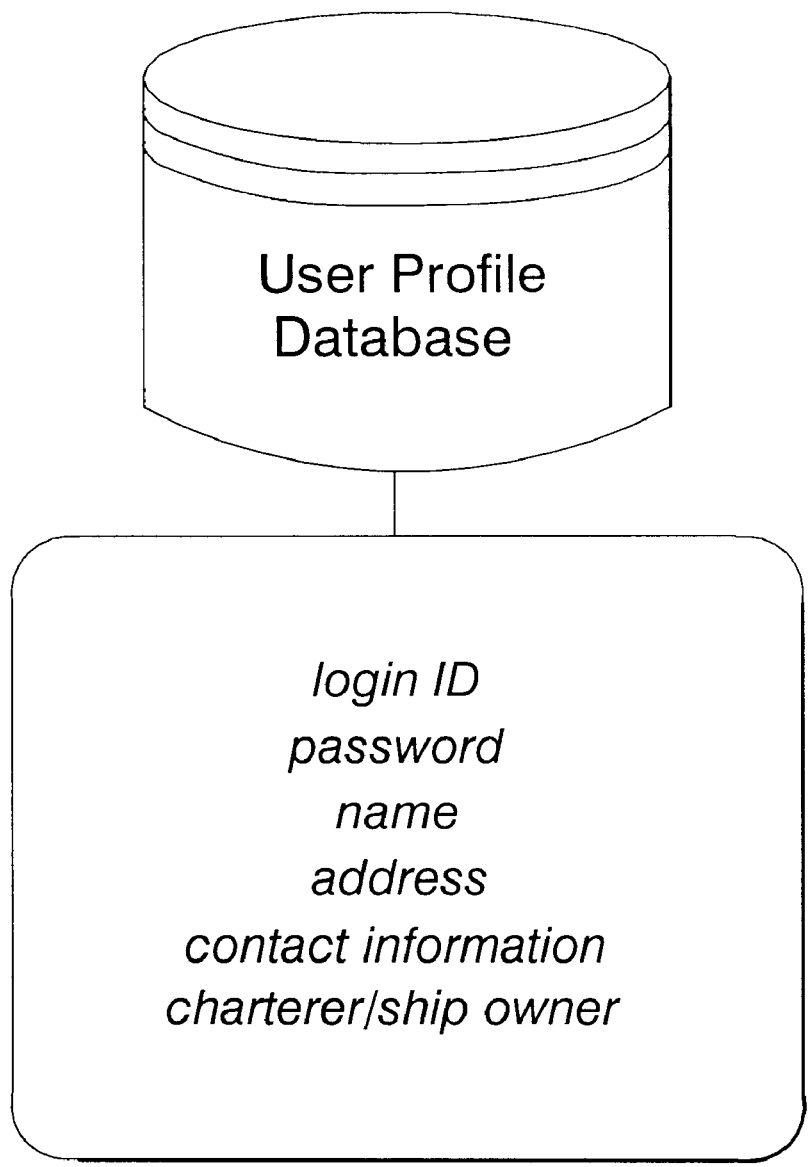
FIG. 5 is a representation of an exemplary user profile database stored by the network site of FIG. 2.

FIG. 5 depicts an exemplary user profile database 49 which may be stored on network site 40 according to the present invention. The user profile database 49 is operative to store data for a plurality of ship owners and charterers who, for example, may subscribe to the service provided by network site 40 as described herein. The user profile database 49 stores information on each such subscriber for reference by the system or for examination by other subscribers. Accordingly, the user profile database 49 may have a plurality of fields for storing a login identification, a password, a name, an address, contact information (such as an e-mail address, telephone number, cellular telephone number, pager number and the like), as well as an indication of whether the user is a charterer or a ship owner. As will be apparent to one of ordinary skill in the art, the login identification and password fields, as well as other sensitive information, may be shielded through encryption and the like from all but the actual user to whom they correspond, in order to protect against fraud.

Figure 6:
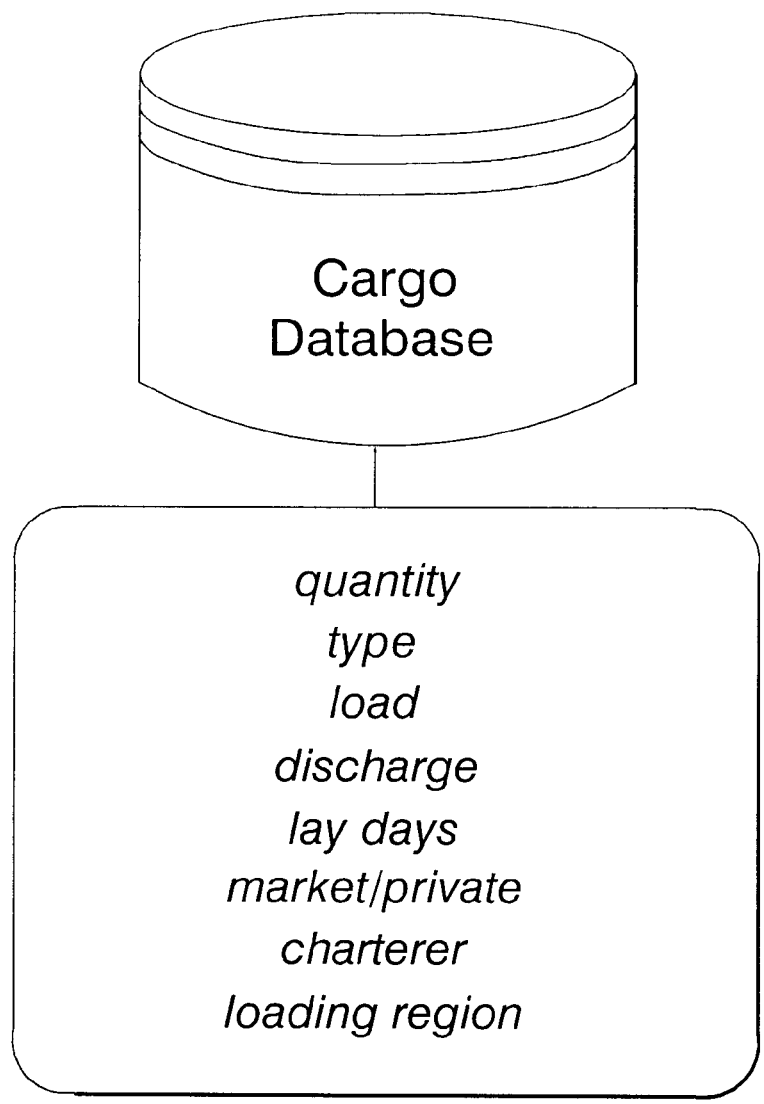
FIG. 6 is a representation of an exemplary cargo database stored by the network site of FIG. 2.

FIG. 6 depicts an exemplary cargo database 50 which may be stored on network site 40 according to the present invention. The cargo database 50 is operative to store data entered by a plurality of charterers so that ship owners may bid on a rate for transporting the cargo. The charterers input rate offers into the cargo database 50, which are reviewed by the ship owners. If a ship owner finds a particular rate acceptable, the ship owner selects that rate for transporting cargo from the cargo database 50. Accordingly, the cargo database 50 may have a plurality of fields for storing a cargo quantity, a cargo type, a cargo load, discharge requirements, required lay days, an indication of whether the cargo may be publicly or privately bid, the name or other identification of the charterer, and the loading region for the cargo. All these factors may be used to negotiate and determine an acceptable rate or fee for transportation of cargo corresponding to each stored description.

Figure 7:
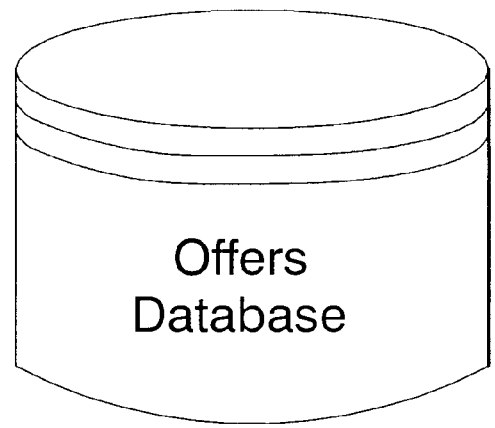
FIG. 7 is a representation of an exemplary offers database stored by the network site of FIG. 2.

FIG. 7 depicts an exemplary offers database 51 which may be stored on network site 40 according to the present invention. The offers database 51 is operative to store offers made by ship owners to charterers for handling a particular cargo. Accordingly, the offers database 51 may have a plurality of fields for storing a cargo quantity to which the offer relates, the cargo type, the load range, discharge requirements, range limitations, lay days involved in the transaction, shipping rates, demurrer rates, rider clauses and any other negotiable or non-negotiable data to be affiliated with a particular offer. The offer may be stored for a predetermined time, until accepted or rejected by a charterer.

Figure 8:
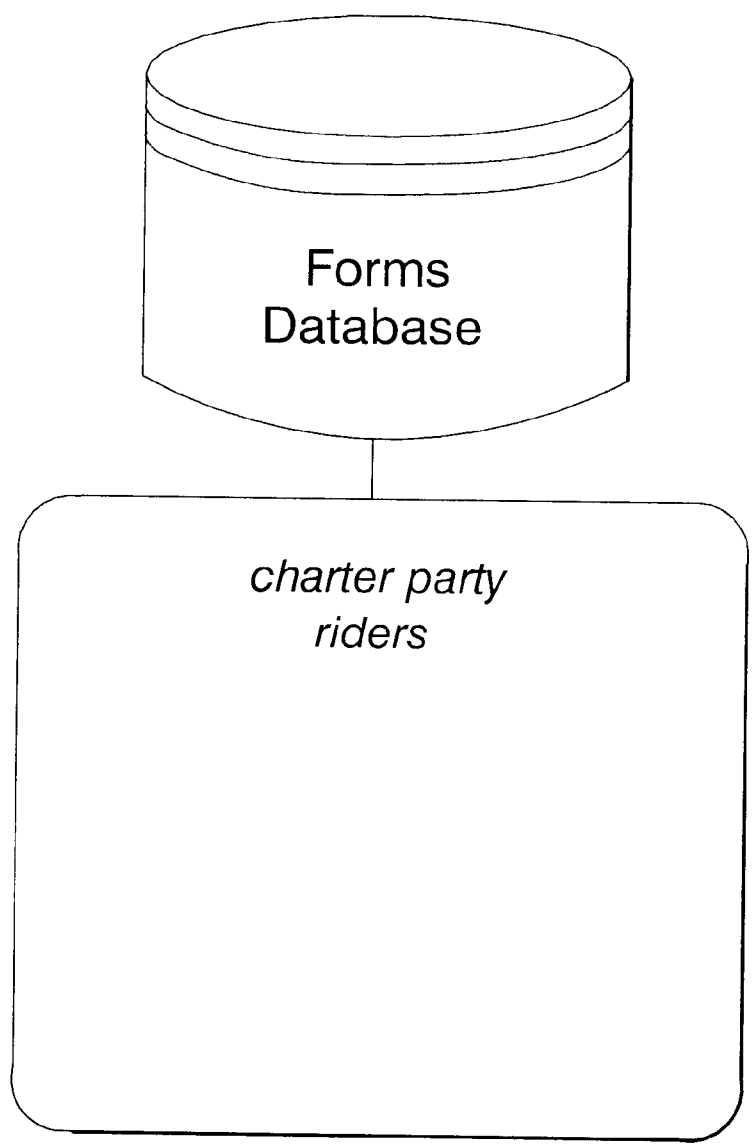
FIG. 8 is a representation of an exemplary forms database stored by the network site of FIG. 2.
Figure 9:
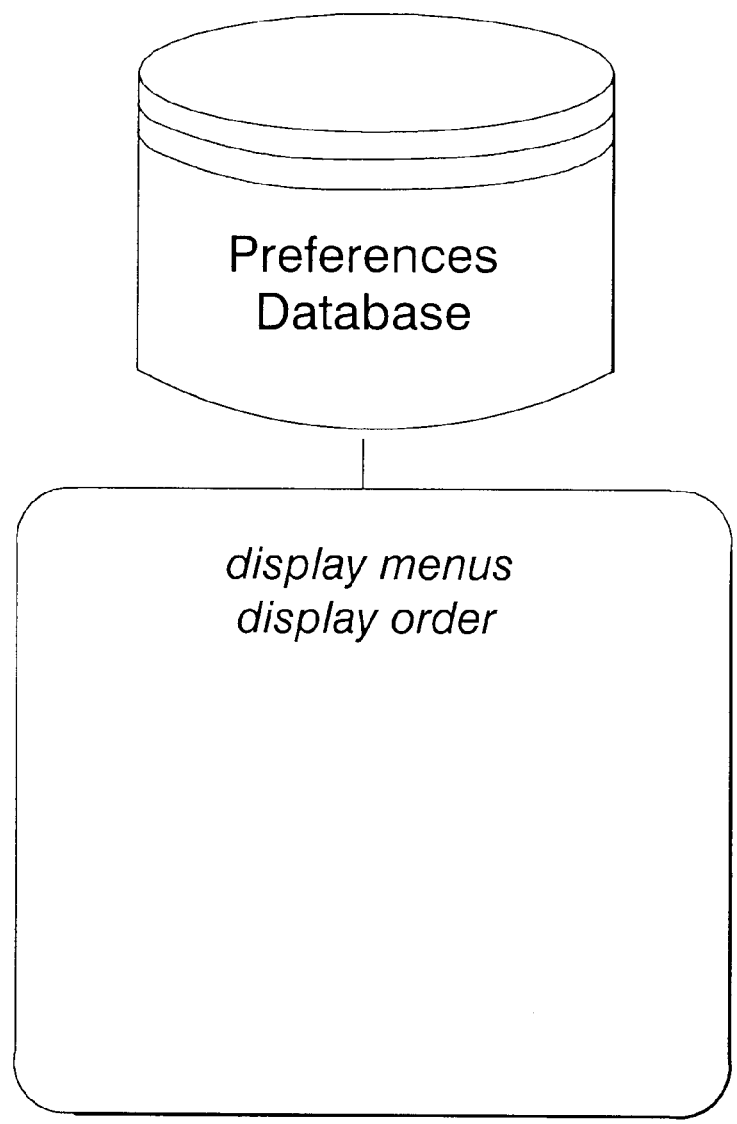
FIG. 9 is a representation of an exemplary preferences database stored by the network site of FIG. 2.

Typically, charter party contracts or fixtures contain many standardized contract clauses and the like. Thus, many features of fixtures, even those involving various parties, may tend to resemble each other in form and substance, with variations in certain negotiable terms. Accordingly, charterers and ship owners would require access to standard forms in order to more readily accomplish the completion of a charter party contract. FIG. 8, then, depicts an exemplary forms database 52 which may be stored on network site 40 according to the present invention. The forms database 52 may store a plurality of forms for use by subscribers and the like, including charter party forms, standard riders and contract addenda. FIG. 9 depicts an exemplary preferences database 53 which may be stored on network site 40 according to the present invention. The preferences database 53 is operative to store user-defined preferences corresponding to each subscriber or user of the network site 40. Accordingly, the preference database 53 allows each user to determine and store, for example, which menus from menu system 1700 (FIG. 17) are to be presented upon login and the order in which the user wishes the fields to be presented. Other user preferences that may be applied will be apparent to one of ordinary skill in the art.

Figure 10:
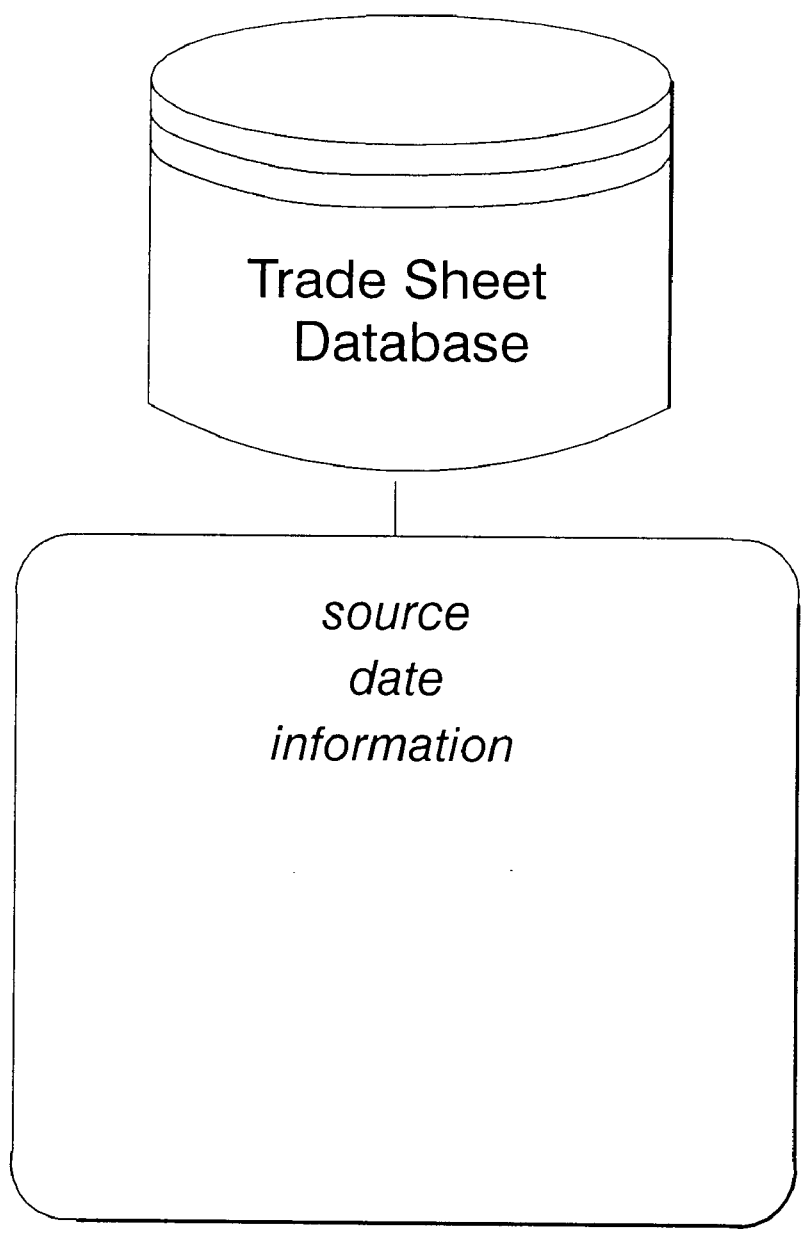
FIG. 10 is a representation of an exemplary trade sheet database stored by the network site of FIG. 2.

Trade sheets are commonly available in the chartering market. Trade sheets are published by charterers and contain standard elements of a charter party contract in negotiable form. Accordingly, it would be useful to post such trade sheets on the network site 40 for use by subscribers during negotiations. FIG. 10 thus depicts an exemplary trade sheet database 54 that may be stored on network site 40. The trade sheet database 54 may have exemplary fields for storing the source of the trade sheet (i.e., the company or party who published it), the date of the trade sheet and the information contained in each trade sheet.

Figure 11:
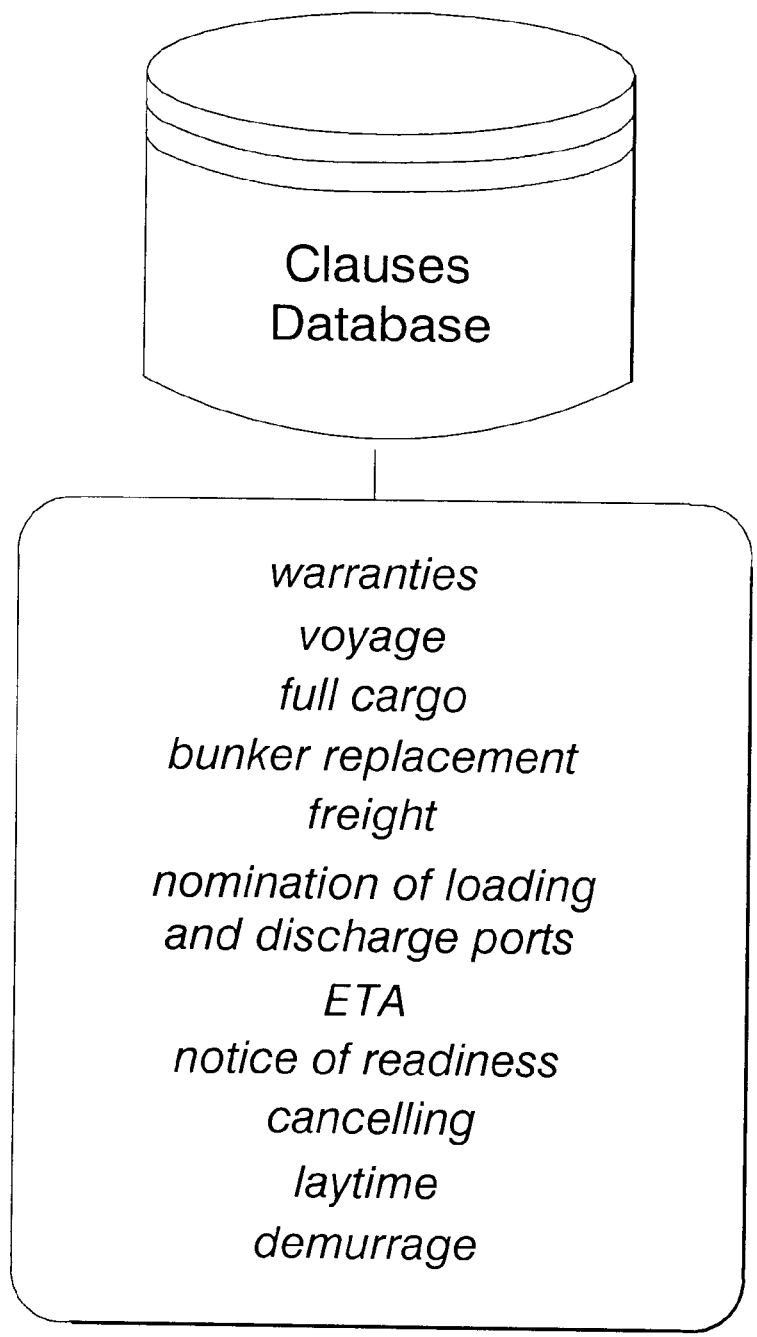
FIG. 11 is a representation of an exemplary clauses database stored by the network site of FIG. 2.

FIG. 11 depicts an exemplary clauses database 55 which may be stored on network site 40 according to the present invention. The clauses database 55 is operative to store a plurality of standard clauses such as are displayed in Part II of the sample Tanker Voyage Charter Party provided below. Accordingly, the clauses database 55 may have a plurality of fields for storing standard charter party clauses such as warranties, voyage requirements, full cargo clauses, bunker replacement clauses, freight, nomination of loading and discharge ports, estimated time of arrival, notice of readiness provisions, cancellations, laytime and demurrage. Other standard charter party clauses may likewise be stored.

Figure 12:
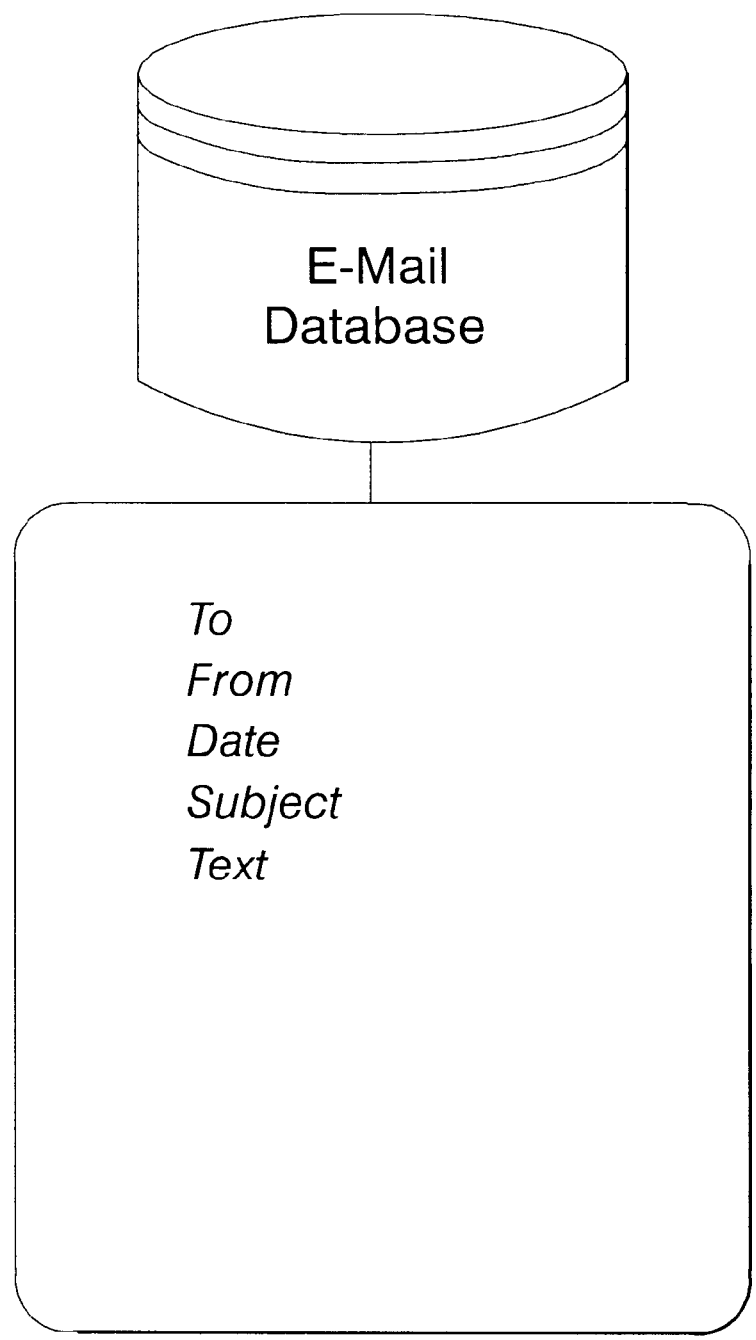
FIG. 12 is a representation of an exemplary e-mail database stored by the network site of FIG. 2.

There may be times when a user or subscriber may wish to contact the operator of the network site 40 or another subscriber. The most commonplace way for accomplishing this is through an electronic mail (e-mail) message. It is contemplated that the network site 40 will allow for interparty electronic communication. In order to keep a record of such communications, the network site 40 may maintain an e-mail database 56 as depicted in FIG. 12. The e-mail database 56 may include a plurality of fields including the party to whom the message was addressed, the party who sent the message, the date of the message, the subject line of the message and the text of the message. Messages may be stored for a predetermined amount of time, or my be deleted by the sending or receiving party at their discretion. In addition to e-mail, other types of electronic communication, such as facsimile or instant messaging may be employed.

Figure 13:
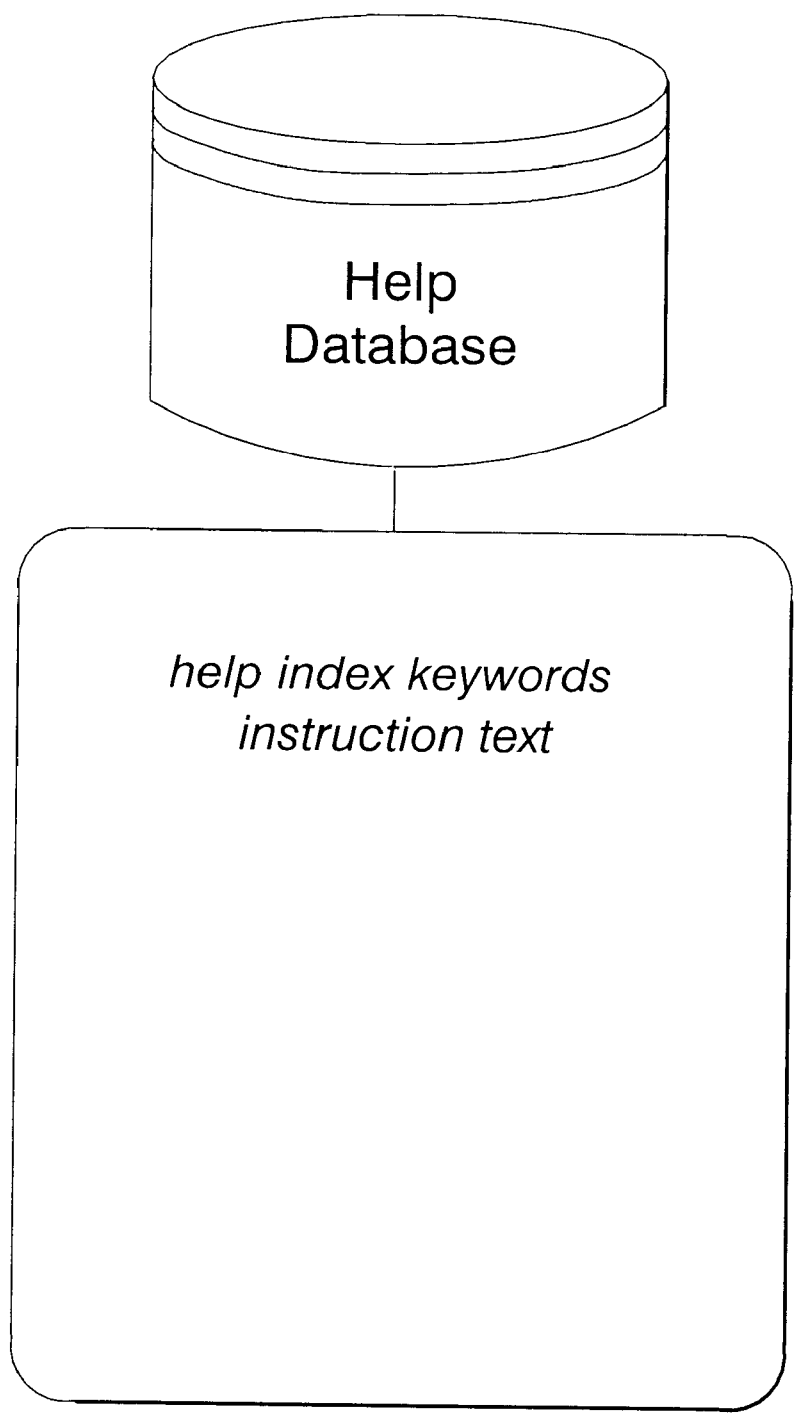
FIG. 13 is a representation of an exemplary help database stored by the network site of FIG. 2.

It is further contemplated that a user or subscriber of the network site 40 may need help to accomplish a desired function. Rather then sending a message to an operator or administrator of the network site 40, a help database 57, such as is depicted in FIG. 13 may be stored for access by users or subscribers of the system. Accordingly, the help database 57 may contain an index of searchable terms or keywords that a subscriber may review. The help database 57 may further contain text instructions that correspond to each keyword for assisting the subscriber in performing or completing a desired function.

Figure 14:
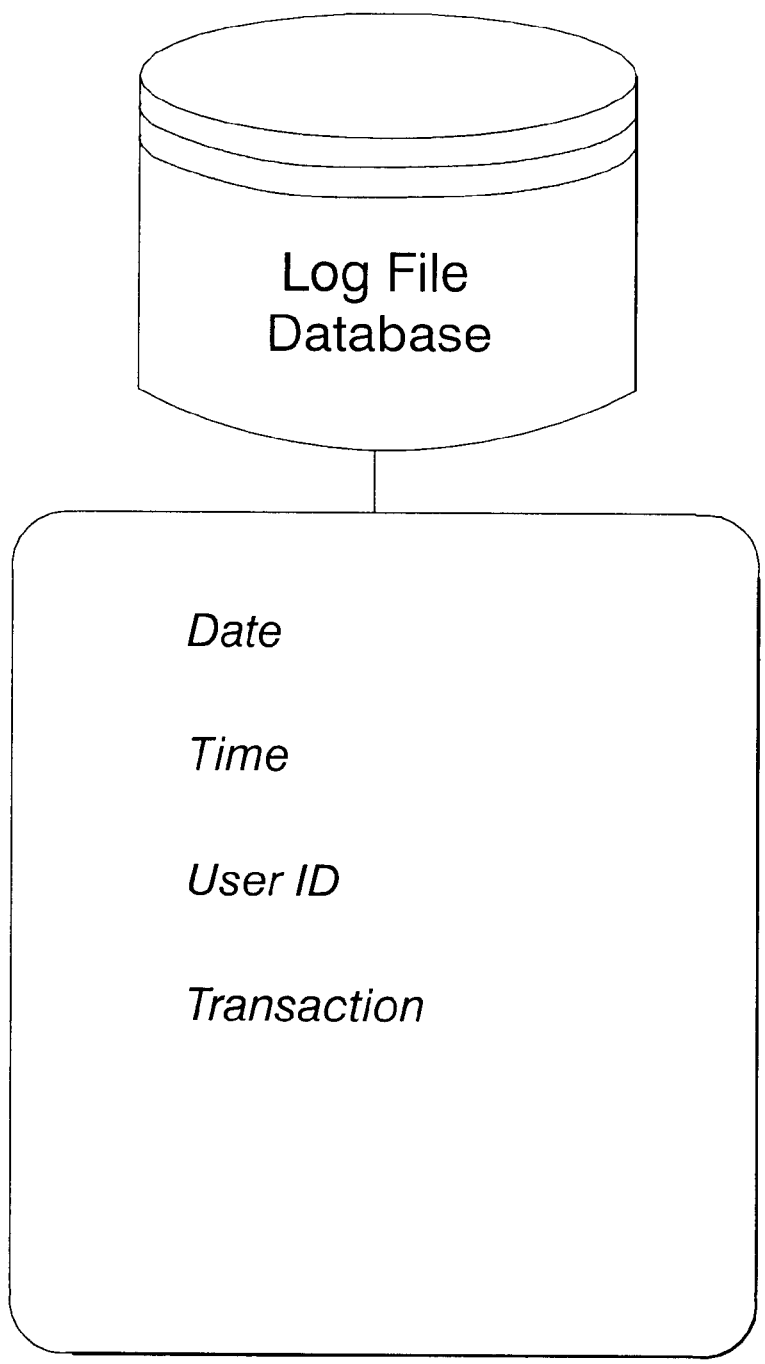
FIG. 14 is a representation of an exemplary log file database stored by the network site of FIG. 2.

FIG. 14 depicts an exemplary log file database 58 which may be stored on network site 40 according to the present invention. The log file database 58 is operative to store a record of transactions which take place on network 40. Such a database may be useful, for example, to reconstruct current data if the site 40 experiences a crash between backups. Accordingly, the log file database 58 may have a plurality of fields for storing the date and time of a transaction on the site 40, the user id of the user initiating the transaction and the type of transaction (i.e. a change in user preferences, the transmission of an offer, or any other transaction contemplated as being part of the present invention). Other data may likewise be stored in log file database 58.

Regarding the databases described above with respect to FIGS. 3–14, it should be noted that the illustrated databases may vary from the examples provided. For example, further or fewer fields may be provided, or databases may be combined, integrated or further sub-divided as will be appreciated by one of ordinary skill in the art. In addition, field titles may be altered from those presented above without impacting the spirit and scope of the present invention. Furthermore, alternative data structures, other than standard database formats, may be readily employed.

Figure 15:
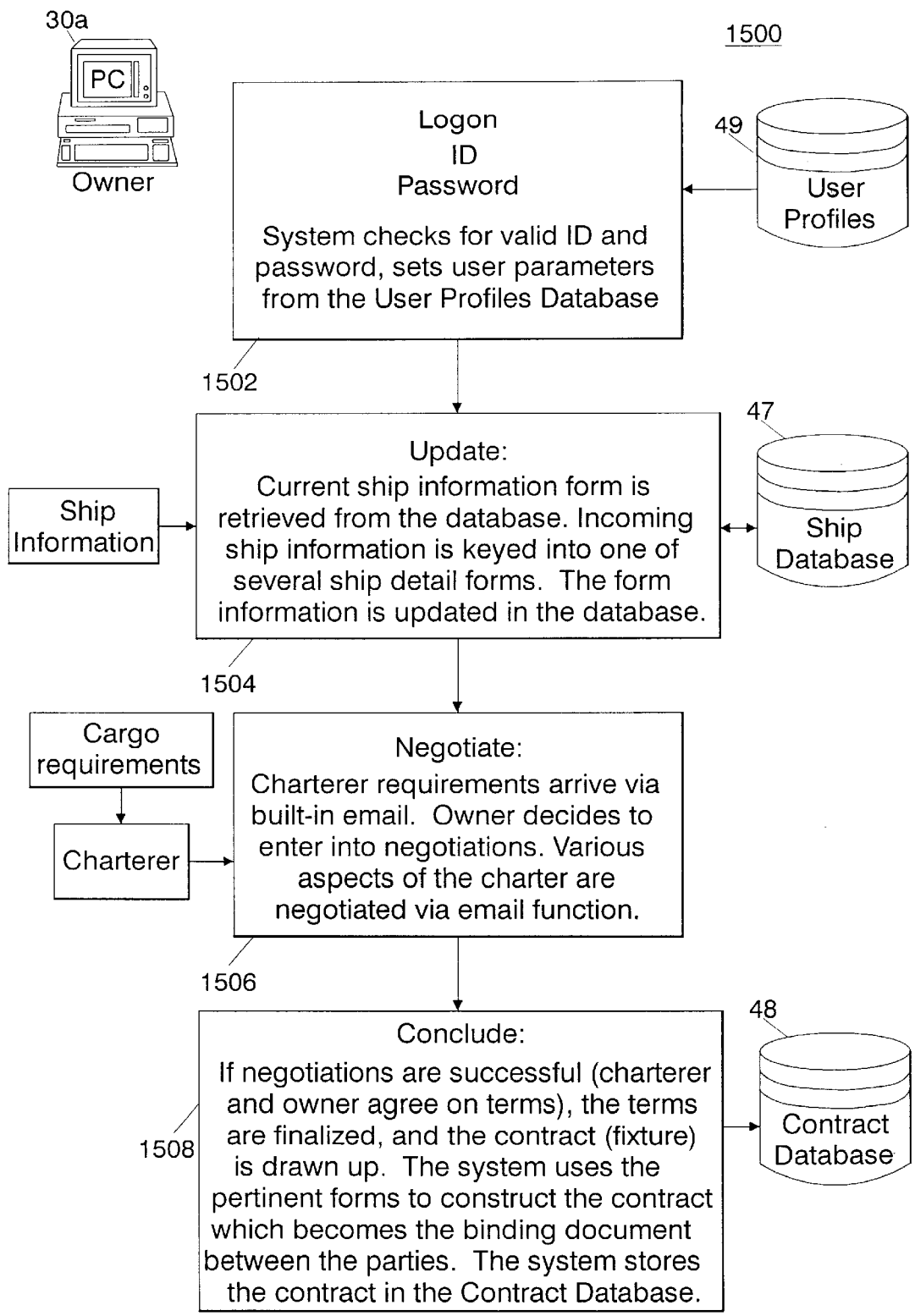
FIG. 15 is a flowchart representing exemplary steps performed by a ship owner for negotiating a fixture according to one embodiment of the present invention.

Turning now to FIG. 15, therein is depicted an exemplary process 1500 performed by a ship owner for negotiating a charter party contract. The process 1500 is initiated when a ship owner, using remote terminal 30a logs into the network site 40 (step 1502). The site 40 compares the entered login identification (i.d.) and password to those stored in the user profile database 49. If the i.d. and password are verified, the site 40 allows the ship owner to access various information including the ship owner's information stored in the ship database 47. The ship owner may then, for example, update particular ship information (step 1504) including, for example, a current position of the ship. The update may then be stored in the ship database 47 so that other subscribers may review it.

A charterer having cargo requirements which match the ship owner's ship information may then contact the ship owner, e.g. via e-mail, and enter negotiations for completing a charter party contract (step 1506). If the negotiations are successful both parties then finalize a charter party agreement and the system stores the contract in the contract database 48 (step 1508).

Figure 16:
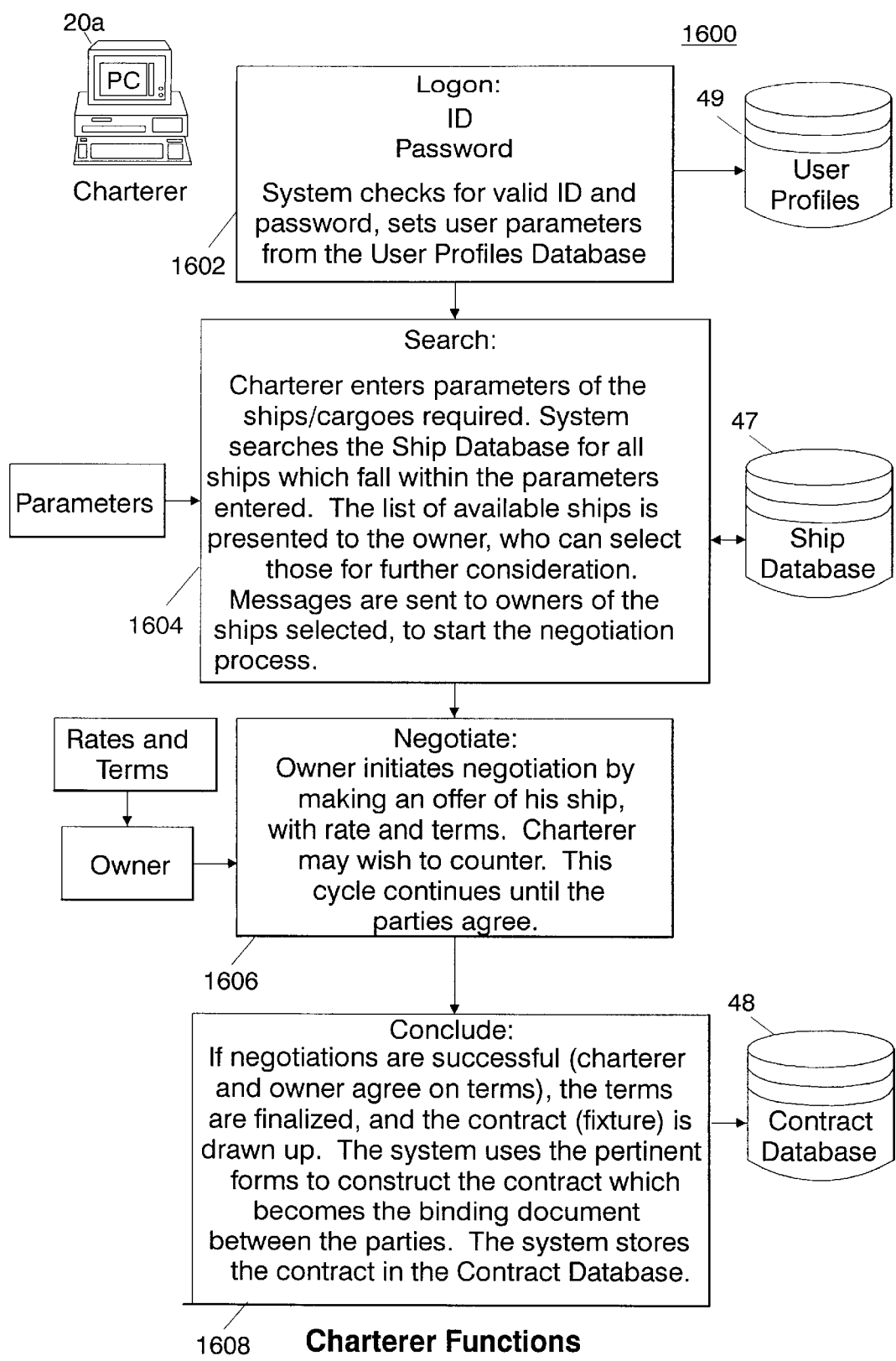
FIG. 16 is a flowchart representing exemplary steps performed by a charterer for negotiating a fixture according to one embodiment of the present invention.

Turning to FIG. 16, a therein is depicted an exemplary process 1600 performed by a charterer for negotiating a charter party contract with a ship owner. The process 1600 is initiated when a charterer, using remote terminal 20a, logs into the network site 40 (step 1602). The site 40 compares the entered login i.d. and password to those stored in the user profile database 49. If the i.d. and password are verified, the site 40 allows the charterer to access various information including searching ship and cargo data entered by a plurality of ship owners, which is stored in the ship database 47 (step 1604) including, for example, a current position of the ship, an availability of the ship and the like.

If the Charterer finds one or more suitable ships, he or she may send messages to the owners to begin negotiations. Also, the ship owner may review the parameters entered by the charterer and, if they match the ship owner's ship information, the ship owner may alternatively contact the charterer, e.g. via e-mail, and enter negotiations for completing a charter party contract (step 1606). If the negotiations are successful both parties then finalize a charter party agreement and the system stores the contract in the contract database 48 (step 1608).

Figure 17:
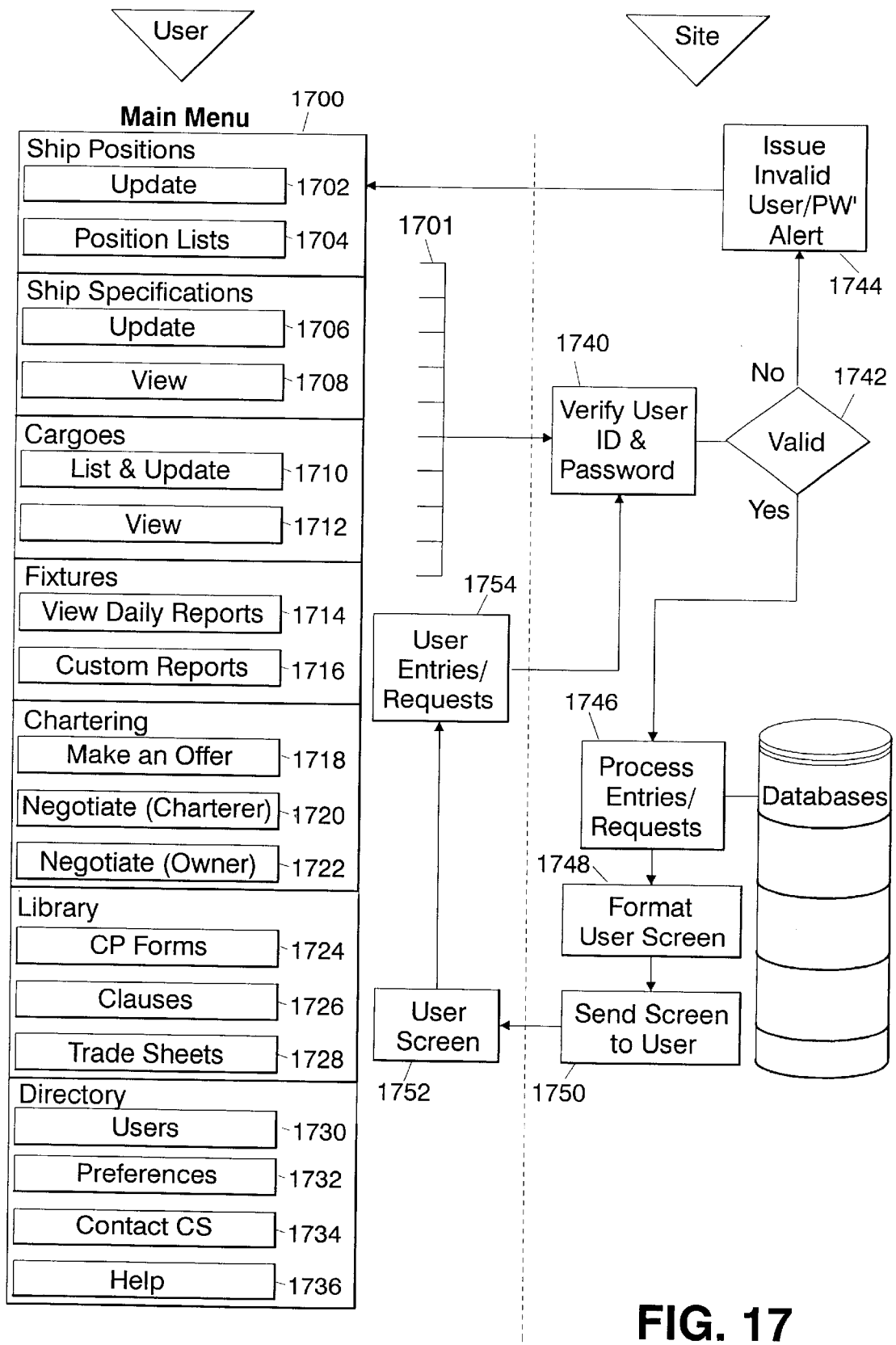
FIG. 17 is an exemplary set of main menu functions provided to a user of the network site of FIG. 2.
Figure 18:
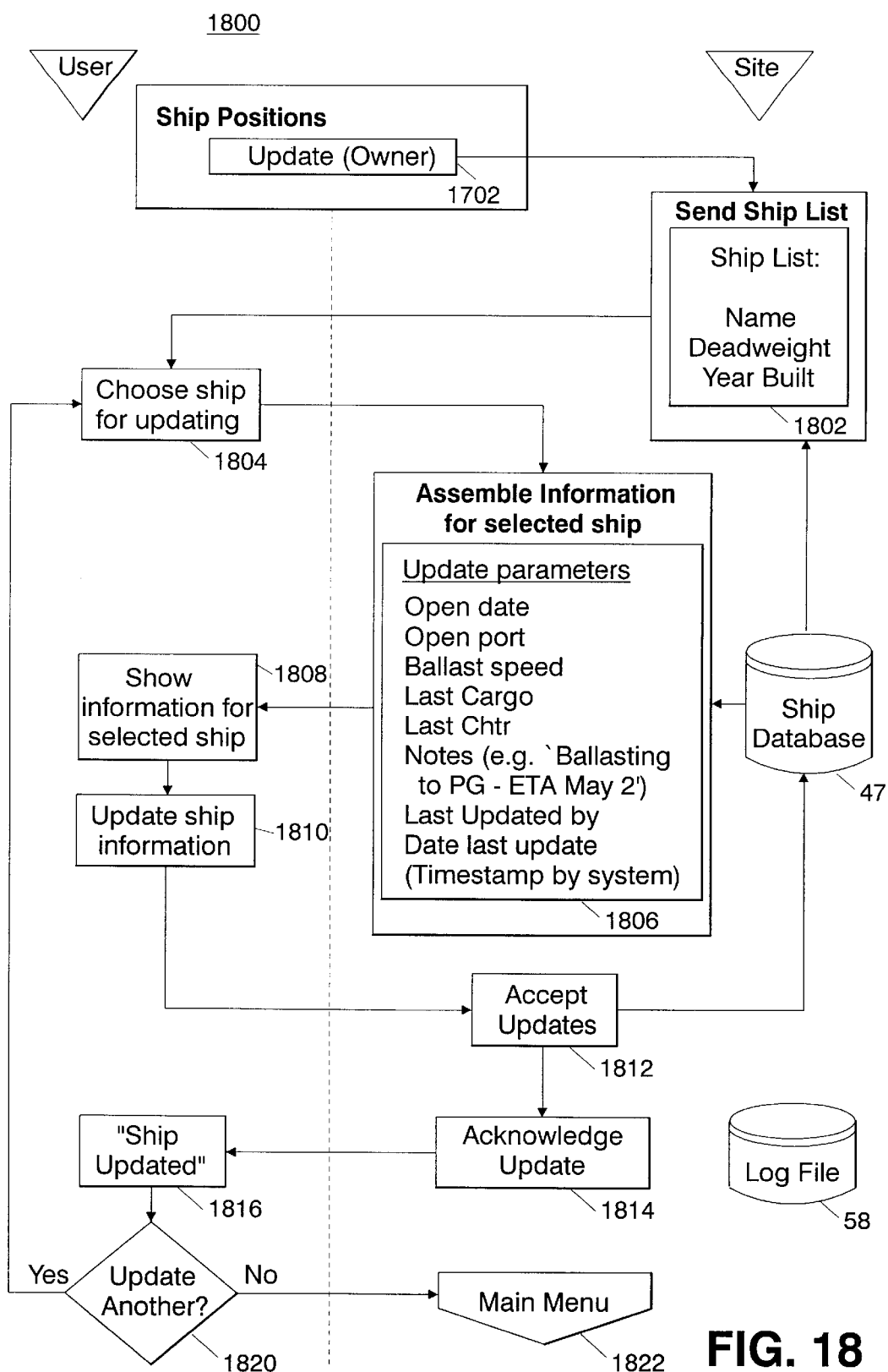
FIG. 18 is a flowchart representing exemplary steps performed by a ship owner for updating ship positions according to one embodiment of the present invention.
Figure 19A:
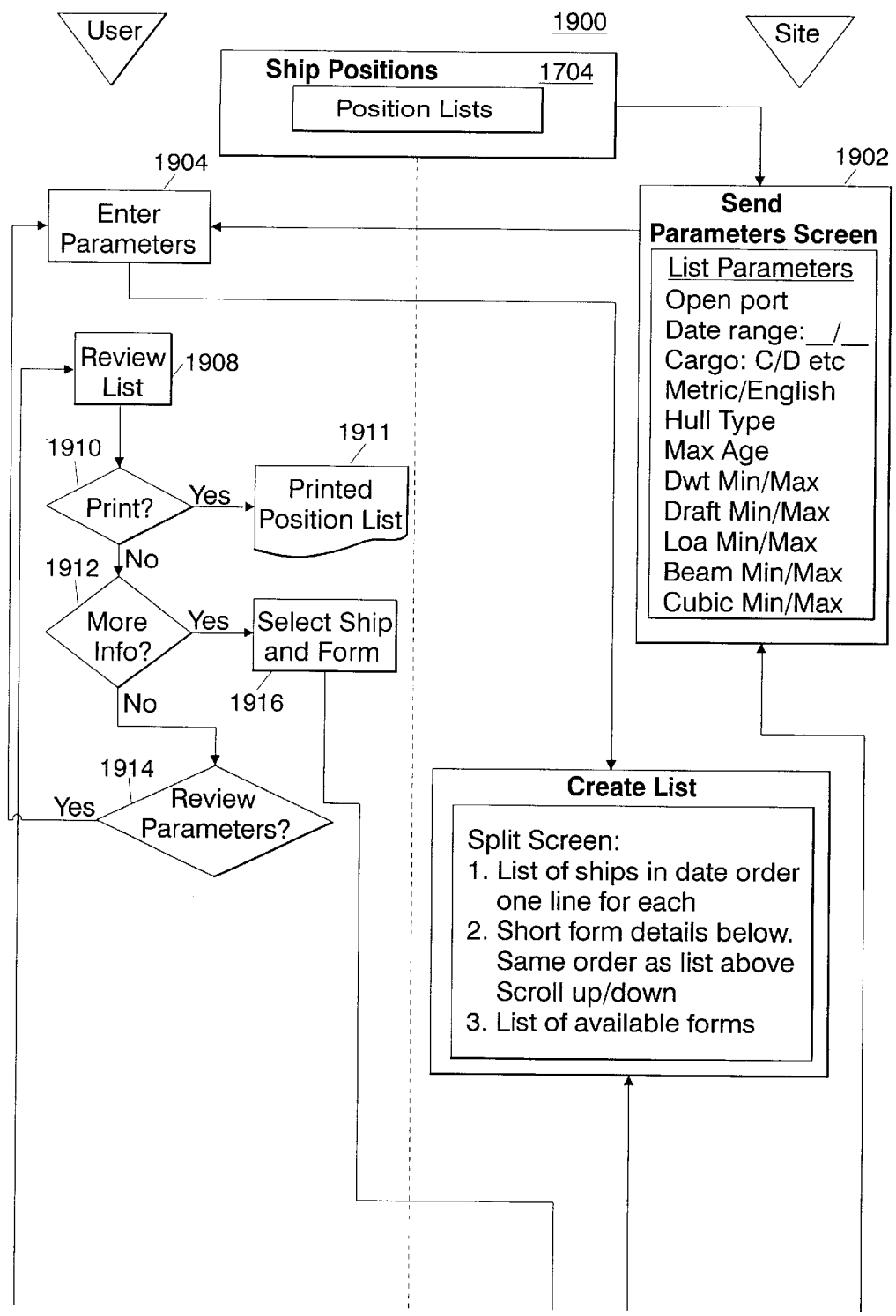
FIG. 19 is a flowchart representing exemplary steps performed by a user for accessing a ship position list according to one embodiment of the present invention.
Figure 19B:
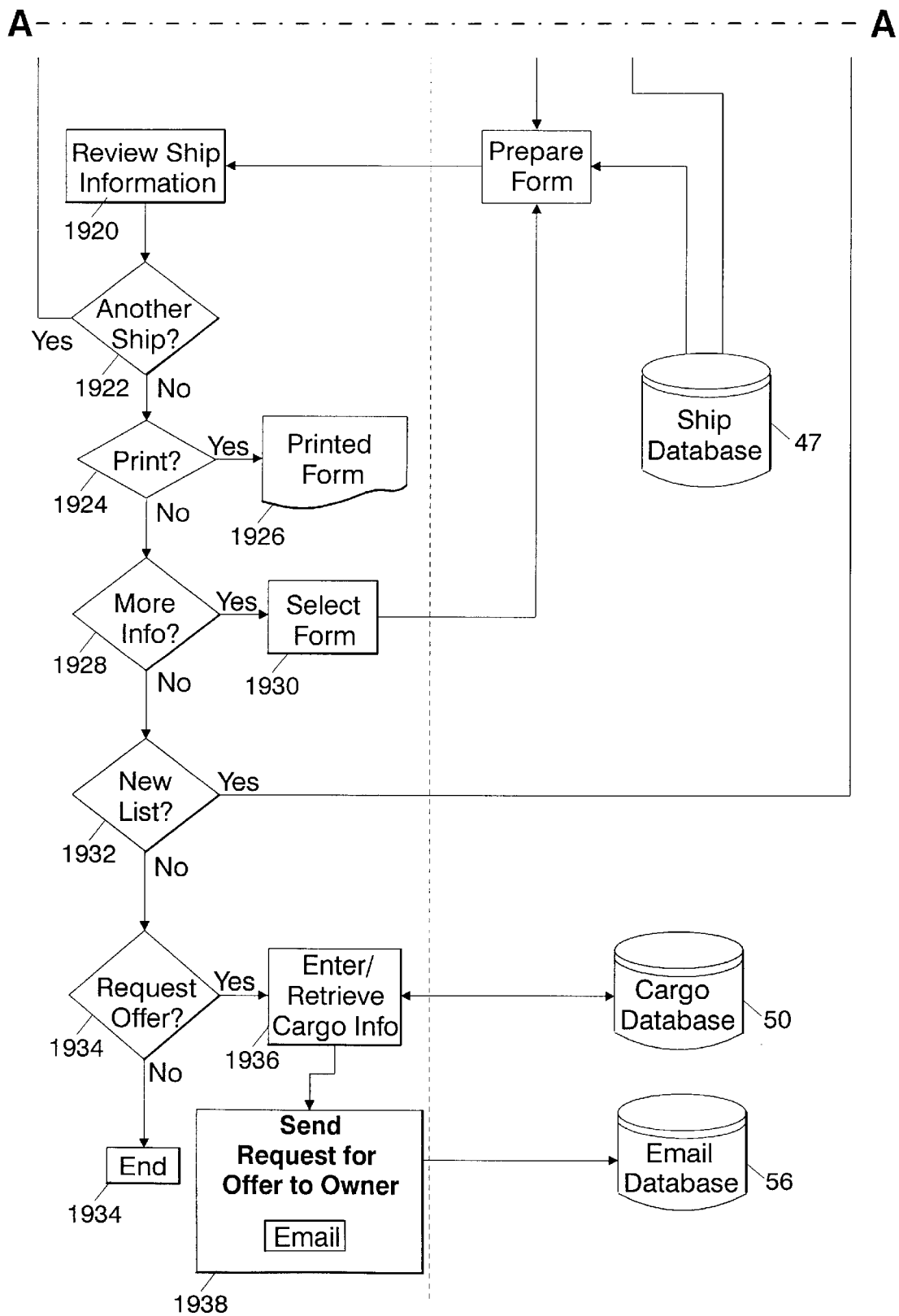

FIG. 17 displays a list of main menu functions 1702–1736 which may be available in a system of the present invention and which are each described in further detail below with respect to FIGS. 18–35. For each process depicted in FIGS. 17–35, it should be noted that steps on the left portion of each flowchart may be performed by users or subscribers accessing the system. Additionally, the steps on the right portion of the flowcharts may be performed by the network site 40. It is contemplated that in order to access the main menu features of the system of the present invention, a user may be required to enter a valid user identification and password. It is further contemplated that in order to access certain of the functions, the user i.d. and password must be re-entered each time that function is requested. An exemplary process 1701 for re-entering the user i.d. and password is therefore presented in FIG. 17.

The process 1701 begins when a user requests a particular function, for example, a request to update ship specifications 1706, to view ship specifications 1708, to list and update cargos 1710 and to view available cargoes 1712. After one of the designated functions has been requested, the system requires the user to enter the user's i.d. and password (step 1740). The system then verifies that the entered i.d. and password are valid (step 1742). If the i.d. and/or the password are invalid, the system presents an "invalid user/password" message to the user (step 1744) and the user is returned to the main menu. If the entered i.d. and password are valid, the system processes the requested function (step 1746), formats a screen display corresponding to the request (step 1748) and transmits the screen presentation data to the user's remote terminal (step 1750). The user may then view the screen containing the requested information (step 1752). If the user requests further functions which require the re-entry of an i.d. and password (step 1754), then process 1701 returns to step 1740, discussed above. Otherwise, process 1701 ends.

A first process 1800 available to users of the system of the present invention, allows ship owners to update ship positions by selecting the "update ship position function" 1702. Upon actuating a virtual button corresponding to function 1702, which is presented on the main menu 1700 of the user's display, the system sends a ship list corresponding to one or more ships owned or operated by the owner (step 1802). The ship list may include ship names, the deadweight of each ship and the year each ship was built. The owner than selects a ship for updating by designating one of the ships on the list (step 1804). The system then accesses the ship database 47 and retrieves current ship parameters, such as the next date the ship is available, the next port where the ship will be available, the ship's ballast speed, the ship's last cargo, the ship's last charterer, the last update to information for the ship, etc (step 1806). The information is then displayed to the ship owner (step 1808).

The ship owner may then update the desired ship information by entering the update data into a remote terminal 30 and transmitting the same to the network site 40 (step 1810). The site 40 then stores the new data in the appropriate fields of ship database 47 (step 1812), and transmits an acknowledgment of the update to the ship owner (step 1814), which is displayed on the ship owners remote terminal (step 1816). A record of the update may further be stored in the log file.

The system then presents to the owner the option of updating another ship (step 1820). If the ship owner wishes to update another ship, the process 1800 returns to step 1804, described above. If the ship owner indicates that there are no other ships that are to be updated, process 1800 ends and the ship owner is returned to the main menu 1700 (step 1822). Process 1800 may be used to add a new ship as well as to update current ships stored by the system.

A user of the system of the present invention may also select a 'position list' function 1704 which will display ships having designated parameters to the user. A process 1900 for presenting such information starts when the user activates a virtual button which corresponds to the function (step 1704). A screen for entering particular ship parameters is then transmitted to the user (step 1902). The user may then enter ship parameters which define the type of ship in which the user is interested (step 1904). Such parameters may include the ship's next open port, the date range in which the ship is needed, the cargo type, hull type, maximum age, as well as minimum or maximum values for ship deadweight, draft, overall length, beam and cubic capacity. The system then compares the entered parameters to values stored in the ship database 47 (step 1906). The system then generates a list of ships matching the entered criteria and presents it to the user for review (step 1908). The user is then given the option to print the ship list (step 1910). If the user indicates that the list is to be printed, the list is then printed, for example on printer 21, 31 which is in communication with the user terminal 20,30 as shown in FIG. 1. If the user does not wish to print the ship list, the process 1900 continues to step 1912, where the user may select more information for a particular ship. If the user wishes to view more information for a particular ship the process 1900 continues to step 1916, discussed below. If, however, the user does not select more information for a particular ship, the process 1900 continues to step 1914, where the user may revise the previously entered ship parameters. If the user wishes to revise entered ship parameters, process 1900 returns to step 1904, described above. Otherwise, the process 1900 ends.

At step 1916, the user may select a ship for which more information is to be presented. The system prepares a form to display the further ship information by accessing the ship database 47 and transmitting the form with the completed information to the user (step 1918). The user may then review the further ship information (step 1920). The system then inquires whether the user wishes to view more ship information for another ship (step 1922). If so, the process 1900 returns to step 1908, described above. Otherwise, the process 1900 continues to step 1924, where the user is asked whether the further ship information is to be printed. If the user wishes to print the further ship information, the user directs the information to be printed (step 1926).

If the user does not wish to print the further information, the process 1900 continues to step 1928 where the user can specify that more specific information be presented on the subject ship, if available. If there is more information to present and the user wishes to heave it displayed, the user selects the form corresponding to the desired information (step 1930) and the process returns to step 1918, discussed above. If the user does not wish to have more information presented, the process continues to step 1932. At step 1932, the user is presented with the option to receive a new list of ships. If the user wishes to view a new list of ships, the process 1900 returns to step 1902, otherwise the process 1900 continues to step 1934.

At step 1934, if the user finds an acceptable ship, he may start negotiations by requesting that an offer be made by the ship owner to transport desired cargo. The cargo information is entered (step 1936), designated as public or private information, and stored in the cargo database 50. Then the request for an offer is preferably transmitted to the owner of the ship (step 1938), preferably via e-mail, and the communication may then be stored in e-mail database 56. If, on the other hand, the user at step 1934 does not wish to enter a request for an offer, process 1900 ends.

Figure 20:
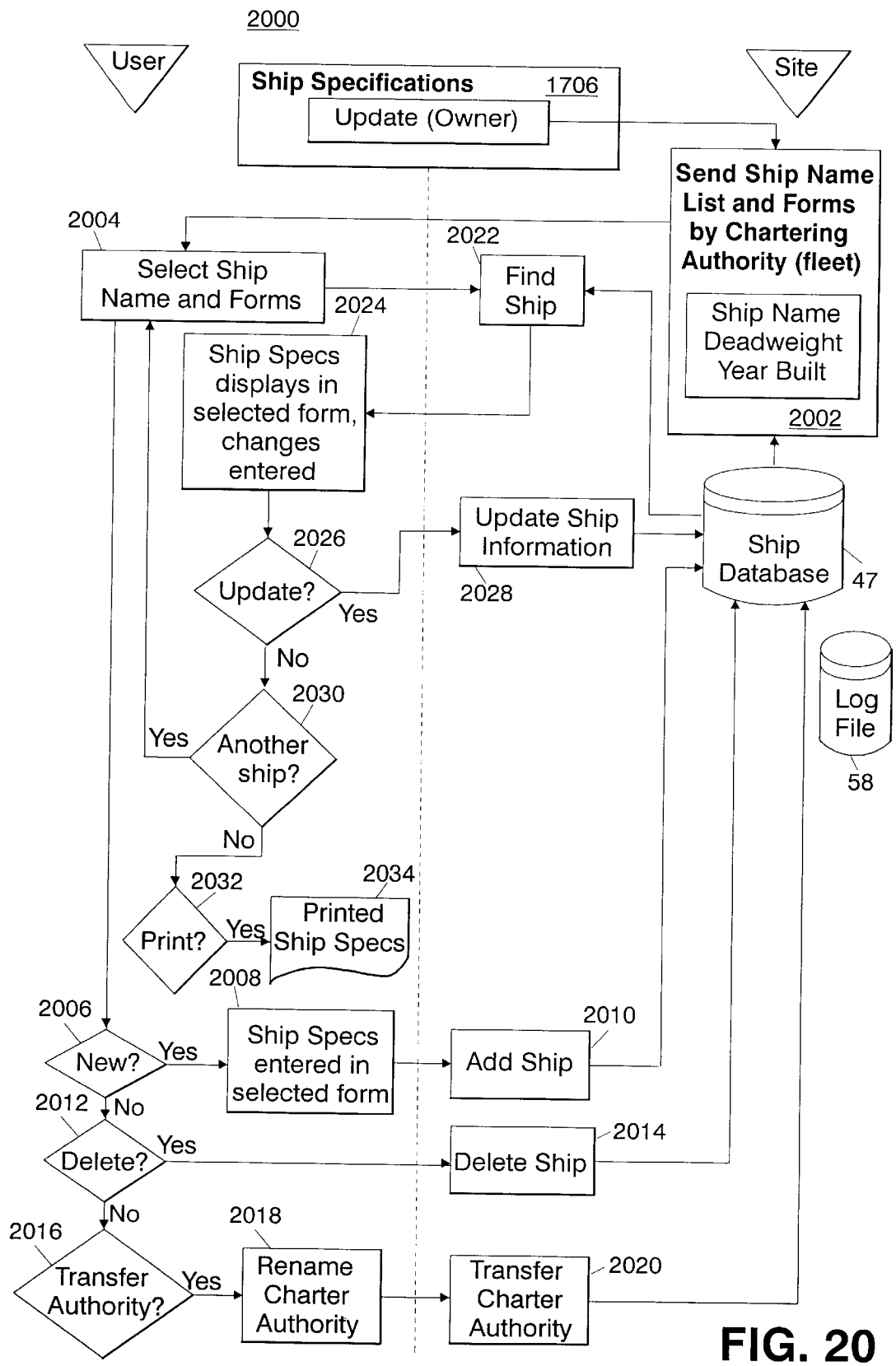
FIG. 20 is a flowchart representing exemplary steps performed by a ship owner for updating ship specifications according to one embodiment of the present invention.

Turning now to FIG. 20, therein is depicted an exemplary process 2000 for allowing a ship owner to update ship specifications. An "update ship specifications" button 1702 may be provided on the main menu 1700. Upon activation of the button 1706, the system executes an exemplary process 2000 for updating stored ship specifications. The process 2000 begins where the list of all ship owned by the owner is retrieved from the ship database 47 and transmitted to the ship owner (step 2002). The ship owner may then select a ship and a form or template corresponding to the information that is to be added, deleted, transferred or updated (step 2004). If information is to be updated, the process 2000 continues to step 2022. Otherwise, the process continues to step 2006, discussed further hereinbelow.

At step 2022, the system receives a description of the ship from the ship owner and retrieves the record corresponding to that ship from the ship database 47. The currently stored information is transmitted to the ship owner and presented in a predefined form (step 2024). The ship owner may then select whether the information is to be updated (step 2026). If so, the updated ship information is entered by the ship owner and transmitted to the system for storing in the ship database 47 (step 2028). After the information has been updated, or if the ship owner does not wish to update the ship information, the process 2000 continues to step 2030, where the owner has the option of selecting another ship to update.

If the owner wishes to update another ship, the process 2000 returns to step 2004 discussed above. Otherwise the process 2000 continues to step 2032, where the owner is asked whether the ship information is to be printed (step 2032). If so, the process 2000 continues to step 2034 where the information is printed. Otherwise, the process 2000 ends.

If the ship owner instead requests to add or delete a ship, process 2000 continues to step 2006 from step 2004. The ship owner is first asked whether a new ship is to be added. If so, the process 2000 continues to step 2008 where the new ship specifications are entered by the ship owner. The new ship information is then added to the ship database 47 (step 2010). If instead, the ship owner wishes to delete a ship, the process 2000 continues to step 2012 from step 2006. The ship owner selects the ship to be deleted (step 2014) and the ship information is removed from the ship database 47.

If the user does not wish to delete a ship, then process 2000 continues to step 2016, where the user may change the ship data to reflect that a new owner or charter authority controls the ship. The name of the new owner or authority is entered at step 2018 and transmitted to the system for storage in the ship database 47 (step 2020).

The transaction between the ship owner and the system in which updates, transfers, additions or deletions to the ship database 47 may be recorded in a log file as discussed above.

Figure 21:
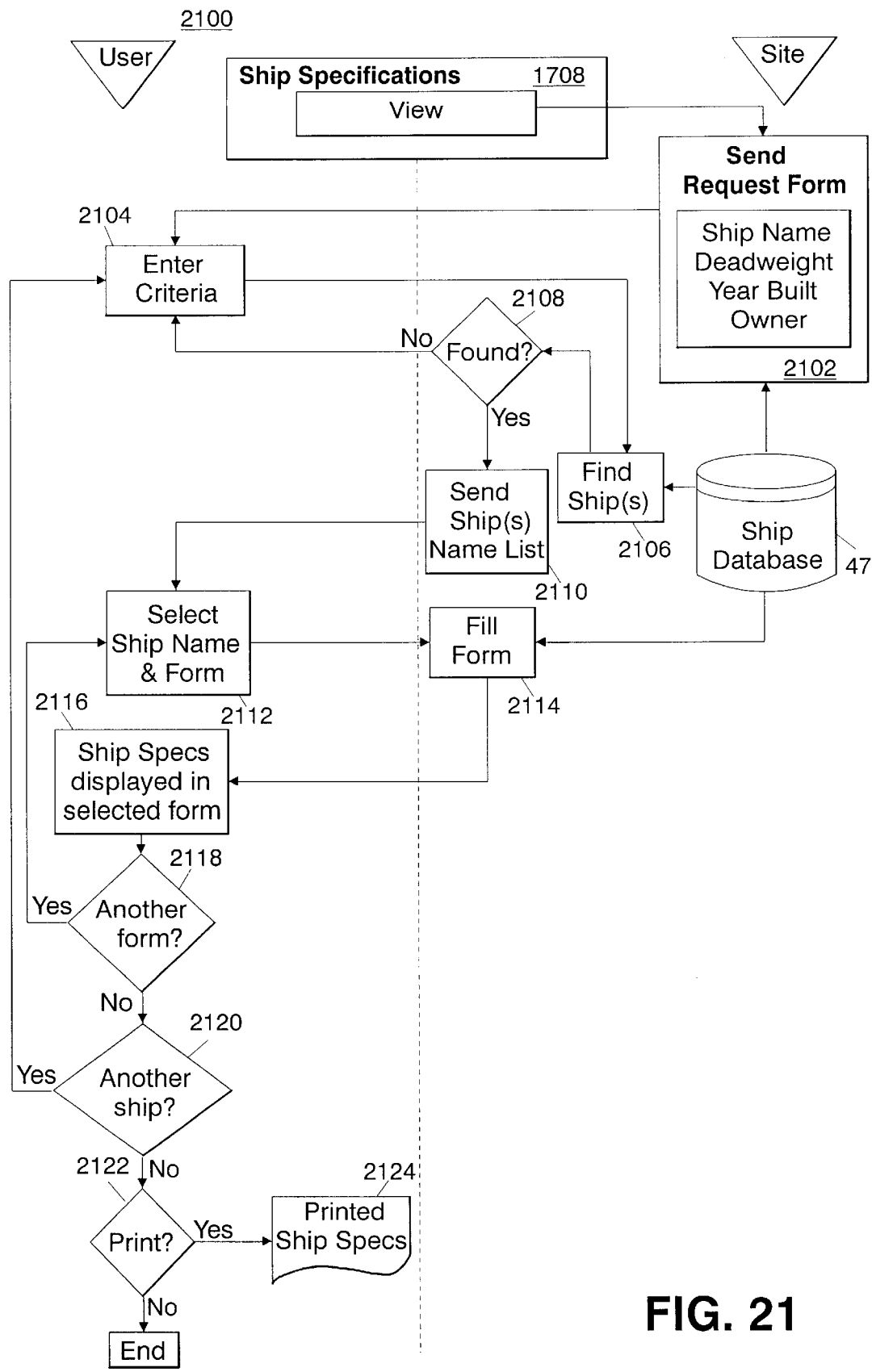
FIG. 21 is a flowchart representing exemplary steps performed by a user for viewing ship specifications according to one embodiment of the present invention.

Referring now to FIG. 21, therein is depicted an exemplary process 2100 for allowing a user to view various ship specifications for a ship already known to the user. A "view ship specifications" button 1708 may be provided on the main menu 1700 for selecting this function. Upon activation of the button 1708, the system initiates the process 2100.

The process 2100 begins where a request form to be completed by the user is transmitted to the user's remote terminal 20, 30 (step 2102). The user enters the desired ship criteria into the appropriate places on the form (step 2104). Such criteria may include a ship's name, deadweight, the year it was built, the owner, or any other particular ship data. The system uses the entered criteria to retrieve the corresponding ship data from the ship database 47 (step 2106). If the ship data is found (step 2108), the process continues to step 2110 below. Otherwise, the process returns to step 2104 where the user is requested to enter new data.

At step 2110, a list of one or more ships that match the entered criteria are transmitted to the user. The user may then select the desired ship and a form containing the data in which the user is interested in reviewing (step 2112). The system then fills in the form information from data stored in the ship database 47 (step 2114) and transmits the data for display on the user terminal (step 2116).

The process 2100 continues to step 2118 where the user is presented with the option of selecting another form containing further ship data. If the user wishes to view further forms of data, the process 2100 returns to step 2112 above. Otherwise, the process continues to step 2120.

At step 2120, the user is presented with the option to review ship specifications for another ship. If the user decides to view ship data for another ship, the process returns to step 2104 above. Otherwise, the process continues to step 2122, where the user is presented with the option of printing the data. If the user so chooses, the retrieved data may be printed (step 2124). Otherwise the process 2100 ends.

Figure 22:
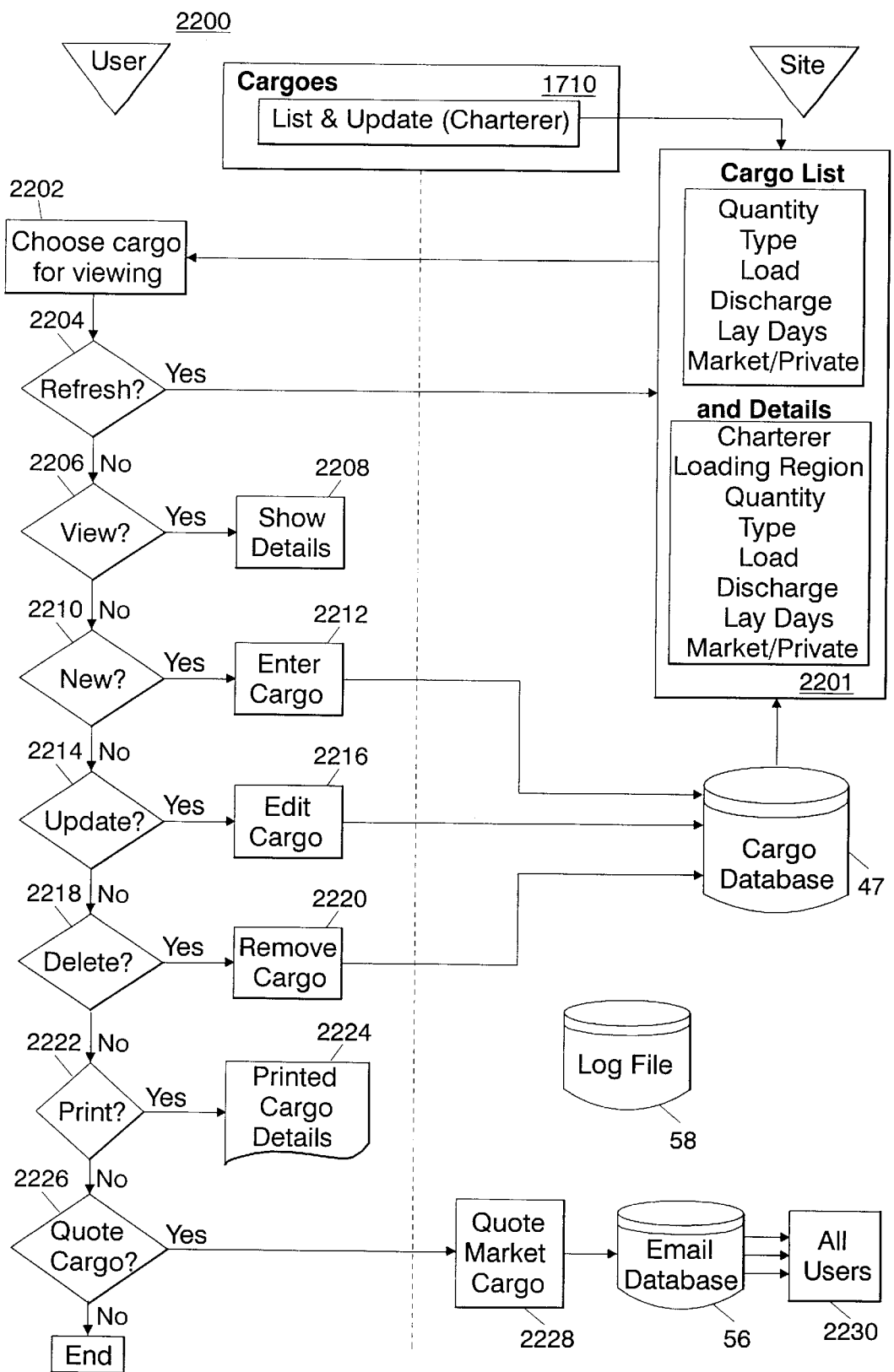
FIG. 22 is a flowchart representing exemplary steps performed by a charterer for listing and updating cargo according to one embodiment of the present invention.

Turning now to FIG. 22, depicted therein is an exemplary process 2200 for allowing a charterer to list and update available cargoes. A "list and update cargo" button 1710 may be provided on the main menu 1700 for selecting this function. Upon activation of the button 1710, the system executes the process 2200 which begins at step 2201 where a list of available cargoes is retrieved from the cargo database 50 and transmitted to the charterer.

The charterer may choose a particular cargo for viewing (step 2202). It is contemplated that cargoes entered into the system may be of two types, public or private. A public cargo is available for viewing by all users of the system. A private cargo, on the other hand, is entered and stored in cargo database 50, but may only be viewed by ship owners or other users designated by the party who entered the cargo data.

After a cargo has been presented, the charterer may periodically refresh the screen display to confirm that no new data has been entered for the cargo (step 2204). The cargo listing may then be viewed in detail (steps 2206 and 2208).

At step 2210, the charterer is asked whether he or she wishes to enter new cargo data. If so, the cargo data is entered at step 2212 and stored in the cargo database 50. Otherwise, the process continues to step 2214.

At step 2214, the charterer is asked whether he or she wishes to update existing cargo data. Only data originally entered by the charterer may be updated. If the charterer wishes to update any data, the update is entered at step 2216 and stored in the cargo database 50. Otherwise the process continues to step 2218.

At step 2218, the charterer is asked whether he or she wishes to delete existing cargo data. Only data originally entered by the charterer may be deleted. If the charterer wishes to delete any data, the request is executed at step 2220 and removed from the cargo database 50. Otherwise the process continues to step 2222.

At step 2222, the charterer is asked whether he or she wishes to print any of the displayed cargo data. If so, the cargo data is printed at step 2224. Otherwise the process continues to step 2226.

At step 2226, the charterer is asked whether he or she wishes to quote particular cargo data to other users. Only data originally entered by the charterer may be quoted. If so, the quote is received by the system (step 2228) stored in the e-mail database 56 and communicated, preferably by e-mail, to other subscribers of the system (step 2230), after which process 2200 ends.

Figure 23:
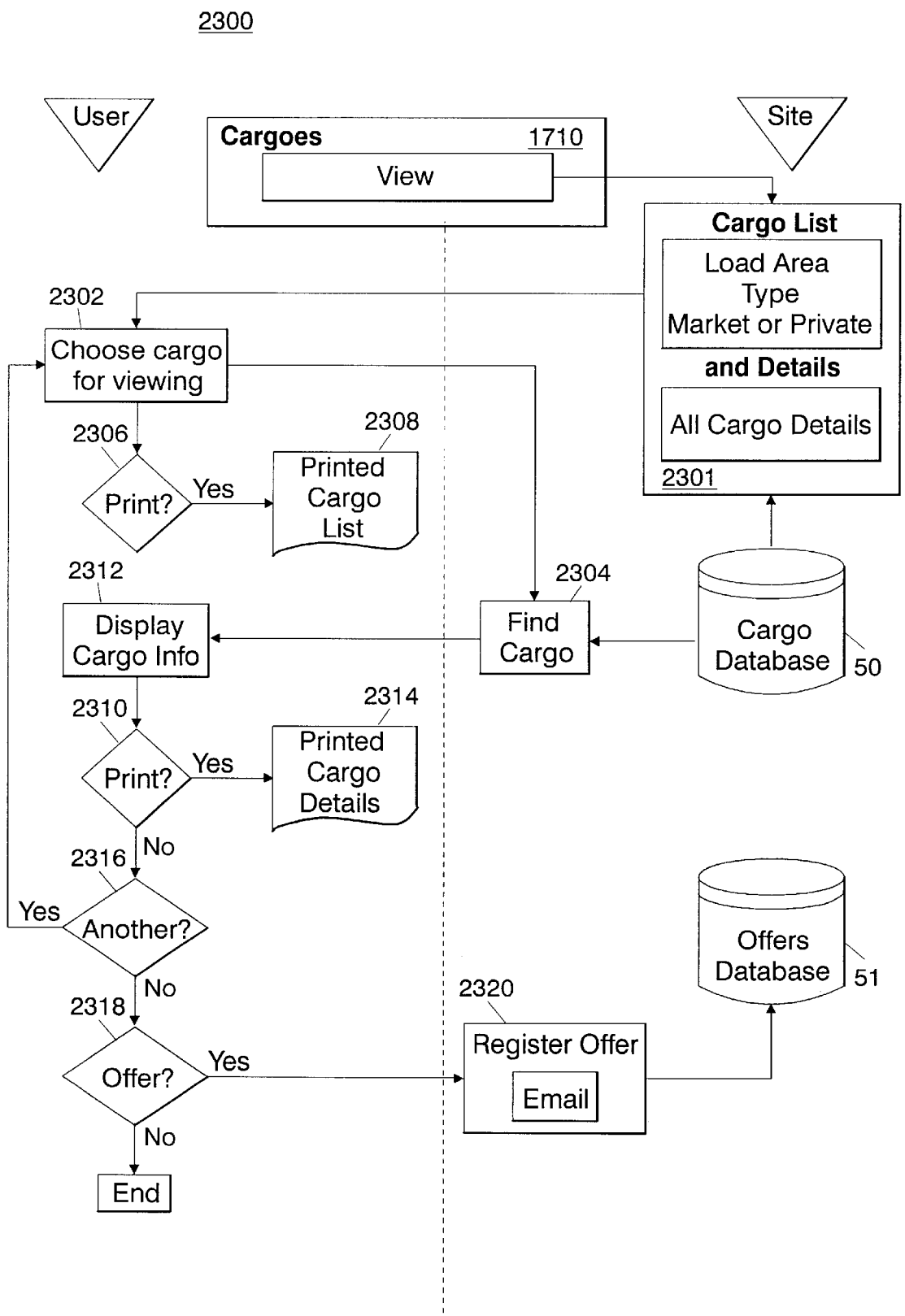
FIG. 23 is a flowchart representing exemplary steps performed by a user for viewing listed cargo according to one embodiment of the present invention.

Referring now to FIG. 23, there is depicted an exemplary process 2300 for allowing a user to view available cargoes. A "view cargo" button 1712 may be provided on the main menu 1700 for selecting this function. Upon activation of the button 1712, the system executes the process 2300 which begins at step 2301 where a list of available cargoes is retrieved from the cargo database 50 and transmitted to the user.

The user may then select a particular cargo from the list for viewing (step 2302). The user may search for cargo meeting certain criteria by entering a search request (step 2304). The system compares the request to data stored within the cargo database 50 and presents any returns to the user at step 2310, described below.

If, however, the user selects a cargo from the list presented, the user is then asked whether the listing should be printed (step 2306). If so, the selected cargo is printed at step 2308. Otherwise, the process 2300 continues to step 2310.

At step 2310, particular information corresponding to the cargo is presented to the user in a predefined format. The system then inquires whether the user would like to print the displayed cargo (step 2312) and if so, the listing is printed at step 2314. Otherwise, the process 2300 continues to step 2316.

At step 2316, the system inquires whether the user would like to select another cargo listing. If so, the process returns to step 2302, described above. Otherwise, the process 2300 continues to step 2318.

At step 2318, the user is asked whether they would like to place an offer on the cargo. If so, the offer is accepted and sent, preferably via e-mail, to the user who posted the cargo (step 2320). The terms of the offer may be parsed and stored in the offers database 51. If the user does not wish to transmit an offer, the process 2300 ends.

Figure 24:
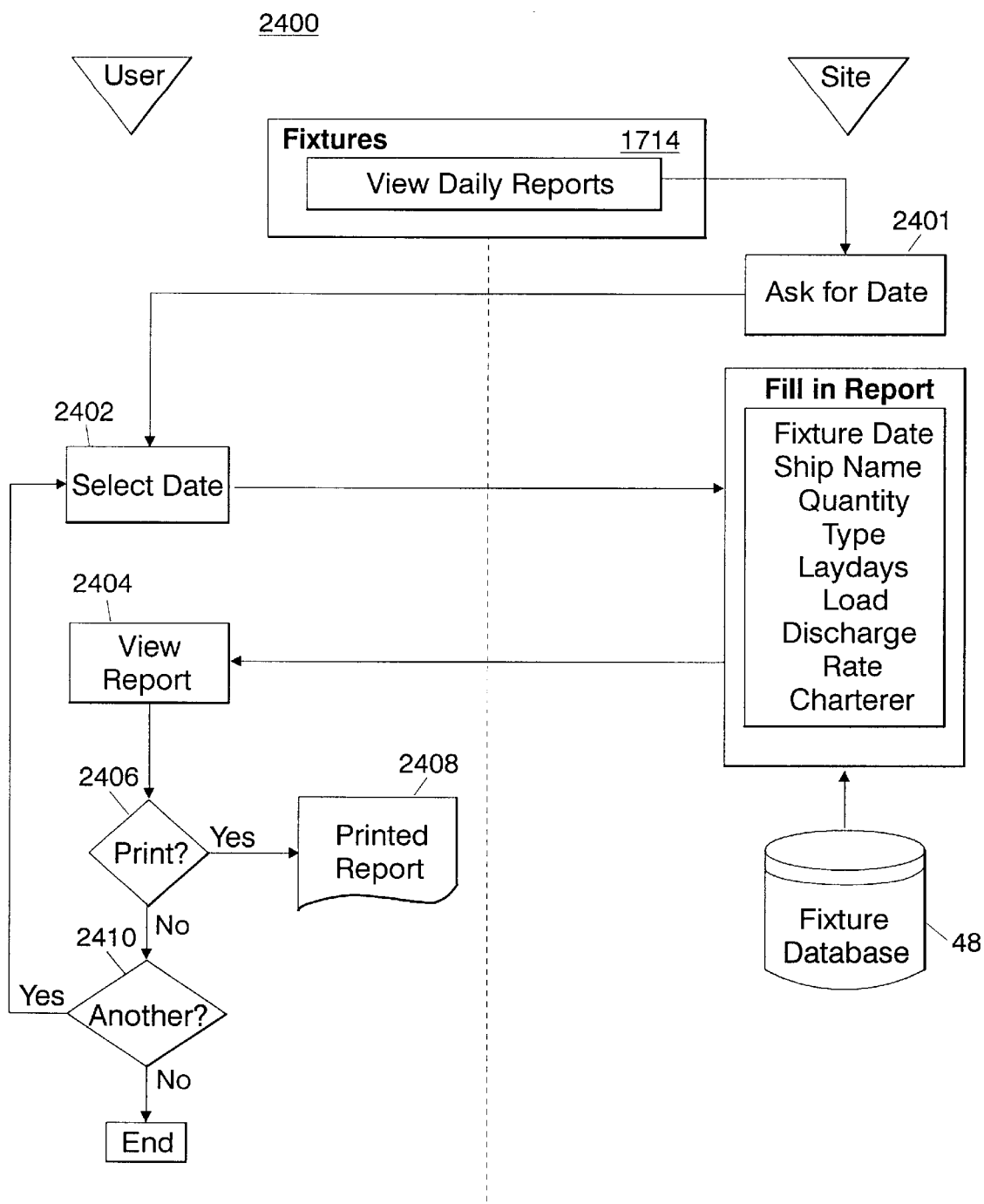
FIG. 24 is a flowchart representing exemplary steps performed by a user for generating and viewing a daily fixture report according to one embodiment of the present invention.

Turning now to FIG. 24, there is depicted an exemplary process 2400 for allowing a user to review information from previously-stored fixtures or charter party contracts based on the date of each fixture. A "view fixtures" button 1714 may be provided on the main menu 1700 for selecting this function. Upon activation of the button 1714, the system executes the process 2400 which begins at step 2401 where the system asks the user to specify a date or a date range of entered fixtures to view. The user then inputs the desired data or date range (step 2402). The system then refers to the fixture database 48 and retrieves data for all fixtures meeting the criteria and the results are transmitted to the user in a predefined format (step 2404).

Continuing to step 2406, the system inquires whether the user wishes to print any or all of the retrieved data. If so, the process 2400 continues to step 2408 where a report of the fixture data is printed. Otherwise, the process 2400 continues to step 2410.

At step 2410, the system inquires whether the user wishes to review other fixture data. If so, the process 2400 returns to step 2402, discussed above. Otherwise, the process 2400 ends.

Figure 25:
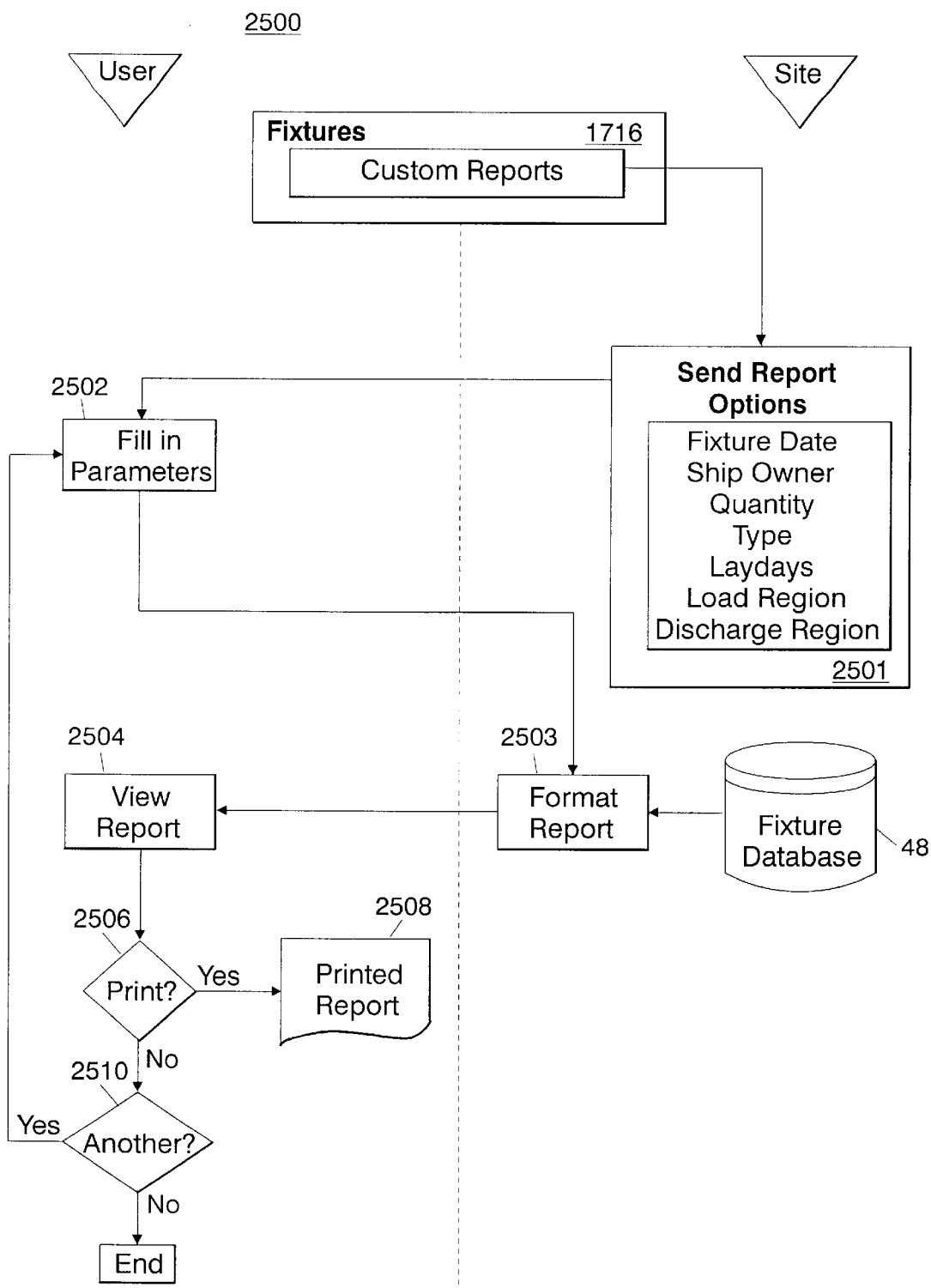
FIG. 25 is a flowchart representing exemplary steps performed by a user for generating and viewing a custom fixture report according to one embodiment of the present invention.

Similar to process 2400 above, it is contemplated that the system of the present invention will include a custom report feature wherein fixtures having certain characteristics, such as type of cargo, or involving certain parties, may be searched and presented. Referring now to FIG. 25, therein is depicted an exemplary process 2500 for searching the fixture database 48 based on features other than the date. A "custom fixture report" button 1716 may be provided on the main menu 1700 for selecting this function. Upon activation of the button 1716, the system executes the process 2500 which begins at step 2501 where a list of available search fields related to the cargo database 50 is presented to the user. The user may then input the desired fixture criteria (step 2502). Next, the system refers to the fixture database 48 and retrieves data for all fixtures meeting the criteria. The system assembles the returned data in a predefined format (step 2503) and the results are transmitted to the user (step 2504).

Continuing to step 2506, the system inquires whether the user wishes to print any or all of the retrieved data. If so, the process 2500 continues to step 2508 where a report of the fixture data is printed. Otherwise, the process 2500 continues to step 2510.

At step 2510, the system inquires whether the user wishes to review other fixture data. If so, the process 2500 returns to step 2502, discussed above. Otherwise, the process 2500 ends.

Figure 26:
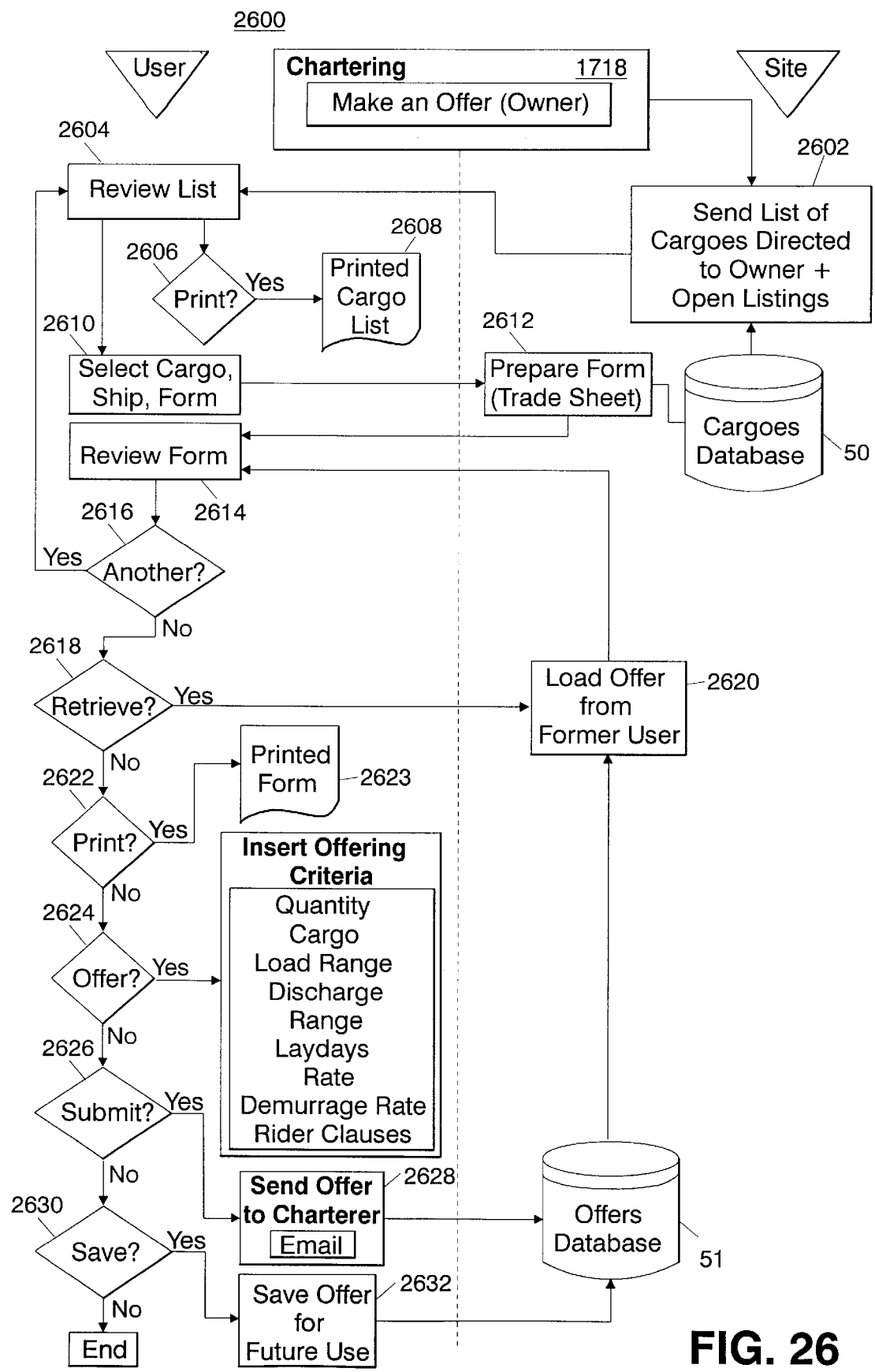
FIG. 26 is a flowchart representing exemplary steps performed by a ship owner for submitting an offer to ship listed cargo according to one embodiment of the present invention.

Turning now to FIG. 26, there is depicted an exemplary process 2600 for allowing a ship owner to make an offer on public or private cargo. A "submit offer" button 1718 may be provided on the main menu 1700 for selecting this function. Upon activation of the button 1718, the system executes the process 2600 which begins at step 2602 where the system transmits to the ship owner a list of public cargoes, as well as private cargoes addressed to the ship owner. At step 2604, the ship owner may review the cargo list. The ship owner may then choose to print the list (steps 2606 and 2608).

Next, the ship owner may select a particular cargo and a format containing cargo information of interest (step 2610). The system then retrieves the selected cargo data and transmits it to the ship owner in the selected format (step 2612). The ship owner then reviews the cargo information (step 2614).

The system next inquires whether the ship owner would like to review another cargo entry (step 2616). If so, the process 2600 returns to step 2604, described above. Otherwise, the process 2600 continues to step 2618 where the ship owner is asked whether a previous offer should be retrieved for review. If the ship owner wishes to view the terms of a previous offer, the system receives an identification of the previous offer, retrieves it from the offers database 51 and presents it to the ship owner (step 2620).

Next, the ship owner is asked whether the retrieved offer should be printed (step 2622). If so, the retrieved offer is printed at step 2623. The process then continues to step 2624, wherein the system inquires whether the ship owner would like to insert the previous offering criteria into a new offer, or to prepare a new offer without using previously stored information. The ship owner may then enter new offer criteria or select any or all of the retrieved offer criteria, if available. Offering criteria may include a quantity of a cargo, a cargo type, a discharge requirement, a cargo range, the number of laydays required, a rate to be paid, a demurrage rate, desired rider clauses for the fixture, and the like.

The process 2600 then continues to step 2626 wherein the system inquires whether the prepared offer is to be submitted. If so, the offer is sent to the charterer who entered the cargo data, preferably via e-mail, and is stored in the offers database 51 (step 2628). Otherwise, the process 2600 continues to step 2630.

At step 2630, the system inquires whether the offer is instead to be saved for future submission. If so, the offer is saved in the offer database 51, and designated as being on hold rather than active (step 2632), after which the process 2632 ends. In the alternative, the ship owner may choose not to save or submit the entered offer, in which case the process 2600 ends as well.

Figure 27:
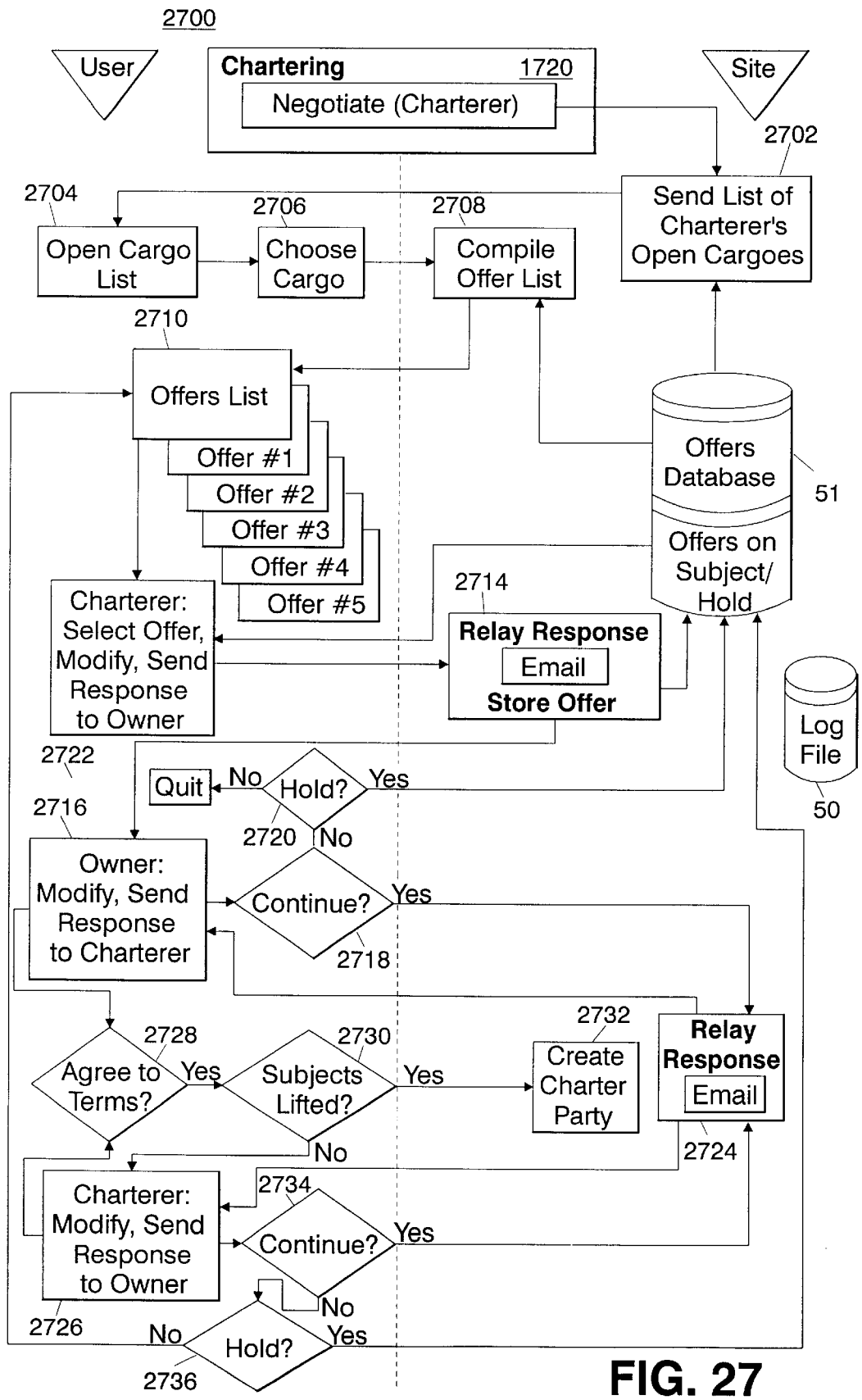
FIG. 27 is a flowchart representing exemplary steps performed by a charterer for negotiating a fixture according to a further embodiment of the present invention.

Turning now to FIG. 27, there is depicted an exemplary process 2700 for allowing a charterer to negotiate a fixture or charter party contract with a ship owner. A "negotiate (by charterer)" button 1720 may be provided on the main menu 1700 for selecting this function. Upon activation of the button 1720, the system executes the process 2700 which begins at step 2702 where the system sends the charterer a list of open (i.e. listed but non-negotiated) cargoes which have received an offer. The charterer may then open the open cargo list (step 2704), choose a cargo (step 2706) and review a list of offers submitted for the cargo (step 2710) which are retrieved from the offers database 51 (step 2708). The charterer may then select an offer and respond to the party who transmitted it, preferably via an e-mail message (step 2712). The response may include a modification of the submitted offer. The system then transmits the response to the owner (step 2714) and the e-mail is stored in the e-mail database 56.

The owner, in turn, may review the response (step 2716). At step 2728, the system inquires whether the ship owner agrees to the terms in the response. If so, the process 2700 continues to step 2730 discussed below. Otherwise, the system then inquires whether the owner wishes to continue the negotiation (step 2718). If not, the system inquires whether the owner wishes to place the offer on hold (step 2720). If the owner elects to hold the offer, the offer is stored in offers database 51 with a designation that its status is on hold. If the owner does not wish to place the offer on hold, the process 2700 ends at step 2722.

Returning to step 2718, if the owner wishes to continue the negotiation, the process 2700 continues to step 2724, where the owner generates a response to the charterer's response which is transmitted to the charterer. The response may be stored in e-mail database 56. The charterer then reviews the ship owners response (step 2726). If the charterer agrees to the terms in the response, the process 2700 continues through step 2728 to step 2730, discussed further below. Otherwise, the system inquires whether the charterer wishes to continue the negotiations (step 2734). If the charterer does not wish to continue the negotiations, then the system inquires whether the modified offer is to be placed on hold (step 2736). If the charterer so designates, then the modified offer is stored in the offers database 51 with an indication that it is on hold. If the charterer does not wish to hold the offer, then the process 2700 returns to step 2710 above where the charterer may review another offer and continue therefrom.

Returning to step 2730, the system next inquires whether all portions of the offer which may relate to third parties have received approval from such third parties. If no approval has been received, the process 2700 returns to step 2726 discussed above. If all third party subjects have been lifted, a charter party agreement is created (step 2732) from the terms of the latest offer communicated.

The interactions between the ship owner and the charterer may be recorded in a log file 58, as discussed above.

Figure 28:
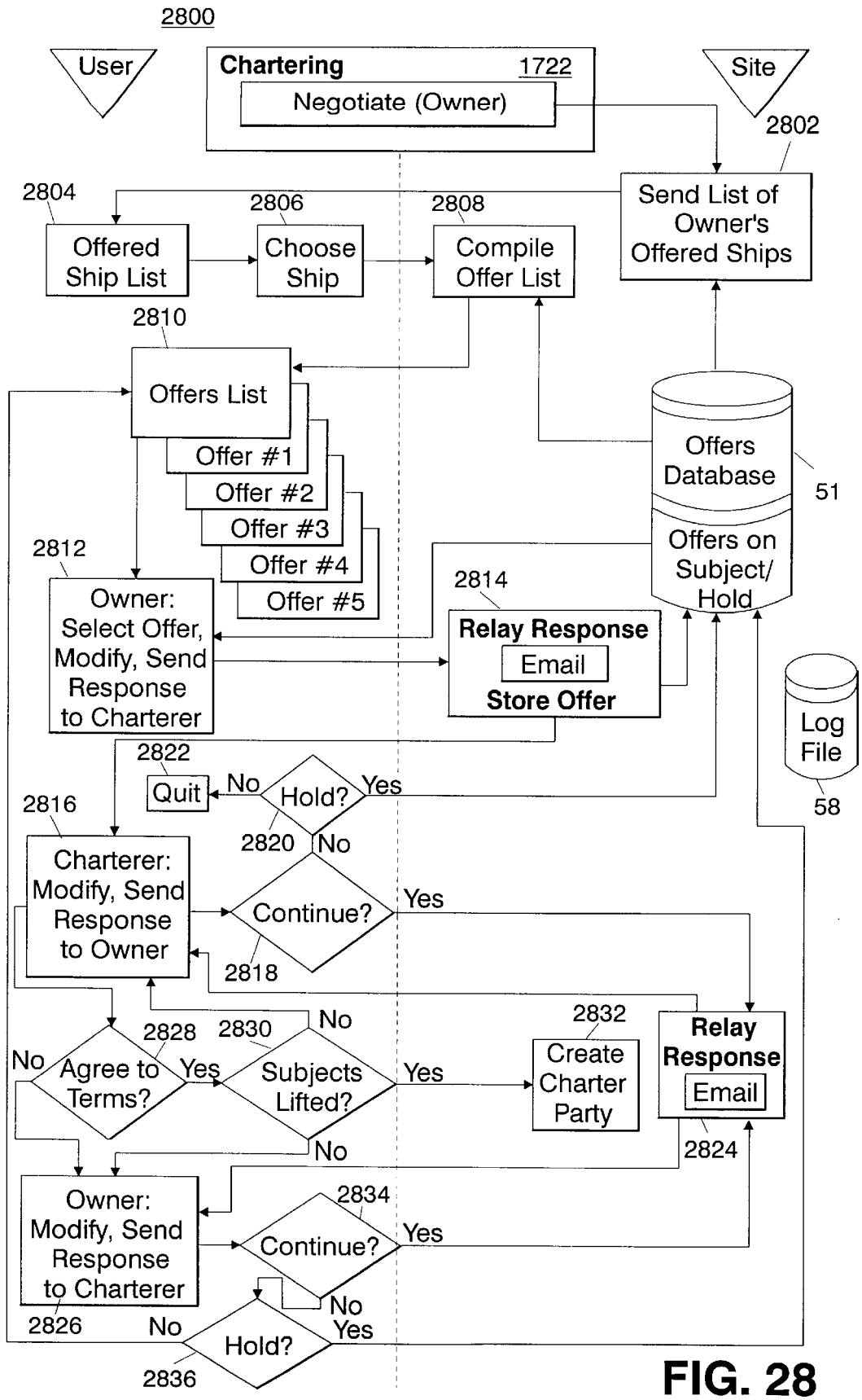
FIG. 28 is a flowchart representing exemplary steps performed by a ship owner for negotiating a fixture according to a further embodiment of the present invention.

Turning now to FIG. 28, there is depicted an exemplary process 2800 for allowing a ship owner to negotiate a fixture or charter party contract with a charterer. A "negotiate (by ship owner)" button 1722 may be provided on the main menu 1700 for selecting this function. Upon activation of the button 1722, the system executes the process 2800 which begins at step 2802 where the system sends the ship owner a list of the ship owner's open ships offered for a particular cargo. The ship owner may then open an offered ship list (step 2804), choose a ship (step 2806) and review a list of offers submitted corresponding to the ship (step 2810) which are retrieved from the offers database 51 (step 2808). The ship owner may then select an offer and respond to the party who transmitted it, preferably via an e-mail message (step 2812). The response may include a modification of the submitted offer. The system then transmits the response to the charterer (step 2814) and the e-mail is stored in the e-mail database 56.

The charterer, in turn, may review the response (step 2816). Then at step 2828, the system inquires whether the charterer agrees to the terms in the response. If so, the process 2800 continues to step 2830 discussed below. Otherwise, the system then inquires whether the charterer wishes to continue the negotiation (Step 2818). If not, the system inquires whether the charterer wishes to place the offer on hold (step 2820). If the charterer so elects, the offer is stored in offers database 51 with a designation that its status is on hold. If the charterer, on the other hand, does not wish to place the offer on hold, the process 2800 ends at step 2822.

Returning to step 2818, if the charterer wishes to continue the negotiation, the process 2800 continues to step 2824, where the charterer generates a response to the owner's response which is then transmitted to the ship owner. The response may be stored in e-mail database 56. The ship owner then reviews the charterer's response (step 2826). If the ship owner agrees to the terms in the response, the process 2800 continues through step 2828 to step 2830, discussed further below. Otherwise, the system inquires whether the ship owner wishes to continue the negotiations (step 2834). If the owner does not wish to continue the negotiations, then the system inquires whether the modified offer is to be placed on hold (step 2836). If the owner so designates, then the modified offer is stored in the offers database 51 with an indication that it is on hold. If the owner does not wish to hold the offer, then the process 2800 returns to step 2810 above where the ship owner may review another offer and continue therefrom.

Returning to step 2830, the system next inquires whether all portions of the offer which relate to third parties have received approval. If not, the process 2800 returns to step 2826 discussed above. On the other hand, if all third party subjects have been lifted, a charter party agreement is created (step 2832).

The interactions between the ship owner and the charterer may be recorded in a log file 58 as discussed above.

Figure 29:
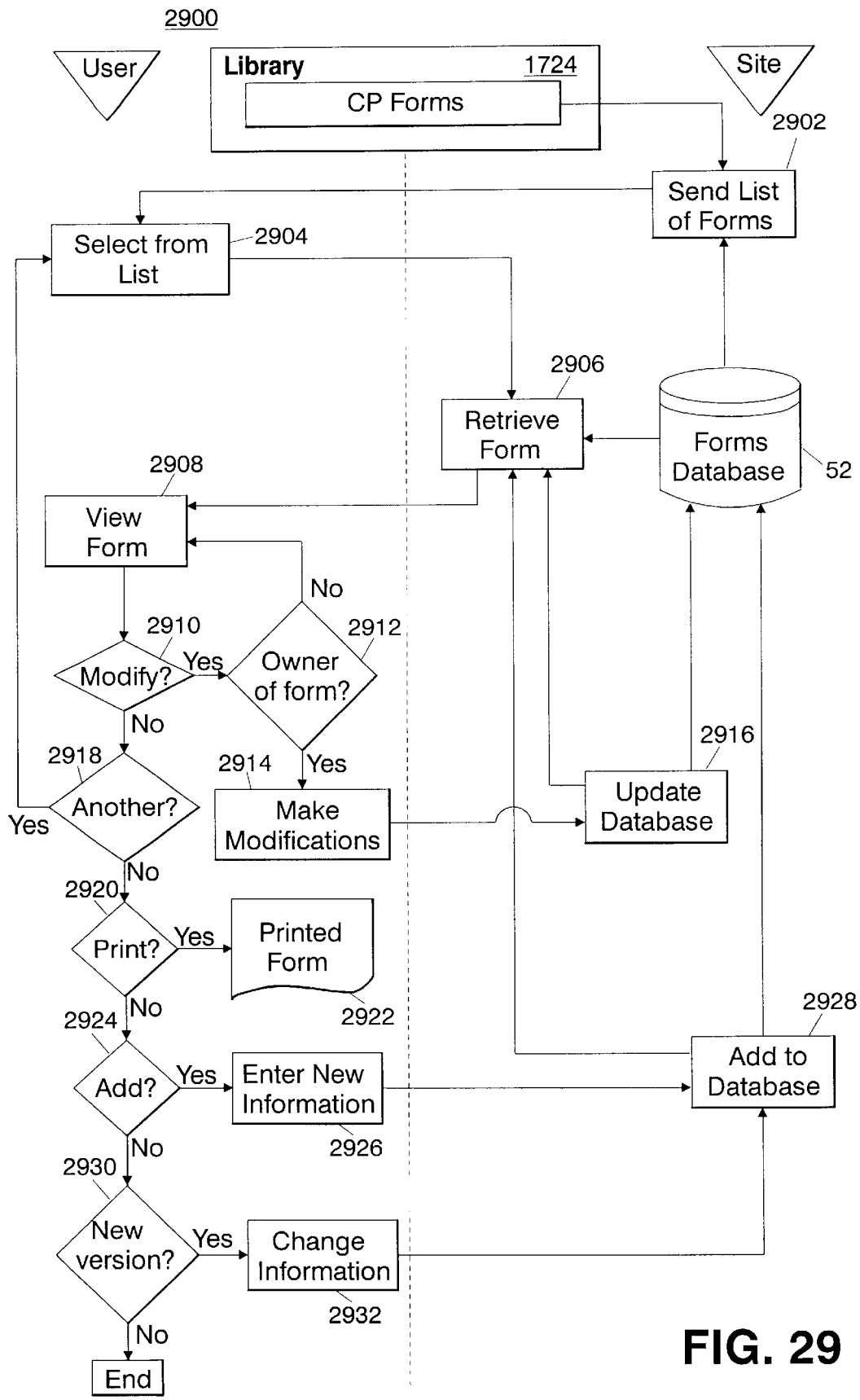
FIG. 29 is a flowchart representing exemplary steps performed by a user for accessing stored charter party forms according to one embodiment of the present invention.

Turning now to FIG. 29, there is depicted an exemplary process 2900 wherein a user of the system may access, modify and print standard or user-specific charter party contract forms stored in the forms database 52. A "charter party forms" button 1724 may be provided on the main menu 1700 for selecting this function. Upon activation of the button 1724, the system executes the process 2900 which begins at step 2902 where the system sends a list of available forms to the user. The user then selects a form from the list (step 2904). In response, the form is retrieved from the forms database 52 (step 2906) and is transmitted to the user. The user then views the form at step 2908.

Upon viewing the form, the system then inquires whether the user wishes to modify the form (step 2910). The "modify" functionality of step 2910 is available only to the owner of the form. If it is determined that the form is to be modified, and if the selected form is proprietary, the process 2900 continues to step 2912, where the system confirms that the user is the owner of the form to be modified. If the user does not own the form, the user is returned to step 2908. Otherwise, the system receives the user's modifications (step 2914), stores and updates the forms database 52 (step 2916).

Returning to step 2910, if the user does not wish to modify the form, the system then inquires whether another form is to be viewed instead (step 2918). If so, the process 2900 returns to step 2904 above. Otherwise, the process continues to step 2920. At step 2920, the user may choose to print the form being viewed. If the user does not wish to print the form, the process 2900 continues to step 2924.

At step 2924, the system inquires whether new information is to be added in order to create a new form. The "add" functionality of step 2924 is available only to users who are not owners of the form. If it is determined that a new form is added in step 2924, the user adds new information (step 2926) which is then used to update the forms database 52 (step 2928). If the user does not wish to add new information, the process 2900 continues to step 2930, where the system inquires whether the user wishes to change current information in the selected form. If so, the system receives the changes to current information (step 2932) and adds the changes to the forms database 52 (step 2928). If there are no changes to be made to current form information, the process 2900 ends.

Figure 30:
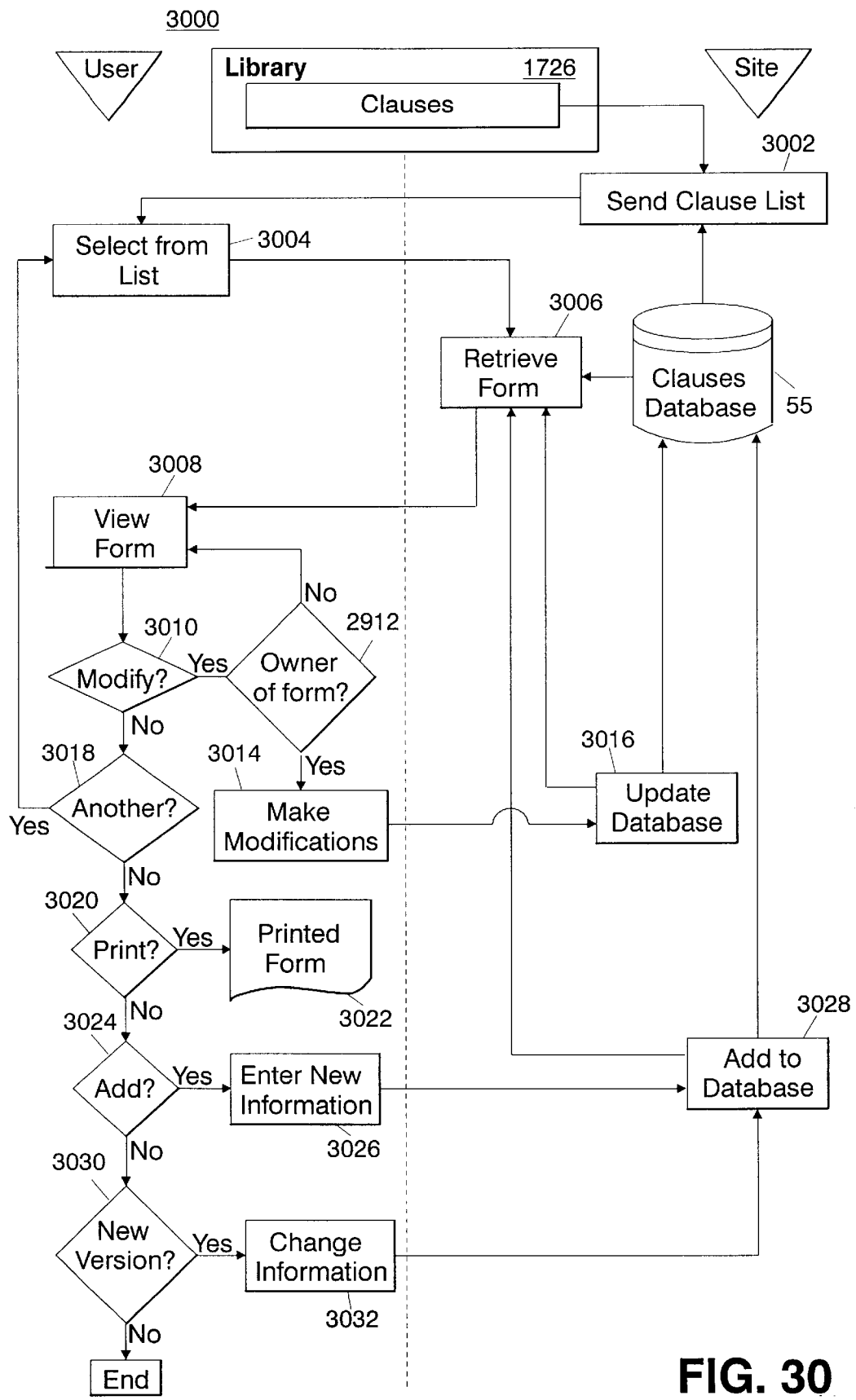
FIG. 30 is a flowchart representing exemplary steps performed by a user for accessing stored standard contract clauses according to one embodiment of the present invention.

Turning now to FIG. 30, there is depicted an exemplary process 3000 wherein a user of the system may access, modify and print standard or user-specific clauses stored in a clauses database 55. A "clauses" button 1726 may be provided on the main menu 1700 for selecting this function. Upon activation of the button 1726, the system initiates the process 3000 which begins at step 3002 where the system sends a list of available clauses to the user. The user then selects a clause from the list (step 3004). In response, the clause is retrieved from the clause database 55 (step 3006) and transmitted to the user. The user then views the selected clause at step 3008.

Upon viewing the clause, the system then inquires whether the user wishes to modify the clause (step 3010). The "modify" functionality of step 3010 is available only to the owner of the form for the clause. If it is determined that the form is to be modified and if the selected clause is proprietary, the process 3000 continues to step 3012, where the system confirms that the user is the owner of the clause to be modified. If the user did not originally submit the clause, the user is returned to step 3008. Otherwise, the system receives the user's modifications (step 3014) and updates the clauses database 55 (step 3016).

Returning to step 3010, if the user does not wish to modify the clause, the system then inquires whether another clause is to be viewed instead (step 3018). If so, the process 3000 returns to step 3004 above. Otherwise, the process continues to step 3020. At step 3020, the user may choose to print the clause being viewed (step 3022). If the user does not wish to print the clause, the process 3000 continues to step 3024.

At step 3024, the system inquires whether a new form is to be created for the clause. The "add" functionality of step 3024 is available only to users who are not owners of the form. If it is determined that a new form is to be added, the user adds new information (step 3026) which is then used to update the clauses database 55 (step 3028). If the user does not wish to add new information, the process 3000 continues to step 3030, where the system inquires whether the user wishes to change current information in the selected clause. If so, the system receives the changes to current information (step 3032) and adds the changes to the clauses database 55 (step 3028). If, on the other hand, there are no changes to be made to current clause, the process 3000 ends.

Figure 31:
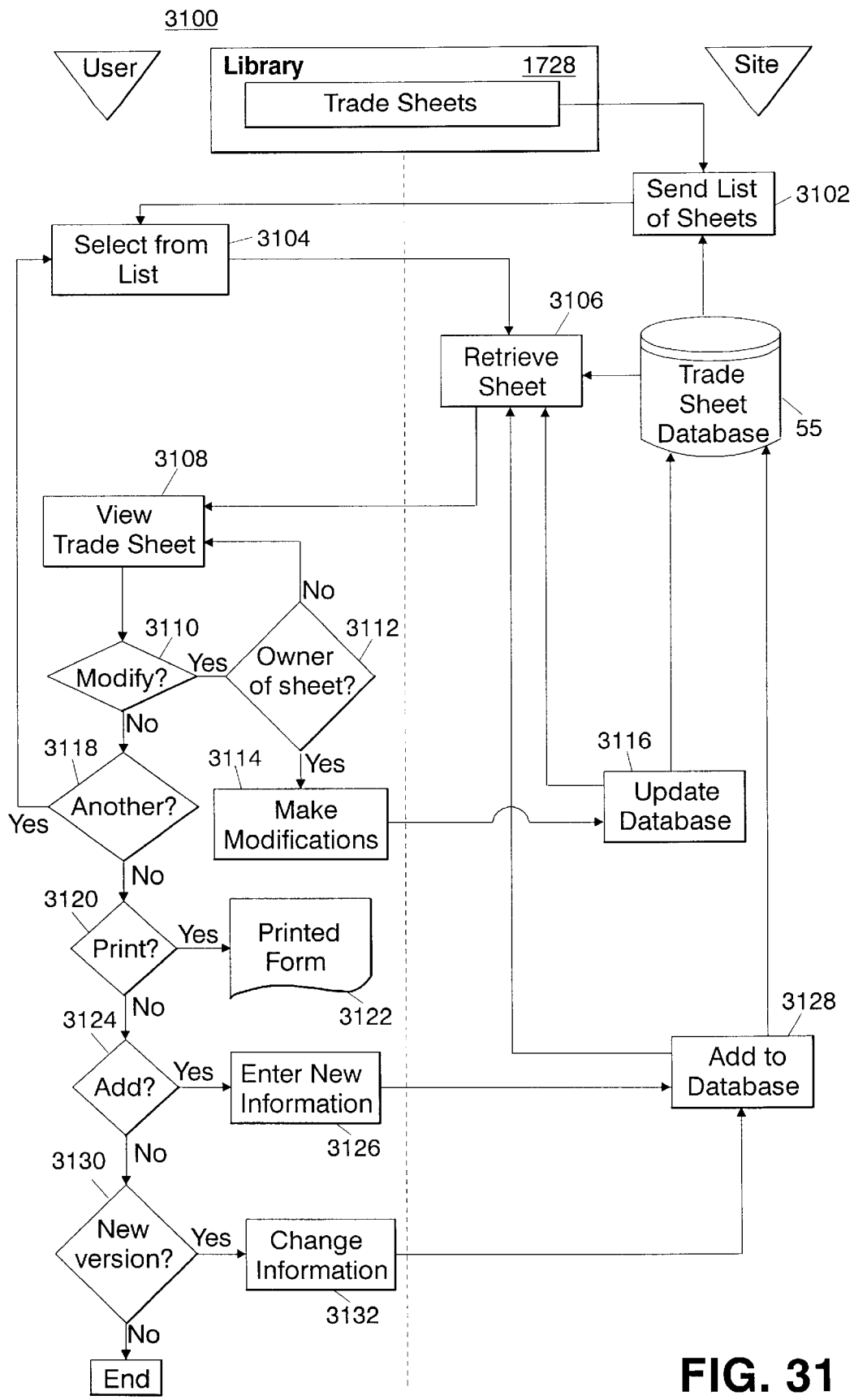
FIG. 31 is a flowchart representing exemplary steps performed by a user for accessing stored trade sheets according to one embodiment of the present invention.

Turning now to FIG. 31, there is depicted an exemplary process 3100 wherein a user of the system may access, modify and print standard or user-specific trade sheets stored in a trade sheet database 54. A "trade sheets" button 1728 may be provided on the main menu 1700 for selecting this function. Upon activation of the button 1728, the system initiates the process 3100 which begins at step 3102 where the system sends a list of available trade sheets to the user. The user then selects a trade sheet from the list (step 3104).

In response, the trade sheet is retrieved from the trade sheet database 54 (step 3106) and transmitted to the user. The user then views the selected trade sheet at step 3108.

Upon viewing the trade sheet, the system then inquires whether the user wishes to modify the trade sheet (step 3110). The "modify" functionality of step 3110 is available only to the owner of the form for the trade sheet. If it is determined that the form is to be modified, so and if the selected trade sheet is proprietary, the process 3100 continues to step 3112, where the system confirms that the user is the owner of the trade sheet to be modified. If the user did not originally submit the trade sheet, the user is returned to step 3108. Otherwise, the system receives the user's modifications (step 3114) and updates the trade sheets database 54 (step 3116).

Returning to step 3110, if the user does not wish to modify the trade sheet, the system then inquires whether another trade sheet is to be viewed instead (step 3018). If so, the process 3100 returns to step 3104 above. Otherwise, the process continues to step 3120. At step 3120, the user may choose to print the trade sheet being viewed (step 3122). If the user does not wish to print the trade sheet, the process 3100 continues to step 3124.

At step 3124, the system inquires whether a new form is to be created for the trade sheet. The "add" functionality of step 3124 is available only to users who are not owners of the form for the trade sheet. If it is determined that a new form is to be added, the user adds new information in a newly added form (step 3126) which is then used to update the trade sheets database 54 (step 3128). If the user does not wish to add new information, the process 3100 continues to step 3130, where the system inquires whether the user wishes to change current information in the selected trade sheet. If so, the system receives the changes to current information (step 3132) and adds the changes to the trade sheets database 54 (step 3128). If, on the other hand, there are no changes to be made to current trade sheet, the process 3100 ends.

In the processes described above with respect to FIGS. 29–31, it is additionally contemplated that an administrator or operator of the site may make changes to forms, clauses, trade sheets, and the like that they stored in the subject databases for use by subscribers and the like.

Figure 32:
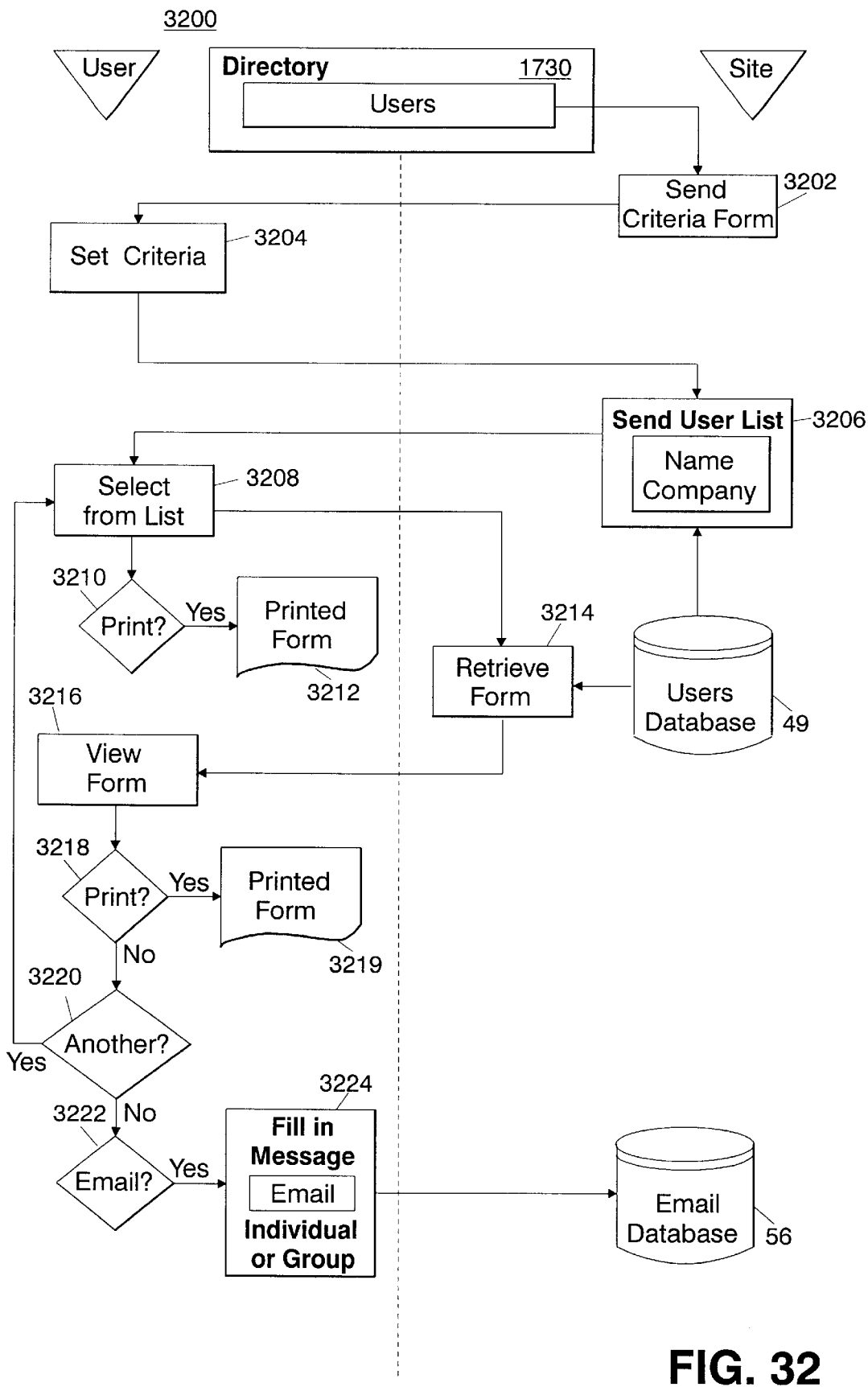
FIG. 32 is a flowchart representing exemplary steps performed by a user for accessing a user list according to one embodiment of the present invention.

Referring now to FIG. 32, there is depicted an exemplary process 3200 wherein a user of the system may search for and contact other users and subscribers of the network site 40. A "directory" button 1730 may be provided on the main menu 1700 for selecting this function. Upon activation of the button 1730, the system initiates the process 3200 which begins at step 3202 where the system transmits a form for submitting a search of users stored in the users database 49. The user may enter desired criteria on the form (step 3204). The system then compares the entered criteria to the information stored in the users database 49 and generates a list of matched users (step 3206). The list is then transmitted to the submitting user (step 3208). The user may then choose to print the list (steps 3210 and 3212).

The user may also select one or more of the users on the list to view in more complete detail. The system then prepares a form for presenting the selected user data (step 3214) and inserts the appropriate data from the user database 49. The form and inserted data are then transmitted to the user who may view the form on a remote user terminal 20, 30 (step 3216). The user may then again choose to print the received data (steps 3218 and 3219). The user may then choose to view another user from the received list (step 3220), in which case, the process 3200 returns to step 3208 described above.

If the user does not choose to view data for another user on the returned list, the process 3200 continues to step 3222 where the user may choose to e-mail the selected user. An e-mail form is presented for the user to fill in (step 3224). After the message has been completed, the system may transmit the e-mail to the user and/or store the e-mail message in the e-mail database 56 for later retrieval.

Figure 33:
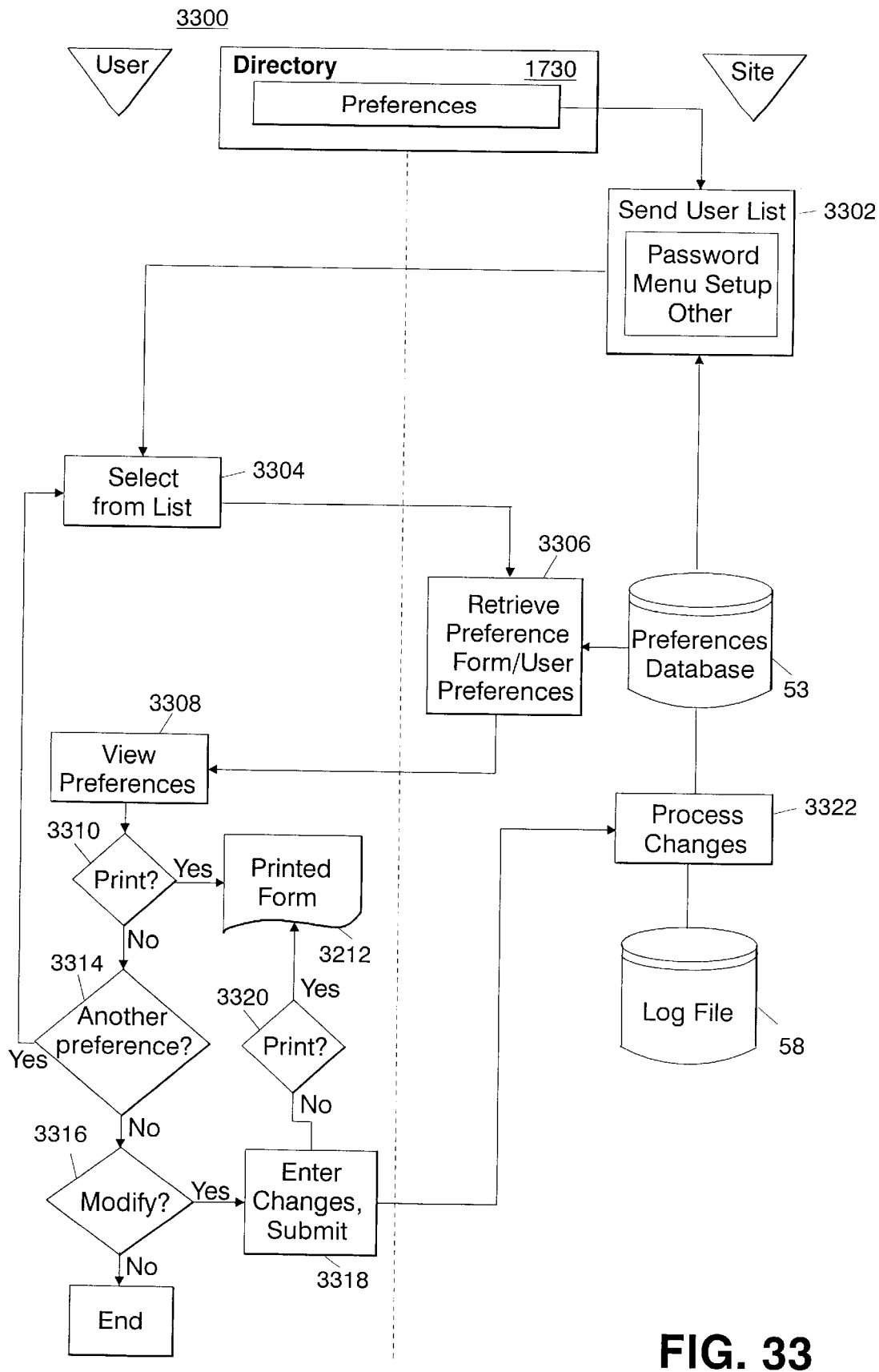
FIG. 33 is a flowchart representing exemplary steps performed by a user for changing user preferences according to one embodiment of the present invention.

Turning now to FIG. 33, there is depicted an exemplary process 3300 wherein a user of the system may set or change existing preferences regarding an interface to the network site 40. A "preferences" button 1732 may be provided on the main menu 1700 for selecting this function. Upon activation of the button 1732, the system initiates the process 3300 which begins at step 3302 where the system transmits a list of preferences which the user may set and change. The user may then choose one or more preference settings to change, such as a password, the order of menu functions, and the like (step 3304).

The system then retrieves the current preference setting from the preferences database 53 and transmits the current setting to the user (step 3306). The user may then view the current preference setting (step 3308) and may print the same (steps 3310 and 3312). The system then inquires whether the user wishes to view another preference setting. If so, the process returns to step 3304, described above.

Otherwise, the process 3300 continues to step 3316 where the user is asked whether the current preference setting displayed is to be modified (step 3316).

The user may then enter changes to the preference setting (step 3318) and may also print the changes that were entered (steps 3320 and 3312). The system then processes the changes and stores them in the preferences database 53. A record of the entered changes may further be recorded in the log file database 58, discussed above.

Figure 34:
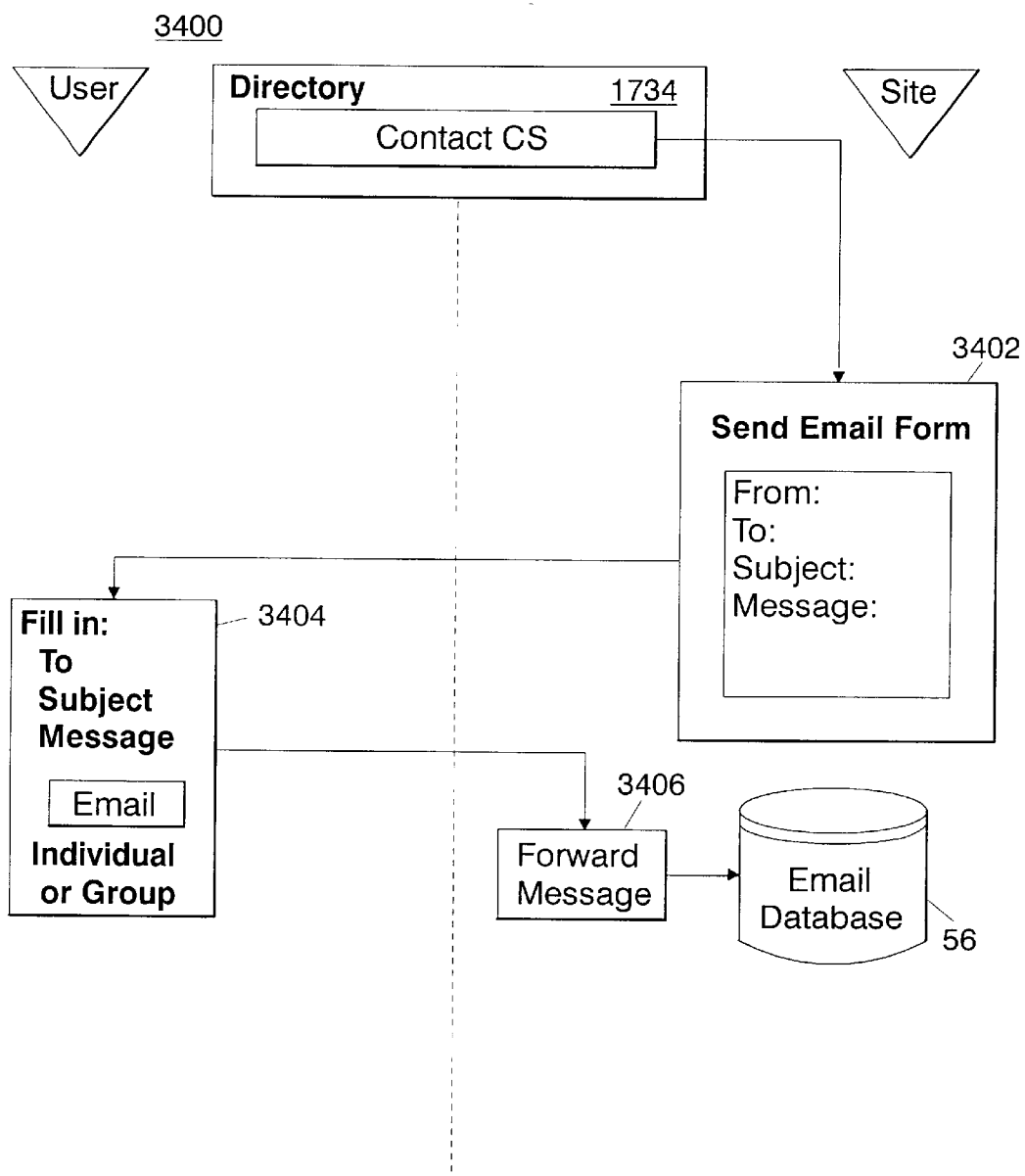
FIG. 34 is a flowchart representing exemplary steps performed by a user for contacting a site administrator according to one embodiment of the present invention.

Turning now to FIG. 34, there is depicted an exemplary process 3400 wherein user of the system may contact an operator or administrator of the network site 40. A "contact site operator" button 1734 may be provided on the main menu 1700 for selecting this function. Upon activation of the button 1734, the system initiates the process 3400 which begins at step 3402 where the system transmits an e-mail template to be completed by the user. The user may then input data in the appropriate fields of the template, such as to, from, subject and message text fields (step 3404). After the template or form has been completed, the message is forwarded to the system (step 3406) and stored in the e-mail database 56 for retrieval by the operator or administrator.

Figure 35:
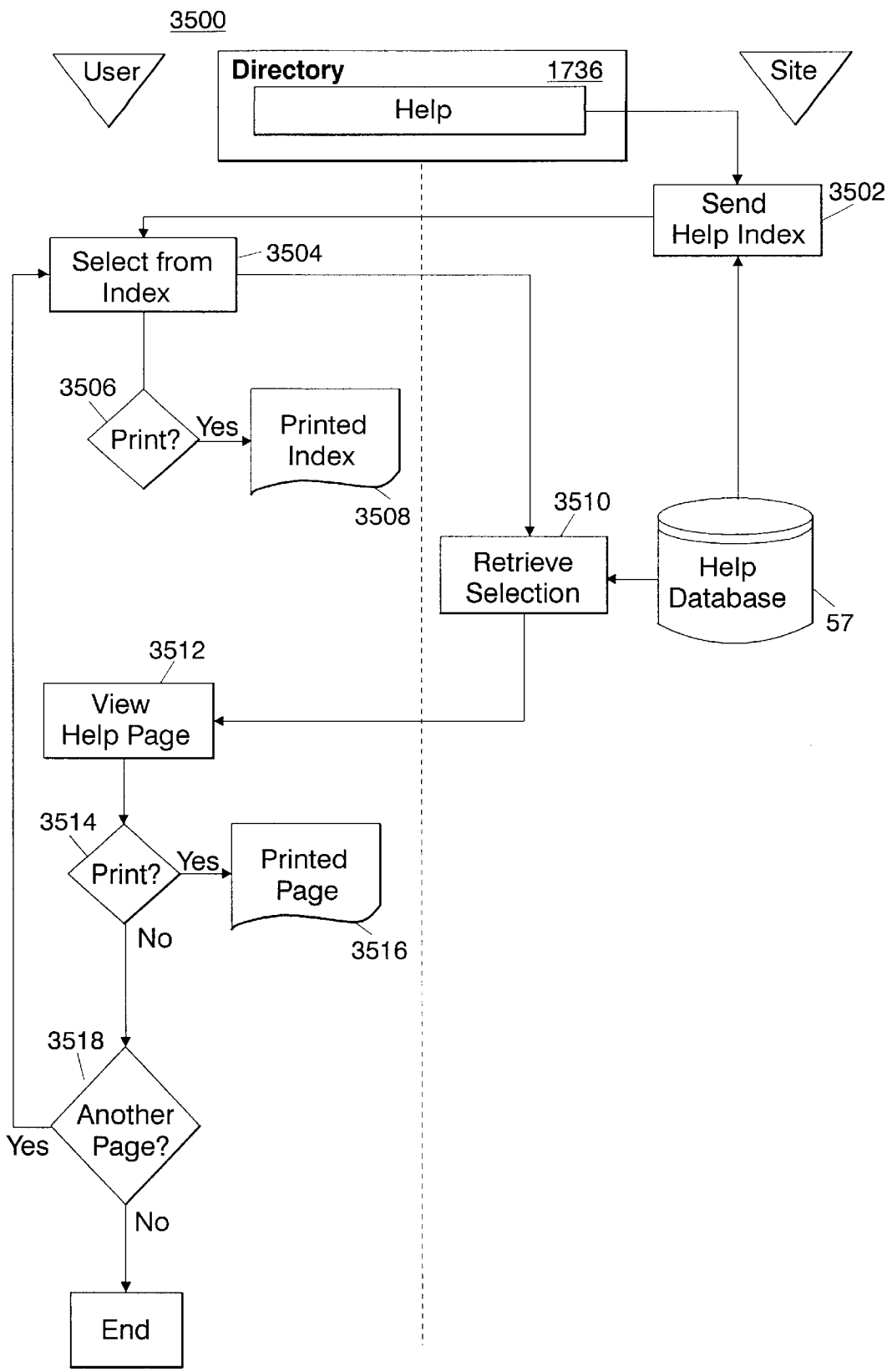
FIG. 35 is a flowchart representing exemplary steps performed by a user for accessing help functions according to one embodiment of the present invention.

Referring now to FIG. 35, there is depicted an exemplary process 3500 wherein a user of the system may search a help index relating to functions performed by the network site 40. A "help" button 1736 may be provided on the main menu 1700 for selecting this function. Upon activation of the button 1736, the system initiates the process 3500 which begins at step 3502 where an index of help topics may be prepared and transmitted to the user. The help topics may be retrieved from the help database 57 stored on the network site 40.

The user, in turn may select a particular help topic from the index (step 3504) and may additionally choose to print the index (steps 3506 and 3508). After the user selects a particular help topic, further information regarding the topic are retrieved from the help database 57 (step 3510) and displayed to the user (step 3512). The user may, in turn choose to print the further information (steps 3514 and 3516) and may select and view further help topics (step 3518). After all desired help topics have been viewed, the process 3500 ends.

The following is a sample charter party contract that may be entered into by charterers and ship owners:

Vessel shall have a full and efficient complement of Master, officers and crew, with adequate training and experience in operating the Vessel's equipment and that the Master and all officers shall possess valid and current certificates/documents issued or approved by

---

TANKER VOYAGE CHARTER PARTY

Place _____   Date _____

PREAMBLE

IT IS THIS DAY MUTUALLY AGREED between _____

Owner/Chartered Owner (hereinafter called "Owner") of the good _____ flag
ST/MT _____ (hereinafter called the "Vessel")
and _____
(hereinafter called "Charterer") that the transportation hereinafter provided for shall be performed subject to the terms and conditions of this Charter Party, which includes this Preamble, Part I and Part II. In the event of a conflict, the provisions of Part I shall prevail over Part II to the extent of such conflict.

PART I

A.  VESSEL DESCRIPTION AND POSITION:
    Year Built: _____   Classed: _____
    Summer Deadweight: _____ $_{13}$ _____ tons (2240 lbs.) metric tons (1000 kg.)
    on _____ feet-inches/meters draft in salt water on assigned summers freeboard.
    Gross Registered Tonnage: _____ Suez/Panama Canal Net Tonnage: _____
    Capacity for Cargo: _____ metric tons (1000 kg.) _____ % more or less, Vessel's option.
    Cubic Capacity for Cargo (at 98%): _____ cubic feet/cubic meters/barrels.
    Length Overall: _____ feet-inches/meters. Beam: _____ feet-inches/meters
    Bow to Center Manifold: _____ feet-inches/meters.
    Keel to Top Mast: _____ feet-inches/meters.
    Tons Per Inch/Centimeter Immersion: _____
Charter Speed: _____ Knots Laden (weather and safe navigation permitting).
Maximum Speed: _____ Knots Laden (weather and safe navigation permitting):
Vessel has segregated ballast tank (SBT) capacity of _____ m' according to its MARPOL certificate.
Vessel has clean ballast tank (CBT) capacity of _____ m' according to its MARPOL certificate.
Vessel has operational Inert Gas System: _____ Yes _____ No
Vessel has operational Crude Oil Wash System: _____ Yes _____ No
If Crude Oil Wash is required, the allowed pumping hours specified in Part II, Clause 15(c) shall be increased by a maximum of _____ hours pursuant to Part II, Clause 15(d).
Cargo Tanks:
Fully Coated:   _____ Yes _____ No   Type: _____
Heating:        _____ Yes _____ No   Type: _____
___ derrick(s) each side with a maximum safe working load of ___ tons (2240 lbs.)/meters tons (1000 kg.)
Last 3 cargoes:   Last.
                  2.
                  3.
Vessel is entered in _____ P & I Club.
Vessel position on date of Charter Party: _____
Expected ready to load about: _____
Based upon loading at: _____
B.  LAYDAYS:
    Commencing: _____ Cancelling: _____
C.  LOADING RANGE(S)/PORT(S)/PLACE(S):
                                                    Charterer's Option
D.  DISCHARGE RANGE(S)/PORT(S)/PLACE(S):
                                                    Charterer's Option

---

Part II

1. Warranties
    (a) DESCRIPTION/CONDITION. Owner warrants that from the time the obligation to proceed to the loading port(s)/place(s) attaches and throughout the Vessel's service hereunder the Vessel shall be as set forth in Part I, Clause A. Owner further warrants that during said period the Vessel's hull, machinery, boilers, tanks and equipment, including but not limited to pipes, pumps, valves, heating coils, inert gas and crude oil wash systems (if the Vessel is so equipped) and navigational, nautical equipment and facilities, shall be in good working order and condition and in every way seaworthy and fit for the carriage of the cargo as described in Part I, Clause F, so far as the foregoing conditions can be obtained by the exercise of due diligence.
    (b) COMPLEMENT. Owner warrants that, during the period described in paragraph (a) of this Clause the the country of the Vessel's registry. Owner further warrants the conversational English language proficiency of the Master and officer(s) in charge of cargo and bunker oil handling.

(c) COMPLIANCE. Owner warrants that the Vessel is in all respects eligible for trading to the port(s) place(s) set forth in Part I, Clauses C and D and that at all necessary times it shall have on board all certificates, records and other documents required for such service by applicable laws, regulations, requirements and international conventions, including but not limited to the U.S. Port and Tanker Safety Act of 1978, the Ports and Waterways Safety Act, the Federal Water Pollution Control Act, the Oil Pollution Act of 1990, all regulations issued thereunder and IMO Regulations.

(d) FAILURE TO COMPLY. Any delay incurred because of the Vessel's failure to comply with paragraphs (a) or (c) of this Clause shall not count as laytime or, if the Vessel is on demurrage, as time on demurrage and any expense attributable to such delay shall be for Owner's account.

2. Voyage/Full Cargo/Bunker Replacement (a) VOYAGE. The Vessel shall proceed with utmost dispatch to any port(s)/place(s) as ordered by Charterer in accordance with Part I, Clause C., arrive with clean ballast and there load a cargo as described in Part I, Claus F. Upon completion of loading the Vessel shall forthwith proceed at the charter Speed, as set forth in Part I, Clause A., or alternatively at a speed advised by Charterer pursuant to Clause 3.(d) to any port(s)/place(s) as ordered by Charterer in accordance with Part I, Clause D and there deliver said cargo.

(b) FULL CARGO. The term "full cargo" shall mean a cargo which fills the Vessel to its minimum freeboard, as permitted by the International Load Line Convention, 1966, together with any applicable amendment thereto, or fills the cubic capacity of the Vessel's available cargo spaces, whichever occurs first, after leaving appropriate space in the tanks for expansion of cargo.

(c) BUNKER REPLACEMENT COST. As used herein with respect to bunkers, "replacement cost" shall mean the actual replacement cost of bunkers at the port where bunkers are next taken or, if bunkers are not to be taken again, the price paid at the port where bunkers were last taken.

3. Frieght (a) PAYMENT. Freight shall be paid at the rate stipulated in Part I, Clause G, and shall be computed on (i) gross quantity as shown on the Bill(s) of Lading or a Certificate of Inspection of an independent cargo inspector (hereinafter called "cargo inspector") whichever is applicable, and (ii) quantity of documented tank washings if freight thereon is payable in accordance with Clause 23. Payment of freight shall be made by Charterer upon receipt of notice of completion of discharge at the last discharge port/place and receipt of information pertaining to paragraph (c) below, if applicable, less any deductions made under said paragraph, provided that no freight shall be payable on any quantity which puts the Vessel below permissible loadline marks at any stage of the voyage.

(b) WORLDSCALE. Unless otherwise stipulated herein, all rates, hours, terms and conditions in the Worldwide Tanker Nominal Freight Scale (hereinafter called "Worldscale") in effect at the time of commencement of loading hereunder shall apply to this Charter Party. If cargo is carried between places and/or by a route for which no rate is expressed in Worldscale, then, in the absence of agreement as to the applicable freight rate, Owner and Charterer will apply to either of the publishers of Worldscale for a binding determination of an appropriate Worldcale rate and obtain same.

(c) CARGO RETENTION. In the event that any cargo remains on board upon completion of discharge, Charterer on behalf of cargo owner(s) or on its own behalf should it be the cargo owner, shall have the right to deduct from freight an amount equal to the FOB port of loading value of such cargo plus freight due with respect thereto, provided that the volume of cargo remaining on board is (i) liquid and free flowing and/or (ii) unpumpable due to the Vessel's failure, including non-compliance with cargo heating requirements as set forth in this Charter Party and/or voyage orders, all as determined by two independent cargo inspectors, one appointed by Owner and one appointed by cargo owner or Charterer. In the event that the discharge is attended only by one independent cargo inspector appointed by one of the parties, the determination of that inspector shall be binding on both parties. Charterer in making the said deduction shall give Owner credit for any quantity of cargo on board at the time of commencement of loading determined by the independent cargo inspector to have then been liquid and free flowing to the extent that such quantity does not exceed the total quantity of the cargo remaining on board upon completion of discharge and Owner hereby agrees to indemnify Charterer against claims of third parties seeking delivery or the value of said former on board quantity. No deduction from freight shall be made for water and/or sediment contained in the cargo remaining on board upon completion of discharge. Any action or lack of action in accordance with this provision shall be without prejudice to any rights or obligations of the parties.

(d) SPEED INCREASE. Charterer has the right, which may be exercised as many times as Charterer deems appropriate during the voyage, to order the Vessel to proceed between the Charter Speed and up to and including the Maximum Speed, both as set forth in Part I, Clause A., weather and safe navigation permitting. Freight rates in Part I, Clause G, are based upon Charter Speed. Worldscale points, or pro rata thereof, as stipulated in Part I, Clause G., will be added for each knot, or pro rata thereof, of increased speed above Charter Speed. For example, if Charterer orders the Vessel to proceed on part of the voyage at Charter Speed and part at an increased speed(s), the freight rate stipulated in Part I, Clause G, shall be prorated based upon the percentage of miles travelled at Charter Speed and the percentage of miles travelled at the increased speed(s). Freight initially payable on completion of discharge shall be at the rate applicable to the Charter Speed. Additional freight and dead freight pursuant to clause 4, if applicable, resulting from speed increases(s) during the voyage shall be paid by Charterer upon receipt of Owner's invoice, supported by extracts of the Vessel's deck log showing miles steamed at each speed. In the event that the Vessel does not maintain the speed as ordered by Charterer due to conditions beyond Owner's control, then the freight rate shall be calculated based on the average speed actually performed (using the latest BP distance tables) for that portion of the voyage during which the Vessel was ordered to steam at increases speed(s). In no event shall the freight rate be less than that stipulated in Part I, Clause G. Any adjustment to the freight rate stipulated in Part I, Clause G, shall not change the demurrage rate as stipulated in Part I, Clause J.

(e) LIGHTENING. If the Vessel is ordered to lighten pursuant to Clause 13.(c), the freight rate shall, notwithstanding the lightening, be that stipulated in Part I, Clause G.

(f) LIGHTENING DISCHARGE AT SEA OR AT A PLACE OUTSIDE A PORT. In the case of any lightening or discharge at sea or at a place outside a port as referred to in Clause 14, the freight rate for the voyage shall be: i) the rate stipulated in Part I, Clause G., or (ii) the flat rate for the relevant trans-shipment area. Stipulated in Worldscale or such flat rate provided by Worldscale upon application by Owner and Charterer or either of them multiplied in either case by the Worldscale percentage set forth in Part I, Clause G.

4. Deadfreight

Charterer need not supply a full cargo, as defined in Part I, Clause E and Clause 2.(b), but if it does not, deadfreight shall be paid at the freight rate stipulated in Part I, Clause G., on the difference between the cargo quantity specified as full cargo in Part I, Clause E. and Clause 2.(b) and the quantity shown on the Bill(s) of Lading or the cargo inspector's Certificate of Inspection, whichever is applicable. Owner will supply Charterer with proper supporting documents (Deadfreight Statement or equivalent) prior to Charterer making any payment hereunder.

5. Nominating Loading and Discharge Ports/Varying Nominations/Indemnification (a) NOMINATIONS. Charterer shall nominate loading or discharge port(s)/place(s) or order the Vessel to a destination for orders. If the Vessel is ordered to a destination for orders, Charterer shall thereafter nominate loading or discharge port(s)/place(s). All such nominations or orders shall be made in sufficient time to avoid delay to the Vessel; however, any time spent by the Vessel awaiting orders as aforesaid shall be payable at the demurrage rate per day or pro rata as stipulated in Part I, Clause J. Extra bunkers consumed to maintain cargo heating while awaiting Charterer's orders will be payable at replacement cost.

(b) VARYING NOMINATIONS. If after loading or discharge port(s)/place(s) have been nominated. Charterer desires to vary any of such port(s)/places). Owner agrees to issue such revised instructions as are necessary to give effect to Charterer's revised orders where ranges are set forth in Part I, Clauses C and or D., and the new discharge port(s)/places(s) are within the said ranges. Charterer's option to nominate new loading/discharge port(s)/place(s) within different ranges shall lapse on tendering Notice of Readiness at the first nominated loading or discharge port(s)/place(s). Freight shall be payable in accordance with the rate stipulated in Part I, Clause G for the voyage actually performed. If by reason of a change of orders or as a result of the Vessel being ordered to a destination for orders pursuant to paragraph (a) above, the Vessel is involved in greater mileage than the ordinary direct route to the renominated/nominated port)s)/place(s) as the case may be. Charterer agrees to compensate Owner for resulting time lost by payment at the demurrage rate stipulated in Part I, Clause J. and for extra bunkers consumed by payment at replacement cost. Should Charterer desire to change quantities to be discharged at discharge port(s)/place(s) originally named in Bill(s) of Lading or discharge port(s)/places(s) nominated pursuant to this paragraph. Owner agrees to issue such revised instructions as are necessary to give effect to Charterer's revised orders.

(c) INDEMNIFICATION. If, as a result of varying nominations referred to in the preceding paragraph. Charter should order the Vessel to proceed to ports(s)/place(s) not named in or to discharge a quantity of cargo other than as designated on the Bill(s) of Lading, or if original Bill(s) of Lading are not available at the discharge port(s)/place(s) for timely surrender to the Vessel, the Vessel shall proceed to the newly named port(s)/place(s) and/or discharge the newly designated quantity and/or deliver the cargo to a party and at a facility at the discharge port(s)/place(s) as directed by Charterer by letter, telex or cable, if Charterer first advises Owner by letter, telex or cable that in return for Owner's compliance with Charterer's delivery instructions Charterer agrees:

1. To indemnify Owner, its servants and agents ("Owner, et al.") and to hold all or each of them harmless in respect of any liability, loss or damage of whatsoever nature which Owner, et al. may sustain by reason of proceeding to the newly named port(s)/place(s) and/or discharging the newly designated quantity and/or delivering the goods to Charterer or its designee in accordance with Charterer's instructions.

2. In the event of any proceedings being commenced against Owner, et al., in connection with the new designation of port(s)/place(s) or quantity and/or the delivery of the goods as aforesaid to provide them from time to time with sufficient funds to defend the same.

3. If the Vessel or any other vessel or property belonging to Owner should be arrested or detained or if the arrest or detention thereof should be threatened, to provide such bail or other security as may be required to prevent such arrest or detention or to secure the release of such Vessel/vessel or property and to indemnify Owner in respect of any loss, damage or expenses caused by such arrest or detention whether or not the same may be justified.

4. In the case of delivery of the goods without surrender of the Bill(s) of Lading, as soon as all original Bill(s) of Lading for the above goods shall have arrived and/or come into Charterer's possession, to produce and deliver the same to Owner whereupon Charterer's liability hereunder shall cease. Should Owner reasonably deem it desirable, Charterer shall also provide to Owner, prior to Owner being obligated to act hereunder, a guaranty or irrevocable letter of credit issued or confirmed by a bank reasonably acceptable to Owner.

6. ETA (a) NOTIFICATION. The Master shall, as soon as commencing the voyage to the nominated loading port(s)/place(s), notify Charterer and, as applicable, the Vessel's/Charterer's agents of the Estimated Time of Arrival (ETA) at the first load port/place. Upon departure from the last loading port/place, the Master shall notify the same parties of the ETA at the first discharge port/place. The Master shall, duration of the voyage permitting, give the same parties notice for each discharge port/place of 72/48/24 hours in advance of ETA and such other notices as Charterer may reasonably request.

(b) INABILITY TO TRIM. Should the Vessel be unable to trim to an even keel for arrival at any discharge port(s)/place(s), the Master shall notify Charterer as soon as possible after becoming aware of same, including in such notice estimated arrival draft forward and aft.

(c) ETA ALTERATION. An alteration of more than three (3) hours in the twenty-four (24) hour notice or an alteration of more than twelve (12) hours in any other notice given pursuant to paragraph (a) above shall be advised by the Master to Charterer and, as applicable, to the Vessel's/Charterer's agents.

(d) FAILURE TO COMPLY. If the Master fails to comply with the requirements of paragraphs (a), (b) and/or (c)

above, any delay resulting therefrom shall not count as laytime or, if the Vessel is on demurrage, as time on demurrage and any additional expenses resulting therefrom shall be for Owner's account.

(e) FORM OF NOTIFICATION. All advices and notifications required by this Clause shall be made by cable, telex or radio (if the latter, to be subsequently confirmed promptly in writing).

7. Notice of Readiness

Upon arrival of the Vessel at customary anchorage at each port/place of loading or discharge, the Master or Vessel's agent shall give Charterer or its agent Notice of Readiness, ("NOR") by letter, cable, telex, radio or telephone (if by radio or telephone, to be subsequently confirmed promptly in writing) that the Vessel is ready to load or discharge cargo, berth or no berth. NOR shall be tendered only during the Laydays set forth in Part I, Clause B. With respect to the first load port if the Vessel arrives after the Cancelling Date referred to in Clause 8, below and the voyage is maintained, NOR is to be tendered, and laytime shall commence when the Vessel is all fast or twenty-four (24) hours after tender of NOR, whichever occurs first.

8. Cancelling

With respect to arrival at the sole or first load port/place, should Charterer or its agent not have received the NOR referred to in Clause 7. by 1600 hours (local time) on the Cancelling date set forth in Part I, Clause B. (hereinafter called "cancellation time") Charterer shall have the option of cancelling this Charter Party by giving Owner notice of such cancellation within twenty-four (24) hours of the cancellation time: otherwise this Charter Party shall remain in full force and effect. Charterer's said option shall continue to apply even if the Vessel tenders NOR within the aforesaid twenty-four (24) hour period. Cancellation or failure to cancel shall be without prejudice to any claim for damages Charterer may have for late tender of the Vessel's services.

9. Early Loading

If Owner requests and Charterer agrees that the Vessel commence loading prior to the commencement of laydays, time between the commencement of loading and 0600 hours on the Commencing date set forth in Part 1, Clause B, shall, as appropriate, be deducted from or offset against any time the Vessel spends waiting for berth or ullage at the discharge port prior to commencement of discharge. However, if the Vessel proceeds direct to the discharge berth without delay, no benefit will accrue to Charterer hereunder. Laytime at the load port, pursuant to this clause, shall not commence until the Vessel commences loading.

10. Laytime (a) COMMENCEMENT. Except in the instance described in Clause 9 or unless Charterer otherwise agrees, laytime shall not commence before 0600 hours on the Commencing date set forth in Part I, Clause B. Laytime or, if the vessel is on demurrage, time on demurrage, as hereinafter provided, shall commence or resume upon the expiration of six (6) hours after receipt of NOR or upon the Vessel's arrival in berth (i.e. finished mooring when at a sea loading or discharging facility and all fast when loading or discharging alongside a wharf or another vessel in transshipment at sea whichever first occurs. The number of running hours specified as laytime in Part I, Clause 1, shall be allowed Charterer free of expense for the purpose of loading and discharge of cargo and all other Charterer's purposes. Laytime or, if the Vessel is on demurrage, time on demurrage, shall continue to run until cargo hoses have been disconnected. If the Vessel is delayed in excess of two (2) hours after such disconnection solely for Charterer's purposes, laytime or, if the Vessel is on demurrage, time on demurrage, shall be deemed to have continued without interruption from the time of disconnection until the termination of the delay.

(b) EXCLUSIONS. Notwithstanding any other provisions of this Charter Party, time shall not count as laytime or, if the Vessel is on demurrage, as time on demurrage, when spent or lost:

(i) On an inward passage after the expiration of the six (6) hour period following receipt of NOR, including but not limited to awaiting tugs or pilot, moving from anchorage or other waiting place, even if lightening has taken place at the anchorage, to the berth or other place of loading or discharge specified by Charterer;

(ii) Due to overflow, breakdown, inefficiency, repairs or other cause attributable to the Vessel, Master, officers, crew and/or Owner, including inability of the Vessel's facilities to load or discharge the cargo within the time allowed and/or failure to meet Vessel warranties set forth in Clause 1.;

(iii) As a result of a labor dispute, strike, go slow, work to rule, lookout, stoppage or restraint of labor of Master, officers or crew of the Vessel or tugboats or pilots unless, in the case where Charterer has loading/discharge port options, such is in force at the port at the time Charterer nominated said port;

(iv) In handling ballast, oily residues, slops, or the like; lining up and/or draining of pumps/pipelines; cleaning of tanks, pumps, pipelines; bunkering not concurrent with loading and discharge; or for any other purpose(s) of the Vessel;

(v) Due to Owner prohibiting loading or discharge;

(vi) By reason of local law or regulations, action or inaction by local authorities (including, but not limited to, Coast Guard, Naval, Customs, Immigration or Health authorities), with the exception, however, of port closure due to weather and/or sea conditions;

(vii) Due to an escape or discharge of Oil or the Threat of an escape or discharge of Oil on or from the Vessel. (The term "Oil" and the phrase "Threat of an escape or discharge of Oil" shall for the purpose of this Clause have the meanings given them in TOVALOP as defined in Clause 34).

11. Demurrage

Charterer shall pay demurrage per running day and pro rata for a part thereof at the rate stipulated in Part I, Clause J. for all time by which the allowed laytime specified in Part I, Clause 1. hereof is exceeded by the time taken to load and discharge unless the provisions of Clause 10.(b) apply to said loading and discharge time. If, however, demurrage is incurred due to fire or explosion at the port(s)/place(s) of loading and/or discharge, or by breakdown of equipment or machinery in or about the plant of Charterer, shipper or consignee of the cargo; or arises or results from act of God, act of war, strike or lockout or stoppage or restraint of labor from whatever cause, either partial or general, boycott, riot, civil commotion or by arrest or restraint of princes, rulers or people, the rate of demurrage shall be reduced to one-half per running day or pro rata for part of a running day. Delays incurred after tender of NOR at loading or discharge ports which are due to weather and/or sea conditions including but not limited to lightning, storm, wind, waves and/or swells shall count as one-half laytime and, if the Vessel is on demurrage, the rate of demurrage shall be reduced to one-half per running day or pro rata for part of a running day.

12. Time Limitation on Claims

Owner shall notify Charterer within sixty (60) days from the termination of the voyage (or of each voyage if this Charter Party specifies that more than one voyage is to be performed set forth in Part I of this Charter Party if any demurrage has been incurred. Charterer will not be responsible to pay any claim for demurrage arising out of this Charter Party if said sixty (60) day notice is not given and if a claim with full supporting documentation is not presented to Charterer by Owner within ninety (90) days of said termination. Charterer will not be responsible to pay any other claims arising under this Charter Party, except claims for damage to, loss or shortage of cargo and claims against the Owner by a third party for which indemnity from the Charterer is sought, not presented with full supporting documentation within one-hundred eighty (180) days from said termination.

13. Loading/Discharge Place/Shifting (a) LOCATION/SHIFTING. The Vessel shall load and discharge at a berth, jetty, dock, anchorage, submarine line, alongside a vessel or vessels or a lighter or lighters or any other place whatsoever as ordered by Charterer, any lighterage being at the expense, risk and peril of Charterer unless necessitated by fault of the Vessel. Charterer shall have the right of requiring the Vessel to shift to another such berth or place once or more often on payment of all additional expenses incurred including additional bunkers at replacement cost. For the purpose of freight payment the places grouped in Port and Terminal Combinations in Worldscale current at the date of commencement of loading are to be considered as berths within a single port, Charterer paying shifting expenses in accordance with the foregoing. Time spent shifting shall count as laytime or, if the Vessel is on demurrage, as time on demurrage. When the Vessel loads or discharges at a sea terminal, it shall be properly equipped at Owner's expense for loading or discharging at such place, including suitable ground tackle, mooring lines and equipment for handling submarine lines at least ten (10) tons in weight.

(b) SAFE LOCATIONS. Charterer shall exercise due diligence to order the Vessel to port(s)/place(s) which Charterer considers safe for the Vessel and where subject to the provisions of paragraphs (c) below it may always lie safely afloat, but notwithstanding anything contained in this or any other clause of this Charter Party (whether printed or typed). Charterer shall not be deemed to warrant the safety of any port/place, and any reference to a safe port/place designated by Charterer shall be construed to involve no more than a duty of due diligence as aforesaid on Charterer's part. In no circumstances shall Charterer be under any liability in respect of the safety of any port/place except for loss or damage caused by its failure to exercise due diligence as aforesaid.

(c) LIGHTENING. If in accordance with any Clause of this Charter Party, Charterer orders the Vessel to a port/place of discharge which owing to insufficient depth of water cannot accommodate the Vessel with the quantity of cargo on board. Charterer undertakes to discharge sufficient cargo into vessels or lighters to enable the Vessel to reach and lie always safely afloat at such discharge port or place.

(d) OFF-BERTH. Charterer shall have the right to shift the Vessel from a loading and/or discharge berth or other place if the Vessel fails to meet the pumping and/or heating warranties set forth in Clauses 1.(a), 15.(c) and 25. so as to avoid delay to other vessels waiting to use such berth or place. Charterer shall also have the right to shift the Vessel from a loading and/or discharge berth or other place due to an unsafe condition of the Vessel. In such situation(s), Charterer shall not be obliged to provide an alternative loading or discharge berth or other place to the one from which the Vessel was shifted. However, Charterer shall exercise due diligence to arrange prompt reberthing and commencement of loading or discharge once the Vessel has corrected the deficiency(ies). All expenses related to this shifting and any reberthing shall be for Owner's account and all time lost by reason of the foregoing shall not count as laytime or, if the Vessel is on demurrage, as time on demurrage.

14. Lightening/Discharge at Sea (a) CHARTERER'S ACCOUNT. Except when required by reason of fault attributable to the Vessel, any lightening or discharge at sea or at a place outside a port shall be at the expense of Charterer and, notwithstanding any other provisions to the contrary herein, time used for such lightening or discharge shall count as laytime or, if the Vessel is on demurrage, as time on demurrage, as provided below:

(i) If the Vessel is lightened at sea or at a place outside a port, laytime or, if the Vessel is on demurrage, time on demurrage shall commence when the Vessel arrives at the lightening site designated by Charterer and shall end when disconnection of the cargo hoses from the last off-taking vessel has been completed.

(ii) If the Vessel is fully discharged at sea or at a place outside a port, laytime or, if the Vessel is on demurrage, time on demurrage shall commence upon the expiration of six (6) hours after the Vessel arrives at the lightening site designated by Charterer or when the Vessel is all fast alongside the first cargo receiving vessel, whichever occurs first, and end when disconnection of the cargo hoses from the last cargo off-taking vessel has been completed.

(b) LIGHTENING MASTER. If the Vessel is lightened or discharged at sea as aforesaid, Charterer shall, at its expense, provide a Lightening Master and/or portable lightening equipment to the Vessel in order to assist in the lightening or discharge operation, as the case may be. Such Lightening Master shall only be an adviser to Master of the Vessel, who shall continue to be fully and solely responsible for the operation, management and navigation of the Vessel during the entire lightening or discharge operation.

15. Pumping in and out (a) RISK. The cargo shall be pumped into the Vessel at the expense and risk of Charterer only up to the Vessel's permanent hose connections. The cargo shall be pumped from the Vessel at the expense and risk of Owner only up to the Vessel's permanent hose connections where delivery of the cargo shall be taken by Charterer or cargo consignees. If required by Charterer, the Vessel, after discharge, shall clear shore pipelines of cargo by pumping water through them and the time thereby consumed shall count as laytime or, if the Vessel is on demurrage, as time on demurrage. The Vessel shall provide all necessary pumps, power and hands required on board for mooring and unmooring, connecting or disconnecting of hoses (including shore hoses, if requested by Charterer and shore authorities permit) for loading and discharge. All overtime incurred by officers and crew in loading and/or discharge shall be for the account of the Vessel.

(b) INERT GAS SYSTEM. Owner undertakes that the Vessel is equipped with a fully operational Inert Gas System which is in use on the date of this Charter Party and shall so remain during the period of this Charter Party and that the officers and crew are properly qualified and experienced in the operation of such System. Owner further undertakes that the Vessel shall arrive at the loading port(s)/place(s) with its cargo tanks inerted with an atmosphere below eight percent (8%) oxygen by volume and that such tanks shall remain inerted throughout the time of commencement of loading of cargo until the completion of discharge of the cargo. Any time lost, whether or not the Vessel is on demurrage, owing to deficient or improper operation of the Inert Gas System, shall be for Owner's account. The Vessel's Inert Gas System shall fully comply with Regulation 62, Chapter II-2 of the SOLAS Convention 1974 as modified by its Protocol of 1978 and Owner undertakes that such System shall be operated by the officers and crew in accordance with the operational procedures set out in the IMO publication entitled "Inert Gas Systems 1983" as may, from time to time, be amended.

(c) WARRANTY. Owner warrants that the Vessel is capable of discharging a full cargo (be it one or more grades) as stipulated in Part I, Clause E. and Clause 2.(b), within twenty-four (24) hours, or pro rata thereof in respect of a part cargo, from the commencement of pumping or that the Vessel shall maintain an average discharge pressure of one hundred (100) PSI at the Vessel's manifold throughout the period of discharge provided that shore facilities are capable of accepting discharge within such time or at such pressure. The shore receiving facilities shall have the right to measure discharge pressure at the Vessel's manifold. Any additional time, excluding stripping for cargo recovery enhancement and Crude Oil Wash (see (d) hereunder and Part I, Clause A.), used owing to the inability of the Vessel to discharge in accordance with the pumping warranties above shall not count as laytime or, if the Vessel is on demurrage, as time on demurrage. If the terminal or place of discharge does not allow or permit the Vessel to meet the above warranties or requires discharging grades consecutively, the Master shall forthwith issue a Letter of Protest (which should if practicable be acknowledged) to such terminal or place and shall immediately advise Charterer by cable, telex or radio. Charterer will not consider any claim by Owner for additional time used in the foregoing circumstances unless Owner furnishes the following documentation:

(i) An hourly pumping log, signed by a responsible officer of the Vessel and a terminal or Charterer's representative, showing the pressure maintained at the manifold throughout discharge and, in the absence of a signature from a terminal or Charterer's representative, a copy of a Letter of Protest;

(ii) Copies of all Letters of Protest in addition to the one referred to in (i) above issued or received by the Vessel in relation to the discharge in question; and (iii) Copies of any other documents generated by the Vessel or by the shore receiving terminal relevant to the discharge in question.

Any pumping time lost solely due to restrictions imposed by the terminal or place of discharge shall count as laytime or, if the Vessel is on demurrage, as time on demurrage.

(d) CRUDE OIL WASHING. Charterer shall have the right to require the Vessel, if it is so equipped, to Crude Oil Wash the cargo tanks and, in such case, the allowed pumping hours (i.e., the twenty-four (24) hours of pumping time or the number of pumping hours taken to discharge the entire cargo when Vessel maintains the applicable manifold pressure in accordance with paragraph (c) whichever is applicable shall be increased by the actual time used in performing crude oil washing up to the maximum hours set forth in Part I, Claus A. for Crude Oil.

Washing operations. If less than all of the tanks are washed, the said maximum hours shall be prorated at the basis of the number of tanks washed to the total number of cargo tanks and the hours resulting from such proration shall be added to the allowed pumping hours. The officers and crew shall be fully qualified and experienced in Crude Oil Washing procedures. In the absence of instructions from Charterer that the Vessel conduct Crude Oil Washing, the Vessel may nevertheless do so to comply with Marpol 1973/78 minimum Crude Oil Washing requirements. In such circumstances the allowed pumping hours shall be increased as aforesaid. If Crude Oil Washing is not conducted, Charterer shall have the right to require Vessel to remain at berth for clingage rundown or other cargo recovery technique. The time for such clingage rundown or other cargo recovery technique shall not exceed to (10) hours and the time so used count as laytime or, if Vessel is on demurrage, as time on demurrage.

(e) CLOSED LOADING. Owner warrants that the Vessel can and will operate in a fully closed loading mode throughout the term of this Charter Party.

(f) HOSES. Hoses for loading and discharge shall be furnished by Charterer and shall be connected and disconnected by Charterer or, at the option of Owner, by Owner at Charterer's risk and expense.

16. Dues, Taxes and Other Charges

Unless otherwise specified in Worldscale or as set forth in Part I, Clause L, if applicable, and to the extent not prohibited by law, all dues, taxes and other charges assessed upon the cargo loaded or discharged shall be paid by Charterer, and dues, taxes and other charges assessed upon the Vessel (including those assessed on the quantity of cargo loaded or discharged, on the freight, or in accordance with government regulations) shall be paid by Owner. The Vessel shall be free of charges for the use of any berth, wharf, dock, place or mooring facility arranged by Charterer for the purpose of loading and discharge of cargo, however, Owner shall be responsible for such charges when incurred solely for the Vessel's purposes, including, but not limited to, awaiting Owner's orders, tank cleaning, ballasting/deballasting, or repairs, or for reasons beyond Charterer's control, before, during or after loading and/or discharge.

All dues, taxes and other charges incurred, either payable by Owner or by Charterer, shall be settled directly by Owner or its Agent. All charges payable by Charter pursuant to this Clause shall be separately billed by Owner to Charterer together with supporting documents.

17. Agency

Unless otherwise agreed, Charterer shall nominate the Vessel's agents at each loading and discharging port/place. Such agents shall be appointed, instructed and paid for by Owner.

18. Cargoes Excluded (a) VAPOR PRESSURE. Cargo shall not be shipped which has a vapor pressure at one hundred degrees Fahrenheit (100° F.) in excess of thirteen and one-half pounds (13.5 lbs.) as determined by the current A.S.T.M. Method (Reid) D-323.

(b) FLASH POINT. Cargo having a flash point under one hundred and fifteen degrees Fahrenheit (115° F.,—closed cup) A.S.T.M. Method D-56 shall not be loaded from lighters but this Clause shall not restrict Charterer from loading or topping off crude oil from vessels or barges inside or outside of any port.

19. Ice (a) RIGHT OF CHARTERER. Notwithstanding any other provisions of this Charterer Party, Charterer shall have the right, with respect to (b), (c), and (d) below, to nominate alternate ice free loading or discharge port(s)/place(s) which are not within the ranges set forth in Part I, Clause C. and/or D.

(b) DURING VOYAGE. In case port(s)/place(s) of loading or discharge should be inaccessible owing to ice, the Vessel shall direct its course according to Master's judgment, notifying by cable, telex or radio Charterer, who shall give orders for alternative loading or discharge port(s)/place(s) free from ice and where there are facilities for the loading or reception of the cargo in bulk. In this event, freight shall be paid at the rate applicable under this Charter Party to such alternate loading or discharge port(s)/place(s) and any extra expenses, including additional bunkers at replacement cost, incurred as a result of the issuance of changed orders shall be pad for by Charterer and any time thereby lost to the Vessel proceeding to such alternative loading or discharge port versus proceeding there direct shall count as detention which shall be payable as demurrage at the demurrage rate stipulated in Part I, Clause J.

(c) AT PORT. If, on or after the Vessel's arrival at a loading or discharge port(s)/place(s), the Master considers it dangerous to remain at such port or place for fear of the Vessel being frozen in or damaged the Master shall communicate by cable, telex or radio with Charterer, who shall cable, telex or radio in reply giving orders to proceed to alternate port(s)/place(s) where there is no danger of ice and where there are the necessary facilities for the loading or reception of the cargo in bulk or to remain at the original port at Charterer's risk. In the event Charterer requests the Master to proceed to alternate port(s)/place(s) of loading or discharge, freight shall be paid at the rate applicable under this Charterer Party to such alternate loading or discharge port(s)/place(s) and any extra expenses, including additional bunkers at replacement cost, incurred as a result of such request shall be paid for by Charterer and any time thereby lost to the Vessel by proceeding to such alternate loading or discharge port(s)/place(s) versus proceeding there direct shall count as detention which shall be payable as demurrage at the demurrage rate stipulated in Part I, Clause J. In the event Charterer requests the Master to remain at the original port or place any time so lost on account of ice shall count as detention which shall be payable as demurrage at the rate stipulated in Part I, Clause J.

(d) INSURANCE. Save as otherwise provided in this clause, Owner shall remain solely responsible for arranging insurance on the Vessel including appropriate cover against any risk of loss or damage by ice. In the event of Charterer giving orders under this clause for alternative loading or discharge port(s)/place(s) lying outside the loading or discharge range(s) stipulated in this Charterer Party, and lying outside the Institute Warranty Limits, Charterer shall pay any reasonable additional premium required for breach of such Limits. In no case shall the Charterer be held reasonable (whether under Clause 13.(b) of this Charter Party or otherwise) for any loss or damage sustained by the Vessel through contact with ice.

20. General Cargo

Charterer has the option of shipping, in available dry cargo space, packaged products and/or general cargo which are not dangerous or hazardous. Freight shall be payable at the rate stipulated in Part I, Clause G and Charterer shall pay in addition all expenses incurred solely as a result of the packaged products/general cargo being carried. Delay incurred, as a result of exercising such options, shall count as laytime, or if the Vessel is on demurrage, as time on demurrage but only to the extent such time is not concurrent with time used for loading and/or discharge of the cargo described in Part I, Clause F.

21. Quarantine

Time lost at any port due to quarantine shall not count as laytime or, if the Vessel is on demurrage, as time on demurrage, unless such quarantine was in force at the time when such port was nominated by Charterer.

22. Cleaning (a) INSPECTOR/RESPONSIBILITY. Owner shall clean the tanks, pipes and pumps of the Vessel to the satisfaction of a cargo inspector appointed by Charterer. Neither Owner nor the Vessel shall be responsible for any admixture of more than one quality of oil is shipped, nor for leakage, contamination or deterioration of quality of the cargo unless the admixture, leakage, contamination or deterioration results from (i) an unseaworthy condition existing at the time of loading or at the inception of the voyage which was discoverable by the exercise of due diligence, or (ii) error or fault of the servants of Owner in the loading, care or discharge of the cargo.

(b) INSPECTION. If the cargo set forth in Part I, Clause F, is clean product and internal inspection of the tanks is required by Charterer, Owner shall gasfree the tanks as necessary. Any time used for internal tank inspection and any re-inerting of the Vessel shall count as laytime or, if the Vessel is on demurrage, as time on demurrage. Any time required following such inspection for cleaning and gasfreeing shall not count as laytime or, if the Vessel is on demurrage, as time on demurrage. Compliance with this Clause shall not be deemed compliance with Owner's obligations under Clause I, which are in no way lessened by this Clause.

23. Oil Pollution Prevention

Owner shall ensure that the Master shall:

(i) At the start of the ballast passage, before presenting the Vessel for loading hereunder, retain on board all oil residues remaining on board from the previous cargo;

(ii) During tank washing collect washings into one cargo compartment and, after maximum separation of free water, discharge such water overboard to the extent permitted by applicable law and regulations;

(iii) Thereafter notify Charterer of the amounts of oil and water in the segregated tank washings, and the origin of the oily residues.

On being notified in accordance with sub-paragraph (iii) of this Clause, Charterer shall, before the Vessel's arrival at the loading port(s)/place(s) give instructions for the handling of such segregated tank washings and Owner shall ensure that the Master, on the Vessel's arrival at the loading port(s)/place(s), shall arrange in conjunction with the cargo suppliers, for the measurement of the quantity of such segregated tank washings and shall make a note of such quantity in the Vessel's ullage record.

If Charterer requires the cargo to be loaded on top of such segregated tank washings, freight in accordance with Clause 3, shall be payable on such quantity of segregated tank washings up to a tonnage equivalent to one percent (1%) of the Vessel's deadweight tonnage on summer marks and Owner shall ensure that the Master shall keep the water in such segregated tank washings to a minimum which shall in any event not exceed fifteen hundredths of one percent (0.15%) of the Vessel's deadweight tonnage on summer marks.

If Charterer requires such segregated tank washings to be kept separate from the cargo to be loaded. Charterer shall pay for any deadfreight so incurred, upon presentation by Owner of satisfactory supporting documentation.

If Charterer requires the Vessel to discharge tank washings ashore at a loading port where slop facilities are available, the time shall not count as laytime or, if the Vessel is on demurrage, as time on demurrage, and all additional expenses thereby incurred shall be for Owner's account.

24. Inspection, Measurement and Representation (a) INSPECTION. Charterer shall have the right to require inspection and/or ullaging of the Vessel's tanks by a cargo inspector it designates at loading and/or discharge port(s)/place(s) to ascertain the quantity and quality of the cargo and residues and the quantity of the water on board. Depressurization of the tanks to permit inspection and/or ullaging shall be carried out in accordance with recommendations in the latest edition of the "International Safety Guide for Oil Tankers and Terminals." Charterer shall also have the right to inspect and take samples from the bunker tanks and other non-cargo spaces. Any delay to the Vessel caused by such inspections, ullaging, sampling or associated depressurizing/repressurizing of tanks shall count as laytime or, if the Vessel is on damurrage, as time on demurrage. Charterer shall further have the right at loading or discharge port(s)/place(s) to inspect the Vessel as part of Charterer's or its nominee's vessel inspection program. Such inspection shall be conducted in conjunction with the Master and/or designated representative of the Master for the purpose of determining whether the Vessel is being maintained and operated so as to warrant future employment consideration by Charterer.

(b) MEASUREMENT. The Master shall ascertain the contents of all tanks before and after loading and before and after discharge, and shall prepare tank-by-tank ullage reports of the cargo, water and residues on board which shall be promptly made available to Charterer or its representatives if requested. Each such ullage report shall show actual ullage/dips, and densities at observed and standard temperatures (15 degrees Celsius or 60 degrees Fahrenheit). All quantities shall be expressed in cubic meters and gross barrels at both observed and standard temperatures.

(c) REPRESENTATION. Charterer shall have the right to have a representative on board at the discharge port(s)/place(s) in order to monitor cargo operations, provide advice on maximizing cargo outturn and assist the Master in fulfilling his obligation to ensure that proper pollution prevention procedures are in place. Any delay resulting solely from cargo monitoring, or advising regarding outturn maximization shall account as laytime or, if the Vessel is on demurrage, as time on demurrage.

25. Heating

If the Vessel is described as having cargo heating capability in Part I, Clause A., Owner warrants that the Vessel is capable of heating the cargo up to and maintaining it at a maximum temperature of 135° F./57° C. If requested by Charterer, the Vessel shall heat the cargo so as to maintain the temperature at which the cargo was loaded (up to maximum of 135° F.) throughout the voyage including the entire discharge. If requested by Charterer and if the length of the voyage allows, the Vessel shall increase and maintain the temperature of the cargo from the loaded temperature to a temperature specified by Charterer, up to maximum of 135° F., and Charterer shall pay for extra bunkers consumed solely in increasing the temperature as aforesaid at replacement cost. If the Vessel fails to maintain the loaded temperature or to increase and maintain temperature of the cargo, as requested by Charterer, Charterer shall, in addition to the remedy set forth in Clause 13.(d) have the option to hold the Vessel off the berth and/or to suspend discharging until the cargo is properly heated, and Owner shall be responsible for all loss, shortage or damage to the cargo resulting therefrom and also for any resulting delay. The time lost thereby shall not count as laytime or, if the Vessel is on demurrage, as time on demurrage; and, if steam must be supplied from a shore or other facility to maintain the said temperature, the cost shall be for Owner's account.

26. Protection and Indemnity (P&I)

Owner warrants that, throughout the Vessel's service under this Charter Party, Owner shall maintain in force full and valid Protection and Indemnity Insurance as set out in the Protection and Indemnity Clause attached to this charter and identified as Attachment "A".

27. Bunkers

When, in connection with the performance of any voyage provided for in this Charter Party, Owner plans to purchase bunkers at any port(s)/place(s), Owner shall purchase the bunkers from Charterer or its designated affiliate(s) whenever they are so available at competitive prices. In the event lower prices are quoted to Owner by any supplier at the port(s) in question, Owner shall give Charterer or its designated affiliate(s) the opportunity to meet such quotation.

28. General Exceptions (a) EVENTS. Neither the Vessel nor the Master or Owner, unless otherwise in this Charter Party so provided, shall be or shall be held liable for any loss of or damage to the cargo arising or resulting from any act, neglect, default, or barratry of the Master, pilots, mariners or other servants of Owner in the navigation or management of the Vessel; fire, unless caused by the personal design or neglect of Owner; collision, stranding, or peril, danger or accident of the sea or other navigable waters; or from explosion, bursting of boilers, breakage of shafts or any latent defect in hull, equipment, or machinery. And neither the Vessel, the Master or Owner, nor Charterer, shall, unless otherwise in this Charter Party expressly provided, be responsible for loss, damage, delay or any failure in performing hereunder arising or resulting from: act of God; act of war; perils of the seas; act of public enemies, pirates or assailing thieves; arrest or restraint of princes, rulers or people, or seizure under legal process provided bond is promptly furnished to release the Vessel or cargo; strike or lockout or stoppage or restraint of labor from whatever cause either partial or general; or riot or civil commotion.

(b) NO AFFECT ON WARRANTIES. The exceptions stated in Paragraph (a) of this Clause shall not affect owner's warranties and undertakings with respect to the condition of the Vessel as set forth in Clause I. and elsewhere in this Charter Party, the obligations of Owner in respect of the loading, handling, stowage, carriage, custody, care and discharge of the cargo and/or the rights or obligations of either Owner or Charterer with respect to laytime or demurrage as elsewhere provided in this Charter Party.

29. Bills of Lading (a) SIGNING. Bills of Lading shall be signed by the Master as presented, the Master attending daily, if required, at the offices of Charterer or its agents. However, at Charterer's option, Charterer or its agents may sign Bills of Lading on behalf of the Master. All Bills of Lading shall be without prejudice to this Charter Party and Charterer shall indemnify Owner against all consequences or liabilities which may arise from any inconsistency between this Charter Party and any Bills of Lading or other documents signed by Charterer or its agents or by Master at their request or which may rise from an irregularity in papers supplied by Charterer or its agents. Such right of indemnity shall not apply to any loss or damage arising from (i) signature by or on behalf of the Master of a Bill of Lading containing statements of fact which he (or other party signing) knows to be untrue, or (ii) failure by the Master (or other party signing) to exercise proper care to check the Bills of Lading for their accuracy. The Master shall neither be required to sign Bills of Lading for any port which the Vessel cannot enter, remain at and leave in safety and always afloat nor for any blockaded port(s)/place(s).

(b) STATUTORY PROVISIONS/OTHER TERMS. The carriage of cargo under this Charter Party and under all Bills of Lading issued for the cargo shall be subject to the statutory provisions and other terms set forth or specified in sub-paragraphs (i) through (vi) of this Clause and such terms shall be incorporated verbatim or be deemed incorporated by reference in any such Bill of Lading. In such sub-paragraphs and in any Act referred to therein, the word "Carrier" shall include Owner and any chartered owner of the Vessel.

(i) CLAUSE PARAMOUNT: Any Bill of Lading issued for the carriage of cargo under this Charter Party shall have effect subject to the provisions of the Carriage of Goods by Sea Act of the united States, approved Apr. 16, 1936, except that if the Bill of Lading is issued at a place where any other Act, ordinance or legislation gives statutory effect to the International Convention for the Unification of Certain Rules relating to Bills of Lading at Brussels, August 1924, then the Bill of Lading shall have effect subject to the provisions of such Act, ordinance or legislation. The applicable Act, ordinance or legislation (hereinafter called the "Act") shall be deemed to be incorporated herein and nothing herein contained shall be deemed a surrender by the Carrier of any of its rights or immunities or an increase of any of its rights or immunities or an increase of any of its responsibilities or liabilities under the Act. If any term of the Bill of Lading be repugnant to the Act to any extent, such term shall be void to that extent but no further.

(ii) JASON CLAUSE: In the event of accident, danger, damage or disaster before or after the commencement of the voyage, resulting from any cause whatsoever, whether due to negligence or not, for which, or for the consequence of which, Carrier is not responsible, by statute, contract or otherwise, the cargo shippers, consignees or owners for the cargo shall contribute with Carrier in General Average to the payment of any sacrifices, losses or expenses of a General Average nature that may be made or incurred and shall pay salvage and special charges incurred in respect of the cargo. If a salving ship is owned or operated by the Carrier, salvage shall be paid for as fully as if said salving ship or ships belonged to strangers. Such deposit as Carrier or is Agents may deem sufficient to cover the estimated contribution of the cargo, and any salvage and special charges thereon shall, if required, be made by the cargo shippers, consignees or owners of the cargo to the Carrier before delivery.

(iii) GENERAL AVERAGE: General Average shall be adjusted, stated and settled according to York/Antwerp Rules 1974, as amended 1990, and, as to matters not provided for by those Rules, according to the laws and usages at the place set forth in Part I, Clause K.(a) (except that any payment made by Carrier to Charterer pursuant to Clause 34.,(b) or to a Government or others to "remove" oil or a "threat of oil pollution" as defined in TOVALOP, as well as any other payments, with respect to the Vessel or Owner's liability for Oil Pollution damages, shall not be deemed to represent General Average sacrifices or expenditures). If a General Average statement is required, it shall be prepared at such place by an Adjuster located there appointed by the Carrier and approved by the Charterer. Such adjuster shall attend to the settlement and the collection of the General Average, subject to customary charges. General Average Agreements and/or security shall be furnished by Carrier and/or Charterer, and/or owner and/or consignee of the cargo, if requested. Any cash deposit being made as security to pay General Average and/or salvage shall be remitted to the Average Adjuster and shall be held by the Adjuster at the Adjuster's risk in a special account in a duly authorized and licensed bank at the place where the General Average statement is prepared.

(iv) BOTH TO BLAME: If the Vessel comes into collision with another vessel as a result of negligence of the other vessel and any act, neglect or default of the Master, mariner, pilot or the servants of the Carrier in the navigation or in the management of the Vessel, the owners of the cargo carried hereunder shall indemnify the Carrier against all loss or liability to the other or non-carrying ship or its owners insofar as such loss or liability represents loss of, or damage to, or any claim whatsoever of the owners of said cargo, paid or payable by the other or non-carrying ship or its owners to the owners of said cargo and set off, recouped or recovered by the other or non-carrying ship or its owners as part of their claim against the carrying ship or Carrier. The foregoing provisions shall apply where the owners, operators or those in charge of any ship or ships or objects other than, or in addition to, the colliding ships or objects are at fault in respect of a collision or contact.

(v) LIMITATION OF LIABILITY: Any provision of this Charter Party to the contrary notwithstanding, Owner shall have the benefit of all limitations of, and exemptions from, liability accorded to the owner or chartered owner of vessels by any statute or rule of law for the time being in force.

(vi) DEVIATION: The Vessel shall have liberty to call at any port(s)/place(s) in any order, to sail with or without pilots, to tow or be towed, to go to the assistance of vessels in distress, to deviate for the purpose of saving life or property or of landing any ill or injured person board, and to call for fuel at any port or ports in our out of the regular course of the voyage. Any salvage shall be for the sole benefit of Owner.

30. Lien

Owner shall have a lien on all cargoes and subfreights for all amounts when due under this Charter Party, and Charterer shall have a lien on the Vessel for all monies paid in advance and not earned, all disbursements and advances for Owner's account (if Charterer should, at its option, elect to make any such disbursements . . . advances) including commissions, cost of insurance and expenses thereon and for any damages sustained by Charterer as a result of breach of this Charter Party by Owner.

31. War Clauses (a) BLOCKADE/HOSTILITIES. (1) If any loading or discharge port(s)/place(s) named in this Charter Party to which the Vessel may properly be ordered pursuant to the terms of the Bills of Lading be blockaded, or (2) if owing to any war, hostilities, warlike operations, civil war, civil commotions, revolutions or the operation of international law (i) entry to any such port(s)/place(s) of loading or of discharge or the loading or discharge of cargo at any such port(s)/place(s) be considered by the Master or Owner in his or their discretion dangerous or prohibited or (ii) it be considered by the Master or Owner in his or their discretion dangerous or impossible for the Vessel to reach any such port(s)/place(s) of loading or discharge. Charterer shall have the right to order the cargo, or such part of it as may be affected, to be loaded or discharged at any other safe port(s)/place (s) of loading or discharge within the range of loading or discharge port(s)/place(s), respectively, if such is established in Part I, Clauses C. or D. provided such other port(s)/place(s) are not blockaded or that entry thereto or loading or discharge of cargo thereat is not in the Master's or Owner's discretion dangerous or prohibited. If in respect of a port/place or discharge, no order be received from Charterer within forty-eight (48) hours after it or its agents have received from Owner a request for the nomination of a substitute port. Owner shall then be at liberty to discharge the cargo at any safe port which it or the Master may in their or his discretion determine (whether within the range of discharge ports established in Part I, Clause D. or not) and such discharge shall be deemed to be due fulfillment of the Charter Party insofar as cargo so discharged is concerned. In the event the cargo is loaded or discharged at any such other port(s)/place(s) within the respective range of loading or discharge port(s)/place (s) which may have been established in Part I, Clause C. or D., the Charter Party shall be read in respect of freight and all other conditions whatsoever as if the voyage performed were that originally designated. In the event, however, that the Vessel discharges the cargo at a port(s)/place(s) outside the range of discharge port(s)/place(s) which may have been established in Part I, Clause D., freight shall be paid as for the voyage originally designated and all extra expenses involved in reaching the actual port of discharge and or discharge of the cargo thereat shall be paid by Charterer and/or cargo owner. In this latter event, Owner shall have a lien on the cargo for all such extra expenses.

(b) COMPLIANCE WITH DIRECTIONS. The Vessel shall have liberty to comply with any directions or recommendations as to departure, arrival, routes, ports of call, stoppages, destinations, zones, waters, delivery or in any other wise whatsoever given by the government of the nation under whose flag the Vessel sails or any other government or local authority including any de facto government or local authority or by any person or body acting or purporting to act as or with the authority of any such government or authority or by any committee or person, having under the terms of the war risk insurance covering the Vessel, the right to give any such directions or recommendations. If by reason of or in compliance with any such directions or recommendations, anything is done, or is not done such shall not be deemed a deviation. If by reason of or in compliance with any such directions or recommendations, the Vessel does not proceed to the port(s)/place(s) of discharge originally designated or to which it may be have been ordered pursuant to the terms of the Bill(s) of Lading, the Vessel may proceed to any safe port(s)/place(s) of discharge as the Master or Owner in its or their discretion may determine and there discharge the cargo. Such discharge shall be deemed to be due fulfillment of this Charter Party and Owner shall be entitled to freight as if discharge had been effected at the port(s)/place(s) originally designated or to which the vessel may have been ordered pursuant to the terms of the Bill(s) of Lading. All extra expenses involved in reaching any such other port(s)/ place(s) of discharge and discharging the cargo there shall be paid in by Charterer and/or cargo owner and Owner shall have a lien on the cargo for freight and all such expenses 32. Backloading Charterer may load the Vessel with a part cargo at any port(s)/place(s) of discharge to which the Vessel may have been ordered. Owner agrees to discharge such cargo at port(s)/place(s) nominated by Charterer in accordance with Part I, Clause D. of this Charter Party or at any other discharge port(s)/place(s), provided such lie within the rotation of discharge port(s)/place(s) previously nominated. Freight in respect of such cargo shall be calculated at the demurrage rate stipulated in Part I, Clause J. for all additional time used by the Vessel as a result of loading and discharge of such cargo. Any additional port charges incurred (including additional bunkers consumed at replacement cost, if shifting is involved) as a result of loading and discharge of such cargo shall be for Charterer's account.

33. Assignments and Sublet (a) ASSIGNMENTS. Charterer, upon notice (by letter, telex or cable) to Owner may assign this Charter Party to any company related or affiliated to it.

(b) SUBLET. Charterer shall have the right to sublet the Vessel but, in the event of such a sublet, Charterer shall always remain responsible for the due fulfillment of all Charter Party terms and conditions.

34. TOVALOP (a) WARRANTY. Owner warrants that the Vessel is a participating Tanker in TOVALOP and will so remain during the term of this Charter Party, provided however that nothing herein shall prevent Owner, upon prior notice to Charterer, from withdrawing from TOVALOP under Clauses III(B) or X thereof, and provided further that upon any withdrawal under Clause III(B) or under Clause X, Charterer shall have the option to terminate this Charter Party.

(b) PREVENTION/MINIMIZATION. When an escape or discharge of Oil occurs from the Vessel and causes or threatens to cause Pollution Damage, or when there is a threat of an escape or discharge of Oil (i.e. a grave and imminent danger of the escape or discharge of Oil which, if it occurred, would create a serious danger of Pollution Damage), then Charterer may, at its option, upon notice to Owner or Master, undertake such measures as are reasonably necessary to prevent or minimize such damage or to remove the threat, unless Owner promptly undertakes the same. Charterer shall keep Owner advised of the nature and result of any such measures taken by it, and if time permits, the nature of the measures it intends to take. Any of the aforementioned measures taken by Charterer shall be deemed taken on Owner's authority and as Owner's agent, and shall be at Owner's expense except to the extent that:

(i) Any such escape or discharge or threat was caused or contributed to by Charterer, or (ii) By reason of the exceptions set out in Article III, paragraph 2, of the 1969 International Convention on Civil Liability for Oil Pollution Damage, Owner is, or, had the said convention applied to such escape or discharge or to the threat, would have been exempt from liability for same, or (iii) The cost of such measures together with all other liabilities, costs and expenses of Owner arising out of or in connection with such escape or discharge or threat removal exceeds the maximum liability applicable to the Vessel under TOVALOP at the time of such escape or discharge or threat, save and insofar as Owner shall be entitled to recover such excess under either the 1971 International Convention on the Establishment of an International Fund for Compensation for Oil Pollution Damage or under any protocol thereto or under CRISTAL.

PROVIDED ALWAYS that if Owner in its absolute discretion considers said measures should be discontinued, Owner shall notify Charterer and thereafter Charterer shall have no right to continue said measures under the provisions of this Clause and all further liability to Charterer under this Clause shall thereupon cease.

(c) NO DEROGATION OF RIGHTS. The above provisions are not in derogation of such other rights as Charterer or Owner may have under this Charter Party or may otherwise have or acquire by law or any international convention or TOVALOP.

(d) DEFINITIONS. The term "TOVALOP" as used in this Charter means the Tankers Owners Voluntary Agreement Concerning Liability for Oil Pollution dated Jan. 7, 1969, as amended from time to time, and the term "CRISTAL" means the Contract Regarding an Interim Supplement to Tanker Liability for Oil Pollution dated Jan. 14, 1971, as amended from time to time. The terms "Oil" and "Pollution Damage" shall, for the purposes of this Clause, have the meanings ascribed to them in TOVALOP provided, that, in any incident to which the TOVALOP Supplement applies, Owner's limit of liability hereunder shall be as provided for in the said Supplement.

(e) CLAIMS. In the event of an actual or threatened escape or discharge of oil occurring from the Vessel whilst a participating Tanker in TOVALOP, Owner shall comply with the terms of TOVALOP and shall exercise due diligence to provide persons concerned with the escape or discharge or the threat thereof) with a copy of the TOVALOP Agreement and confirmation that Owner was, at the time of such escape or discharge or threat, a Participating Owner.

35. Drugs and Alcohol

Owner acknowledges that it is aware of the problem of drugs and alcohol abuse and that it has a policy covering the Vessel, which meets or exceeds the "Guidelines for the Control of Drugs and Alcohol Onboard Ship" as published by the Oil Companies International Marine Forum (January 1990).

Owner further warrants that this policy will be maintained throughout the period covered by this Charter Party and Owner will exercise due diligence to ensure that the policy is complied with.

36. U.S. Customs Regulations (SCAC)

Owner warrants that, in accordance with 19 CFR Parts 4.7A and 178.2 as amended, it has a Standard Carrier Alpha Code (SCAC) which will prefix a Bill of Lading serial number and form a "unique identifier" to be entered on all Bill(s) of Lading. Cargo Manifests, Cargo Declarations and other cargo documents relating to carriage of goods to the United States of America as may be provided for hereunder. Charterer is not responsible for any losses or delays resulting from Owner's failure to comply with the foregoing.

37. Traffic Separation and Routing Recommendations

Owner shall instruct the Master to observe recommendations as to traffic separation and routing as issued from time to time by the International Maritime Organization or as promulgated by the State of the flag of the Vessel or the State in which the effective management of the Vessel is exercised.

38. Arbitration

Any dispute of whatsoever nature arising out of this Charter Party giving rise to a claim or amended claim by either party against the other shall be referred to arbitration in the City of New York or in the City of London, whichever place is set forth in Part I, Clause K. All New York arbitrations shall be held in accordance with the rules of the American Arbitration Association. All London arbitrations shall be held before a single arbitrator and shall be subject to the Arbitration Acts of 1950 and 1979, (including any amendments thereto), except that a period of twenty-one (21) clear days shall be allowed instead of seven (7) clear days for appointments pursuant to Section 10 of the Arbitration Act 1950. The parties hereby consent that any appropriate court at place of arbitration shall have non-exclusive jurisdiction to enforce this arbitration agreement, to enter judgment on the award and to grant any other remedy provided by law in respect of the arbitration proceedings or the award. Personal service of summons or other legal process in proceedings brought in any such court, shall be deemed to have been effectually made upon a party by mailing a copy of such summons or process by registered mail. Awards made in any arbitration held pursuant to this agreement may include an award of cost and reasonable attorney's fees.

39. Interpretation

The interpretation of this Charter Party and the rights and obligations of the parties shall be governed by the laws applicable to charter parties made as set forth in Part I, Clause K. The headings of Clauses are for convenience of reference only and shall not affect the interpretation of this Charter Party. No amendment, modification, waiver or discharge of any item of this Charter Party shall be valid unless in writing and signed by the party to be charged therewith.

It is contemplated that users of the system, including ship owners and charterers, may pay a subscription fee to have access to the network site 40 and perform the functions described above. The subscription may be charged periodically and/or may be further based on the amount of times that the user accesses the system. A fee may further be charged to each party who completes a charter party contract. The fee may be based on a percentage of the fixture amount. Any other known forms of receiving revenues for operating the network site 40, including the placing of advertising banners on the site or the sale of subscriber lists, are readily contemplated to be incorporated into the system of the present invention.

Further, while the invention has been particularly shown and described with respect to charter vessels for the transport of cargo, it could equally be used for arranging the transport of people or livestock, and the transport could be by means of truck or rail transport.

Although the invention has been described in detail in the foregoing embodiments, it is to be understood that they have been provided for purposes of illustration only and that other variations both in form and detail can be made thereupon by those skilled in the art without departing from the spirit and scope of the invention, which is defined solely by the appended claims.

I claim:

1. A method for providing an interface between charterers and ship owners, comprising:
   receiving from a charterer an electronic description of cargo to be transported, its destination and location;
   receiving from a ship owner an electronic description of a ship for transporting cargo;
   processing the electronic descriptions to match the cargo with available ships;
   transmitting from the ship owner to the charterer an offer by the ship owner to transport the cargo;
   communicating acceptance of the offer by the charterer to the ship; and
   creating a contract between the ship owner and the charterer, said contract comprising a provision that includes a charterer's option to determine a port/place for cargo loading and/or discharge within a negotiated loading and/or discharge range of ports/places.

2. The method of claim 1, wherein the cargo description is designated as public, the method further comprising:
   communicating the cargo description to a plurality of ship owners.

3. The method of claim 1, wherein the cargo description is designated as private, the method further comprising:
   communicating the cargo description to a designated ship owner.

4. The method of claim 1, wherein the cargo description includes at least one of a cargo quantity, a cargo type, a cargo load, a discharge requirement, a number of laydays, an indication of whether the cargo is public or private, a name of the charterer, and a loading region for the cargo.

5. The method of claim 1, wherein the ship description includes at least one of:
   a ship name, a ship identification, a name of the ship owner, a deadweight, an overall length, a beam, a draft, a distance from a keel to a top of a mast, a cubic capacity, a hull type, an age, a flag, a classification society, a usual cargo, and a current ship position.

6. The method of claim 1, wherein the offer includes:
   a rate for transporting the cargo.

7. The method of claim 1, wherein the communicating step further comprises:
   communicating the offer to the charterer via an electronic mail message.

8. The method of claim 1, further comprising:
   receiving a modification of the offer from the charterer; and
   communicating the modification to the ship owner.

9. The method of claim 1, further comprising:
   receiving a charter party contract including at least one term of the offer; and
   storing the charter party contract in a memory.

10. The method of claim 1, further comprising:
    receiving from the ship owner an update to the ship description.

11. The method of claim 1, further comprising:
    receiving from the charterer an update to the cargo description.

12. The method of claim 1, further comprising:
    charging a fee to at least one of: the charterer and the ship owner.

13. The method of claim 12, wherein the fee is a subscription fee.

14. The method of claim 12, wherein the fee is based on an amount of a charter party contract.

15. A computer-readable medium encoded with processing instructions for implementing a method, performed by a computer, for providing an interface between charterers and ship owners, the method comprising:
    receiving from a charterer a description of cargo to be transported;
    receiving from a ship owner a description of a ship for transporting cargo;
    receiving from the ship owner an offer to transport the cargo;
    communicating the offer by the ship owner to the charterer;
    communicating acceptance of the offer by the charterer to the ship owner; and
    creating a contract between the ship owner and the charterer, said contract comprising a provision that includes a charterer's option to determine a port/place for cargo loading and/or discharge within a negotiated loading and/or discharge range of ports/places.

16. An apparatus for providing an interface between charterers and ship owners, comprising:
    means for receiving from a charterer a description of cargo to be transported;
    means for receiving from a ship owner a description of a ship for transporting cargo;
    means for receiving from the ship owner an offer to transport the cargo;
    means for communicating the offer by the ship owner to the charterer
    means for communicating acceptance of the offer by the charterer to the ship owner; and
    means for creating a contract between the ship owner and the charterer, said contract comprising a provision that includes a charterer's option to determine a port/place for cargo loading and/or discharge within a negotiated loading and/or discharge range of ports/places.

17. An apparatus for providing an interface between charterers and ship owners, comprising:
    a processor; and
    a memory encoded with processing instructions for allowing the processor to:
    receive from a charterer a description of cargo to be transported;

receive from a ship owner a description of a ship for transporting cargo;

receive from the ship owner an offer to transport the cargo;

communicate the offer by the ship owner to the charterer;

communicate acceptance of the offer by the charterer to the ship owner; and create a contract between the ship owner and the charterer, said contract comprising a provision that includes a charterer's option to determine a port/place for cargo loading and/or discharge within a negotiated loading and/or discharge range of ports/places.

18. A method for submitting a cargo description for bidding by a ship owner, comprising:

transmitting a cargo description to a network site;

transmitting an indication that the cargo description is one of public and private;

receiving an offer from a ship owner for transporting the cargo communicating the offer by the ship owner to a charterer;

communicating acceptance of the offer by the charterer to the ship owner; and creating a contract between the ship owner and the charterer, said contract comprising a provision that includes a charterer's option to determine a port/place for cargo loading and/or discharge within a negotiated loading and/or discharge range of ports/places.

19. The method of claim 18, further comprising:

receiving a ship description with each received offer.

20. The method of claim 18, further comprising:

transmitting a modification of the offer.

21. The method of claim 18, wherein the cargo description is private, the method further comprising:

searching a ship database;

selecting a ship having a ship owner based on a ship description; and transmitting, to the ship owner, a request for offer corresponding to the cargo description.

22. The method of claim 18, further comprising:

paying a fee to an operator of the network site.

23. The method of claim 22, wherein the fee is based on at least one of:

a subscription rate, a number of completed transactions, and a percentage of a charter party contract.

24. A method for bidding on a cargo description comprising:

transmitting a ship description to a network site;

searching a cargo database having a public cargo description;

selecting the cargo description;

transmitting an offer by a ship owner to transport a cargo corresponding to the cargo description, the offer including at least one contract provision and an indication of the ship description; and creating a contract between the ship owner and a charterer, said contract comprising a provision that includes a charterer's option to determine a port/place for cargo loading and/or discharge within a negotiated loading and/or discharge range of ports/places.

25. The method of claim 24, further comprising:

receiving a modification of the offer.

26. The method of claim 24, further comprising:

paying a fee to the network site.

27. The method of claim 24, further comprising:

paying a fee to an operator of the network site.

28. The method of claim 27, wherein the fee is based on at least one of:

a subscription rate, a number of completed transactions, and a percentage of a charter party contract.

29. A method for bidding on a cargo description comprising:

transmitting a ship description to a network site;

receiving a private cargo description from a charterer and a request for offer, based on the ship description;

transmitting an offer by the ship owner to transport a cargo corresponding to the private cargo description, the offer including at least one contract provision;

receiving an acceptance of the offer by a charterer; and creating a contract between the ship owner and the charterer, said contract comprising a provision that includes a charterer's option to determine a port/place for cargo loading and/or discharge within a negotiated loading and/or discharge range of ports/places.

30. The method of claim 29, further comprising:

receiving a modification of the offer.

31. The method of claim 30, further comprising:

paying a fee to an operator of the network site.

32. The method of claim 30, wherein the fee is based on at least one of:

a subscription rate, a number of completed transactions, and a percentage of a charter party contract.

* * * * *